(12) United States Patent
Grinstein et al.

(10) Patent No.: US 6,714,201 B1
(45) Date of Patent: Mar. 30, 2004

(54) APPARATUSES, METHODS, COMPUTER PROGRAMMING, AND PROPAGATED SIGNALS FOR MODELING MOTION IN COMPUTER APPLICATIONS

(75) Inventors: Georges G. Grinstein, Ashby, MA (US); Jeffrey R. Leger, Tyngsboro, MA (US); John Peter Lee, North Reading, MA (US); Bradford E. MacPherson, North Chelmsford, MA (US); David A. Southard, Bedford, MA (US)

(73) Assignee: 3D Open Motion, LLC, North Chelmsford, MA (US)

( * ) Notice: Subject to any disclaimer, the term of this patent is extended or adjusted under 35 U.S.C. 154(b) by 0 days.

(21) Appl. No.: 09/550,080

(22) Filed: Apr. 14, 2000

Related U.S. Application Data

(60) Provisional application No. 60/129,165, filed on Apr. 14, 1999.

(51) Int. Cl.$^7$ .............................................. G06T 13/00
(52) U.S. Cl. ............................... 345/474; 700/61
(58) Field of Search ........................... 345/474; 700/61

(56) References Cited

U.S. PATENT DOCUMENTS

| | | | |
|---|---|---|---|
| 6,184,899 B1 | * 2/2001 | Akemann | 345/473 |
| 6,310,619 B1 | * 10/2001 | Rice | 345/420 |
| 6,420,698 B1 | * 7/2002 | Dimsdale | 250/234 |
| 2002/0122072 A1 | * 9/2002 | Selker | 425/324.1 |

OTHER PUBLICATIONS

Don Bruizman. The Virtual Reality Modeling Language and Java. In Communications of the ACM, Jun. 1998/vol. 41, No. 6, pp 57–64.*

* cited by examiner

*Primary Examiner*—Joseph Mancuso
*Assistant Examiner*—Adam Arnold
(74) *Attorney, Agent, or Firm*—Edward N. Porter

(57) ABSTRACT

A hierarchical 3D graphics model can be viewed as a hierarchical graph of its nodes and their associated motions, with the mathematical type of motions graphically indicated. A user can click on a displayed motion to edit it. A motion API provides one or more of the following features: (1) spatial predicate functions; (2) functions for scaling motion intensity; (3) classes for shake, spin, and swing motions; (4) motion classes with a GUI interfaced for defining their duty cycle; (5) functions for defining and computing $0^{th}$ through $2^{nd}$ order derivatives of 3D position and orientation as function of time; (6) behaviors that constrain motions by boundaries in which the constraint is a reflection, clamp, andor onto constraint, or in which the boundary is a composite boundary. Motions can be defined by successive calls to an API and then be saved in a file.

32 Claims, 60 Drawing Sheets

New Motion Parameters

*Tabs:* Initial Conditions | Translation | Rotation | Scaling

Translation
- Position: 000.000
- Velocity: 000.000
- Acceleration: 000.000

Rotation
- Orientation: 000.000
- Spin: 000.000
- Revolve: 000.000

Scaling
- Scale: 000.000
- Growth: 000.000
- Grownth Rate: 000.000

[Info ...] [Code ...] [Apply] [Save] [Reset]

FIG. 25

```
-man4~502
    -S_Body_B parent~536A        = body parent ~539
        -S_Body_B~536            = pelvis
        -S_Leg_UR parent~536A    = right upper leg parent
            -S_Leg_UR~536        = right upper leg~539
            -S_Leg LR Parent~536A = right lower leg parent
                -S_Leg_LR ~536   = right lower leg
                -S_Foot_R parent~536A = right foot parent~539
                    -S_Foot_R~536 = right foot
                    -S_Toes_R Parent~536A = right toes parent
                        rtoes~536 = right toes~539
        -S_Leg_UL parent~536A    = left upper leg parent
            -S_Leg_UL~536        = left upper leg~539
            -S_Leg LL Parent~536A = left lower leg parent
                -S_Leg_LL~536    = left lower leg
                -S_Foot_L Parent~536A = left foot parent~539
                    -S_Foot_L~536 = left foot
                    -S_Toes_L Parent~536 = left toes parent
                        ltoes~536 = left toes~539
    -S_Body_T Parent~536AD       = torso parent
        -S_Body_T~536            = torso
        -collar~536              = collar~539
        -neck Parent~536A        = neck parent
            -neck~536            = neck
            -S_Head Parent~536A  = head parent~539
                -S_Head~536      = head
                -hair~536        = hair~539
        -S_Arm_UR Parent~536A    = right sleeve parent~539
            -S_Arm_UR~536        = right sleeve
            -lband~536           = right sleeve band
            -ruparm parent~536A  = right upper arm parent~539
                -ruparm~536      = right upper arm
                -S_Arm_LR Parent~536A = right lower arm
                parent~539
                    -S_Arm_LR~536 = right lower arm
                    -rhand~536   = right hand~539
        -lsleeve parent~536AC    = left sleeve parent
            -lsleeve~536         = left sleeve~539
            -rband~536           = left sleeve band
            -luparm Parent~536A  = left upper arm parent~539
                -luparm~536      = -left upper arm
                -S_Arm_LL Parent~536A = left lower arm
                parent~539
                    -S_Arm_LL~536 = left lower arm
                    -lhand~536   = left hand~539
```

-man4~502
    -body parent~536A
        *-parent location~538*
            -pelvis~536
            -right upper leg parent~536A
                *-parent location~538*
                    -right upper leg~536
                    -right lower leg parent~536A
                        *-parent location~538*
                          -right lower leg~536
                          -right foot parent~536A
                              *-parent location~538*
                                -right foot~536
                                -right toes parent~536A
                                    *-parent location~538*
                                    -right toes~536
            -left upper leg parent~536A
                *-parent location~538*
                    -left upper leg~536
                    -left lower leg parent~536A
                        *-parent location~538*
                          -left lower leg~536
                          -left foot parent~536A
                              *-parent location~538*
                              -left foot~536
                              -left toes parent~536A
                                  *-parent location~538*
                                  -left toes~536
        -torso parent ~536A
            *-parent location~538*
                -torso~536
                -collar~536
                -neck parent~536A
                    *-parent location~538*
                        -neck~536
                        -head parent~536A
                            *-parent location~538*
                            -head~536
                            -hair~536

FIG. 36A

~530
- right sleeve parent~536A
    - *parent location*~538
        - right sleeve~536
        - right sleeve band~536
        - right upper arm parent~536A
            - *parent location*~538
                - right upper arm~536
                - right lower arm parent~536A
                    - *parent location*~538
                        - right lower arm~536
                        - right hand~536
- left sleeve parent~536A
    - *parent location*~538
        - left sleeve~536
        - left sleeve band~536
        - left upper arm parent~536A
            - *parent location*~538
                - left upper arm~536
                - left lower arm parent~536A
                    - *parent location*~538
                        - left lower arm~536
                        - left hand~536

FIG. 36B

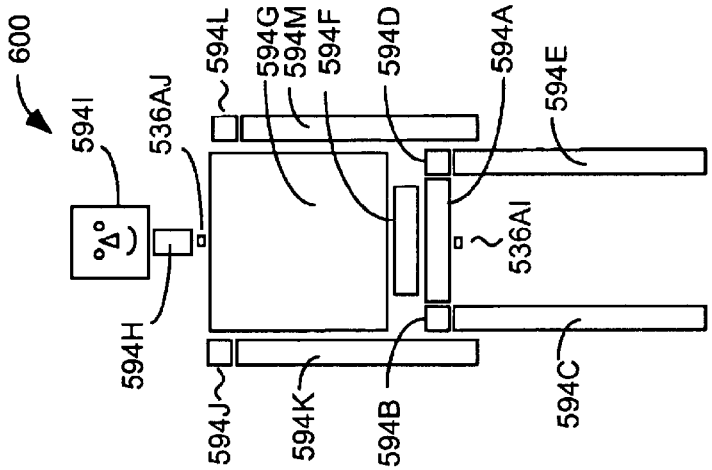

FIG. 47

-model1 ~600
  -model class: ~606
    simple human with one piece arms and legs ~602
  -body parent ~536AI
    -parent location ~538
    -pelvis ~536
      -pelvis graphic model 1 ~594A
    -right upper leg parent ~536A
      -right upper leg parent graphic model 1 ~594B
      -parent location ~538
      -right leg ~536
        -right leg graphic model 1 ~594C
    -left upper leg parent ~536A
      -left upper leg parent graphic model 1 ~594D
      -parent location ~538
      -left leg ~536
        -left leg graphic model 1 ~594E
    -torso parent ~536A
      -torso parent graphic model 1 ~594F
      -parent location ~538
      -torso ~536
        -torso graphic model 1 ~594G
      -neck parent ~536A
        -parent location ~538
        -neck ~536
          -neck graphic model 1 ~536II
          -head ~536II
            -head graphic model 1 ~594I
      -right upper arm parent ~536A
        -right upper arm parent graphic model 1 ~594J
        -parent location ~538
        -right arm ~536
          -right arm graphic model 1 ~594K
      -left upper arm parent ~536A
        -left upper arm parent graphic model 1 ~594L
        -parent location ~538
        -left arm ~536
          -left arm graphic model 1 ~594M

FIG. 46

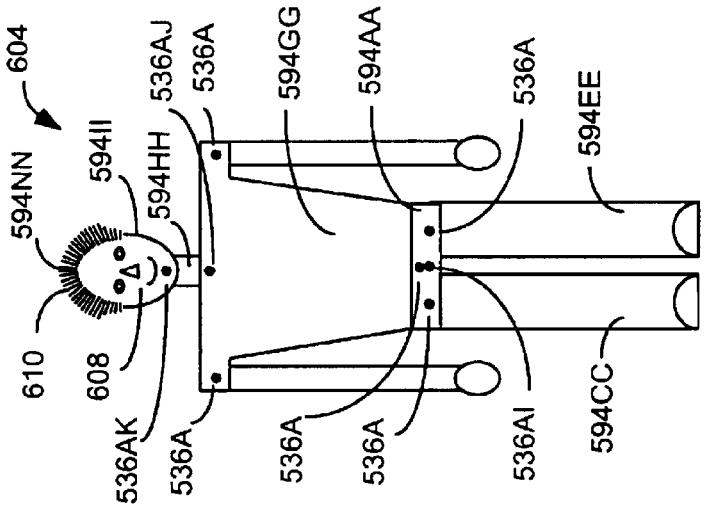

-model2~ 600A
 -model class:~ 606
  simple human with one piece arms and legs ~ 602
 -body parent~536AI
  -parent location~538
  -pelvis ~ 536
   -pelvis graphic model 2~ 594AA
   -right upper leg parent ~ 536A
   -parent location~ 538
   -right leg ~ 536
    -right leg graphic model 2~ 594C
   -left upper leg parent~ 536A
   -parent location~ 538
   -left leg ~ 536
    -left leg graphic model 2~ 594EE
   -torso parent ~ 536A
   -parent location~ 538
   -torso ~ 536
    -torso graphic model 2~ 594GG
    -neck parent ~536AJ
    -parent location~ 538
    -neck ~ 536
     -head parent~536AK
     -parent location~ 538
     -head~536II
      -hair~536JJ
       -hair graphic model 2~594KK
       -hair texture model 2~594MM
      -head graphic model 2~ 594II
      -head image mode 2~ 608
      -head texture model 2~ 610
    -right upper arm parent~ 536A
    -parent location ~ 538
    -right arm ~ 536
     -right arm graphic model ~ 536A
    -left upper arm parent ~ 536A
    -parent location ~ 538
    -left arm ~ 536
     -right arm graphic model 2~594MM

-motion package 1~612
    -model class:~606
        simple human with one piece arms and legs~602
    -body parent: ~536AL
        -body motion 1A~540C
        -body motion 1B~540C
    -right upper leg parent:~536A
        right leg motion 1~540C
    -left upper leg parent:~536A
        left leg motion 1~540C
    -torso parent:~536A
        torso motion 1~540C
    -neck parent:~536A
        neck motion 1~540C
    -head parent:~536A
        head motion 1~540C
    -right upper arm parent:~536A
        right arm motion 1~540C
    -left upper arm parent:~536A
        left arm motion 1~540C
    -default model:~614
        motion package 1 default model~616

FIG. 50

-motion package 2~612A
    -model class:~606
        simple human with one piece arms and legs~602
    -body parent:~536A
        body motion 2~540D
    -right upper leg parent:~536A
        right leg motion 2~540D
    -left upper leg parent:~536A
        left leg motion 2~540D
    -torso parent:~536A
        torso motion 2~540D
    -neck parent:~536A
        neck motion 2~540D
    -head parent:~536AM
        head motion 2A~540D
        head motion 2B~540D
    -right upper arm parent:~536A
        right arm motion 2~540D
    -left upper arm parent:~536A
        left arm motion 2~540D
    -default model:~614
        motion package 2 default model~616

FIG. 51

```
                                    ~530
-model2~600A
    -motion package 1~618
    -...
    -body parent~536AI
        -body motion 1A~540C
        -body motion 1B~540C
            -parent location~538
                -pelvis~536
                    -pelvis graphic model 2~594AA
                -right upper leg parent~536A
                    -right leg motion 1~540C
                        -parent location~538
                            -right leg~536
                                -right leg graphic model 2~594CC
                -left upper leg parent~536A
                    -left leg motion 1~540C
                        -parent location~538
                            -left leg~536
                                -left leg graphic model 2~594EE
                -torso parent~536A
                    -torso motion 1~540C
                        -parent location~538
                            -torso~536
                                -torso graphic model 2~594GG
                            -neck parent~536AJ
                                -neck motion 1~540C
                                -neck parent graphic model 2~594
                                    -parent location~538
                                        -neck~536
                                            neck graphic model~594HH
                                        -head parent~536A
                                            -headmotion1~540C
                                                -parent location~538
                                                  --head~536
                                    594II~      -head graphic model 2
                                    608~        -head image mode 2
                                             -hair
                                    594NN~    -hair graphic model 2
                                    610~      -hair texture model 2
                -right upper arm parent~536A
                    -right arm motion 1~540C
                        -parent location~538
                            -right arm~536
                                -right arm graphic model 2~594KK
                -left upper arm parent~536A
                    -left arm motion 1~540C
                        -parent location~538
                            -left arm~536
                                -left arm graphic model 2~594MM
```

-model2~600A~6
    -motion package 2~618A
    -...
    -body parent~536AI
        -body motion 2~540D
            *-parent location~538*
                -pelvis~536
                      -pelvis graphic model 2~594AA
            -right upper leg parent~536A
                -right leg motion 2~540D
                    *-parent location~538*
                        -right leg~536
                            -right leg graphic model 2~594CC
            -left upper leg parent~536A
                -left leg motion 2~540D
                    *-parent location~538*
                        -left leg~536
                            -left leg graphic model 2~594EE
    -torso parent~536A
        -torso motion 2~540D
            *-parent location~538*
                -torso~536
                      -torso graphic model 2~594GG
        -neck parent~536AJ
            -neck motion 2~540D
            -neck parent graphic model 2~594
            *-parent location~538*
                -neck~536
                    neck graphic model~594HH
                -head parent~536A
                    -head motion 2A~540D
                    -head motion 2B~540D
                        *-parent location~538*
                            -head~536
            594II~        -head graphic model 2
            608~        -head image mode 2
                        -hair
            594NN~     -hair graphic model 2
            610~        -hair texture model 2

-right upper arm parent~536A
                -right arm motion 2~540D
                    *-parent location~538*
                        -right arm~536
                            -right arm graphic model 2~594KK
    -left upper arm parent~536A
        -left arm motion 2~540D
            *-parent location~538*
                -left arm~536
                      -left arm graphic model 2~594MM

FIG. 53

-eventLoop~640
  -...
    -if user selects to ~642
      -open model instance~644
        -display interface which lists available models and lets user select to open one of them~646
          -if user selects to open a model~648
            -open it and display it in current scene~650
      -add motion instance to node by a add, paste, or drag~652
        -call associateMotionWithNode~654
      -change parameter of motion instance~656
        -call API with corresponding change~658
      -change simulation clock speed~660
        -call API to change simulation clock~662
      -save motion instance~664
        -display interface allowing user to select name and path for motion~666
        -call API's serialization function for motion~668
        -save string returned by call to hard disk under selected file name and path~670
      -delete motion instance from node by a delete, drag-away, or cut~672
        -if user had cut the motion, copy it to a clipboard~674
        -if motion is part of a motion package~676
          -delete it from current instance of motion package~678
        -call disassociateMotionFromNode~680
      -add motion package instance to model instance~682
        -display interface which ~684
          -lists available motion packages and lets user select to open one of them~686
          -allows user to open tree view of motion package and its default model~690
          -lists models in the scene and lets user select to add motion package to one of them~692
        -if user selects to open tree graph with of a selected motion package with its default model~694
          -display tree view of selected motion package's default model showing motions attached to its nodes~696
        -if user selects to add a selected motion package to a selected model~698
          -call addMotionPackageToModel for model and motion package~700
    -...

FIG. 56A

-...
-redefine topology of motion package instance~702
    -display interface ~704
        -prompting user to select motions desired for motion package and to place motions under desired nodes ~706
        -letting user select to rename node tags associated with motions~708
        -letting user rename selected motion package's model class~710
        -letting user to select to re-define motion package in its current state~712.
    -if user select to re-define motion package~714
        -redefine instance of motion package to have ~716
            -a node tag for each node under which there is a selected motion~718
            -under each such node tag, each motion associated with with it in current tree graph~717
        -if the name of the model class associated with the motion package has been changed~718
            -make the corresponding change to the motion package~720
        -if there have been any changes in the model node structure to which motions are attached~721
            -give user option of creating a new default stick model for motion package having hierarchy of tag nodes in current tree graph~722
-save motion package instance~724
    -display interface allowing user to select name and path for motion package~726
    -for each node tag in instance of motion package~728
        -add node tag to a motion package data string~730
        -for each motion associated with node tag~732
            -call API's serialization function for motion~734
            -add string returned by call to motion package data string~736
    -add model class and default model definition to motion package data string~737
    -save motion package data string to hard disk under selected file name and path~738
-delete motion package instance from a model instance~740
    -call removeMotionPackageFromModel ~742
-...

FIG. 56B

-....
-If time for screen update~744
    -Call om::update()~746
    -API responds by updating all motions and temporal and spatial predicate for period for the period between the last update and the current clock time for the om::update() call~748
    -For each model in scene~750
        -For each node in model having an associated motion~754
            -for each such motion~756
                -Call motion's .position(), .orientation(), and .scale() for motion~758
                -add for each degree of freedom to results to a current sum for node~760
            -update position, orientation, and scale of associated node with sum or returned values for each degree of freedom~762
            -call renderer to inform it of updated values for node~764
    -Call renderer to render ~766
    -call om::frame()~768
    -...
-...

FIG. 56C

-AddMotionPackageToModel~770
    -place motion package mode as child under top model node~771
    -for each motion in motion package~772
        -if find node in model which has same name~774
            -call associateMotionWithNode for motion and node~776

FIG. 57

-associateMotionWithNode~778
    -in application create association of the motion with the node~780
    -if motion is not already created~782
        -call API's de-serialization interpreter for motion's associated stream, which will make a series of corresponding calls to create corresponding motion, to define it, and to schedule it~784

FIG. 58

-removeMotionPackageFromModel ~786
    -remove motion package node from under top model node~787
    -for each motion in motion package~788
        -call disassociateMotionFromNode for motion and node~790

FIG. 59

-disassociateMotionFromNode~792
    -in application remove association of the motion with the node~794
    -if motion is not associated with another node~796
        -call API's to de-schedule the motion and then to delete it~798

FIG. 60

-e-commerce client~900
    -use browser to display and interact with web pages of model & motion e-commerce server ~902
    -if model or motion is downloaded to client by the e-commerce server~904
        -store motion or model in mass storage device~906
    -use Open Motion application to select and use downloaded model and/or downloaded motion~910

FIG. 65

-e-commerce server~912
    -if user indicates wants to purchase models or motions~913
        -display one or more web pages which~914
            -explain use of system to a purchaser~916
            -display models by class with price~918
            -display motions (motion packages and individual motions) by corresponding class with price~920
            -let user select to download a motion or model for trial~922
            -let user select to purchase a motion or model~924
        -if user selects to download a selected motion or model for trial~926
            -download time-limited copy of selected motion or model~928
        -if user selects to purchase a selected motion or model~930
            -record transaction in account of user, charging cost of purchased item to account associated with user~932
            -record transaction in account of vendor, crediting cost of purchased item minus any commission to account of vendor of item~934
            -dowload a copy of selected motion or model~936
    -if user indicates wants to sell models or motions~938
        -display one or more web pages which~940
            -explains use of system to a vendor~942
            -lets user select to upload a motion or model for sale~944
        -if user selects to upload a motion or model~946
            -display one or more web pages which ~948
                -allow user to specify name, description, and price item~950
                -allow user to select to upload item ~952
        -if user selects to upload item~954
            -upload it~956
            -check its classification ~958
            -place it in list of purchasable models or motions with price identified by class~960
            -record association between item and vendor who uploaded it~962

FIG. 66

-client networked 3-D application~1000
    -...
    -if client application adds a model to, alters a model in, or deletes a model from a shared scene~1002
        -upload change description identifying model and change made to it ~1004
    -if client application alters a model instance's motion such as by changing motion's parameters, or its behaviors, or by adding or deleting a motion or motion package to the model~1006
        -upload change description identifying motion change and model affected~1008
    -if receive download of change description for~1010
        -change to a motion already created on client~1012
            -call API's de-serialization function for string associated with download to generate calls corresponding to change which occurred on other client~1014
        -motion package to be added to a model~1016
            -call addMotionPackageToModel for motion package and model~1018
        -individual motion to be added to a node~1020
            -call associateMotionWithNode for motion and node~1022
        -deletion of a motion package from a model~1024
            -call removeMotionPackageFromModel for motion package and model~1026
        -deletion of an individual motion from a node of a model~1028
            -call disassociateMotionFromNode for motion and node~1030
        -new model to be added to scene~1032
            -add model to scene~1034
        -change to model already in scene~1036
            -change model~1040
        -removal of model from scene~1042
            -remove model from scene~1044
    -...

FIG. 68

-server networked 3-D application~1046
    -...
    -if receive upload of change description of one client~1048
        -download change description to all other clients having same model in their shared scene~1050
    -...

FIG. 69

-eventLoop~1060
   -...
   -if lionModel comes within 20 feet of manModel~1062
      -if manModel has other than the runMotionPackage associated with it~1064
         -call removeMotionPackageFromModel for any previous motion package associated with manModel~1066
         -call addMotionPackageToModel for runMotionPackage and manModel~1068
   -if lionModel is more than 300 feet from manModel~1070
      -if manModel has other than the walkMotionPackage associated with it~1072
         -call removeMotionPackageFromModel for any previous motion package associated with manModel~1074
         -call addMotionPackageToModel for walkMotionPackage and manModel~1076
   -..

FIG. 70

APPARATUSES, METHODS, COMPUTER PROGRAMMING, AND PROPAGATED SIGNALS FOR MODELING MOTION IN COMPUTER APPLICATIONS

1. RELATED APPLICATIONS

This application is a continuation-in-part of and claims priority under 35 U.S.C. §119(e) of the co-pending U.S. provisional application Ser. No. 60/129,165 filed by Grinstein et al. on Apr. 14, 1999 and entitled "Apparatuses And Methods For Modeling Motion In Computer Applications" (hereinafter "The Provisional Application") The Provisional Application is also hereby incorporated by reference.

TABLE OF CONTENTS

1. RELATED APPLICATIONS . . .
2. FIELD OF THE INVENTION . . .
3. BACKGROUND OF THE INVENTION . . .
4. SUMMARY OF THE INVENTION . . .
5. DESCRIPTION OF THE DRAWINGS . . .
6. DETAILED DESCRIPTION OF PREFERRED EMBODIMENTS . . .
   6.1 OVERVIEW . . .
      6.1.1 The OpenMotion System . . .
      6.1.2 The API And Its Relation To Application, Modeling, and Rendering Programs . . .
      6.1.3 The Run Time Engine . . .
      6.1.4 The Motion Translator, the OpenMotion Format, ClipMotions and the CMF . . .
      6.1.5 Motion-Enabled Objects . . .
      6.1.6 Encryption . . .
      6.1.7 Motion Editor/Viewer . . .
      6.1.8 Description Of The Types Of Motions Supported By The System . . .
   6.2 OPENMOTION API PROGRAMMER's GUIDE . . .
      6.2.1 Scope . . .
      6.2.2 Overview . . .
         6.2.2.1 Namespace . . .
         6.2.2.2 Update loop . . .
            6.2.2.2.1 Loop in application . . .
            6.2.2.2.2 Loop in graphic system . . .
      6.2.3 Principal types . . .
      6.2.4 Expressions . . .
         6.2.4.1 Values . . .
         6.2.4.2 Notation . . .
         6.2.4.3 Predefined values . . .
         6.2.4.4 Vars . . .
         6.2.4.5 Callbacks . . .
         6.2.4.6 Temporal predicates . . .
      6.2.5 Motions . . .
         6.2.5.1 Parameters . . .
            6.2.5.1.1 Initial conditions . . .
            6.2.5.1.2 Behavior . . .
         6.2.5.2 Attributes . . .
            6.2.5.2.1 Current Attributes Of Motion . . .
            6.2.5.2.2 Predict . . .
            6.2.5.2.3 Boundary . . .
         6.2.5.3 Complex Motions . . .
            6.2.5.3.1 Hierarchy . . .
            6.2.5.3.2 Blending . . .
      6.2.6 Behaviors . . .
         6.2.6.1 Interactive controllers . . .
         6.2.6.2 Constant controllers . . .
         6.2.6.3 Reset parameter . . .
         6.2.6.4 States and transitions . . .
         6.2.6.5 Assignments and callbacks . . .
         6.2.6.6 Attributes and predicates . . .
      6.2.7 Boundaries . . .
         6.2.7.1 Primitive shapes . . .
         6.2.7.2 Attributes . . .
         6.2.7.3 Composite boundaries . . .
         6.2.7.4 Expressions . . .
         6.2.7.5 Predicates . . .
         6.2.7.6 Behaviors . . .
      6.2.8 Examples . . .
         6.2.8.1 Swing . . .
         6.2.8.2 Two balls bouncing in box . . .
         6.2.8.3 Motion Derivatives . . .
         6.2.8.4 Motion Blending . . .
         6.2.8.5 Boundary Bounce . . .
   6.3 OPENMOTION FORMAT . . .
      6.3.1 Notation . . .
      6.3.2 Syntax Specification . . .
      6.3.3 Examples . . .
         6.3.3.1 The Simplest Motion . . .
         6.3.3.2 Velocity Controller Restricted To Plane . . .
         6.3.3.3 Flag waving (hierarchical motion) . . .
         6.3.3.4 One ball bouncing in box . . .
         6.3.3.5 Two balls bouncing in box . . .
         6.3.3.6 Harmonic (spring) motion . . .
         6.3.3.7 Circular motion . . .
         6.3.3.8 Orbital motion . . .
   6.4 OPENMOTION LIBRARY: MOTIONS AND INTERFACES FOR ACTIONS . . .
      6.4.1 Overview . . .
      6.4.2 Foundation Motions for Action Definition . . .
         6.4.2.1 Atomic Motions . . .
         6.4.2.2 Composite Motions . . .
         6.4.2.3 Reactive Motions . . .
         6.4.2.4 Deformations . . .
         6.4.2.5 New Motions . . .
         6.4.2.6 Saved Motions . . .
         6.4.2.7 Serial Motions . . .
         6.4.2.8 eMotions . . .
         6.4.2.9 Special or Behavioral Motions . . .
         6.4.2.10 Controlled Motions . . .
      6.4.3 Dialog Boxes . . .
         6.4.3.1 Atomic Motions . . .
            6.4.3.1.1 Basic Parameters . . .
            6.4.3.1.2 Advanced Parameters . . .
            6.4.3.1.3 Temporal Parameters . . .
            6.4.3.1.4 Specialized Parameters . . .
         6.4.3.2 Composite Motions . . .
         6.4.3.3 New Motions. . . .
         6.4.3.4 Wind Controller . . .
         6.4.3.5 Sway Controller . . .
         6.4.3.6 Other Controllers . . .
7. MOJO EDITOR . . .
8. 3D MODELS AND MOTION E-COMMERCE SITE . .
9. 3D NETWORKED GAME . . .
10. ADDITIONAL INTERACTIVE CAPABILITIES OF TREE VIEW . . .
11. THE INVENTION IS NOT LIMITED TO THE EMBODIMENTS DESCRIBED ABOVE . . .
12. WHAT WE CLAIM IS: . . .

2. FIELD OF THE INVENTION

The invention relates to the modeling of motion in computer applications.

3. BACKGROUND OF THE INVENTION 3D graphics is a significant technology. Originally it was largely the domain of specialized applications, primarily in technical and scientific fields, such as computer aided design, manufacturing and engineering analysis ("CAD/CAM/CAE"), running on computer workstations and high-end personal computers ("PCs"). However, as more powerful and faster microprocessors have become available at significantly lower cost, the number of computers and other electronic systems capable of taking advantage of 3D graphics has grown exponentially, to the extent that today 3D processing capabilities are available on most all new computers, and also on specialized 3D graphics entertainment systems that cost less than $500.

As a consequence, the demand for 3D graphics is growing not only in CAD/CAM/CAE and the technical and scientific fields, but also in important new markets such as digital media content creation for games, educational software, entertainment software, graphic arts, and corporate desktop.

In response to the growing interest and demand for 3D graphics capabilities, the industry has seen significant advances in software enabling technologies. In basic terms, a 3D graphics development system can be seen as requiring four primary functional capabilities: a) a 3D modeling to create 3D objects or scenes; b) a 3D rendering to adequately display the 3D objects or scenes with as much realism as possible; c) a 3D motion generation and control that includes spatial manipulation of 3D objects and navigation within 3D scenes; and d) a graphical user interface to allow programmers and users to readily access and use the 3D functional capabilities.

In the last few decades, progress in 3D modeling has been evident. In the 1970s modeling applications generated objects using triangles and quadrilaterals and in the 1980s modelers were able to generate objects using triangle meshes and elementary splines, such as Bezier splines. In the 1990s 3D development applications have generated 3D objects and scenes using more complex splines such as Non-Uniform Rational B-splines ("NURBS") and parametric solid geometry.

These advancements in 3D modeling have not only provided the ability to create richer more realistic 3D models and scenes, but have also made the 3D model building task easier and faster. For example, in parametric solid modeling, applications provide the ability to generate models that can be automatically sized and changed in a few lines of code or through pull-down menus while the model retains its fundamental attributes, and in 3D surface applications the technology exists to program sophisticated organic shapes in a few lines of code or through pre-defined pull-down menus. As a consequence, 3D development applications incorporating these advanced 3D modeling technologies have emerged as significant productivity tools for developers.

Advancement in 3D rendering technology is evident as well. In the 1970s renderers displayed 3D graphics models and scenes using mainly flat shaded triangles ("Gouraud shading"). In the 1980s this advanced to include the use of multiple light sources and complex lighting models ("Phong shading"). In the 1990s came the emergence of renderers that offer complex lighting model capabilities such as radiosity, as well as enhanced rendering attributes that made 3D scenes more realistic, such as the ability to create and display transparency, smoke and fog characteristics. The 1990s also saw the emergence of faster and more sophisticated texture mapping technology, including real-time 3D painting capabilities.

Again, these advances in rendering technology, along with advances in microprocessor capabilities, has resulted in the emergence of 3D rendering systems that allow easier, faster and better programming in 3D. It has also included the emergence of open standard application program interfaces ("APIs") for rendering, such as OpenGL from Silicon Graphics and more recently Direct3D from Microsoft. These open standard rendering APIs have encouraged the establishment of more 3D development environments capable of delivering 3D programs with richer 3D capabilities as well as portability and extendibility.

The adoption of a graphical user interface ("GUI") as a means of making a computer easier to use has evolved dramatically over the past two decades, from the somewhat limited text-based key-stroke commands of the 1960s, 70s, and early 80s, to the current prolific use of mouse and keyboard-operated GUIs of today. The Apple Macintosh and Microsoft Windows operating systems are both examples of this trend. Throughout the 1980s and continuing into the 1990s there have been significant advancements in GUI capabilities, from better input device functionality to standardization of functions, establishing separation from application code, incorporating multi-processing with specific event handling and callbacks to applications. The advancements in GUI technologies has meant programmers are able to program specific GUI requirements easier, faster, and better with fewer lines of code.

Despite all of these advances, 3D graphics has not reached its full potential. Without the ability manipulate 3D objects intuitively, or to navigate through 3D scenes interactively, the objects or scenes become no more than still shots, or sequences of still shots, and manipulation and navigation is severely limited. Today most 3D applications are limited to a small set of predefined motions or animations. The reason is that motion-rich 3D environments are difficult to program.

Developers who want to add complex 3D motion and 3D interactive motion control capabilities to their applications generally need to "hard-code" these motions. That is, each motion is programmed for each object through the scene in a painstaking and time consuming manner. Additionally, programmers need to be conscious of the different types of input devices that will be used, and these have to be programmed into the application as well. The task can involve thousands of lines of code. As a consequence all this difficult work has inhibited the emergence of motion-rich 3D development environments in anything but very specialized packages.

To date, few GUIs have not been able to take advantage of 3D technology. The opportunity arises to introduce an advanced GUI that incorporates 3D functionality together with 2D technology seamlessly. Realization of this opportunity requires intuitive interaction and control of 3D objects.

4. SUMMARY OF THE INVENTION

The present invention relates to improvements in computer motion modeling. The invention has multiple aspects. Some embodiments of the invention, such as the OpenMotion™ System discussed below in the Detailed Description Of Preferred Embodiments, combine all of these aspects together into one software product. In other embodiments only one or a subset of these aspects may be used.

One aspect of the invention is its abstraction of motion from media. That is, we deal with motion as a concept unto itself, not necessarily intertwined with a graphic object, nor a side-effect of physical simulation. Motions may be combined using operators to achieve nesting, blending, and weighting. By means of this abstraction, one of our motions can be applied to a large number of different computer represented objects, or even combined together to make new motions. This enables our technology to be applied to a wide range of applications.

Another aspect of the invention features an application program interface ("API") for motion specification and interactive control, as well as a corresponding runtime engine to execute the motions and to respond to interactions defined by use of the API. This is a 3D API for generating and invoking enhanced 3D motion and 3D interactive motion control capabilities independently of, but complementary to, popular 3D modeling applications and rendering APIs. These motions can be edited and re-used.

Yet another aspect of this invention features a motion software system which has an application program interface (API) and file interchange format which are designed to look alike and be equivalent in expressive power. Both source code and file format are seen as two representations of the same interface. The interface may be bound to new source languages as opportunities arise. This includes an efficient storage and retrieval mechanism for 3D motion models. In some embodiments of the invention the API is the OpenMotion™ API and the file format is the OpenMotion™ File Format, both of which are discussed below in the Detailed Description Of Preferred Embodiments.

Still another aspect of the invention is the ability to store motions and object models in a particular file format. In many embodiments of this aspect of the invention the motion software system comes with a library of such motions, and preferably also a library of object models which are built and stored in a particular way which enables them. to work with the Open Motion API. These models are called motion-enabled models. When such a model is combined with a motion defined by the system it is called Motion Art. In some embodiments of this aspect of the invention, an encryption mechanism controls the use and proliferation of such motions and models. In some embodiments, the file format used to store such motions is the OpenMotion™ File format discussed below in the Detailed Description and the file format used to store motion enabled models is an extension of the OpenMotion™ format. Motions stored in the OpenMotion™ File format are called ClipMotions™.

Still another aspect of this invention is its architectural model, which allows motion to be modeled and parameterized in a flexible way. This architectural model consists of a particular set of functional units that may be configured by the user in a multitude of ways to create virtually any desired motion. The units are Motion, Behavior, Boundary, and algebraic expressions. A Motion is the computational structure which defines the spatial properties of an object, such as position, orientation, and size. A Behavior is a common attribute of a motion which controls the changes in the spatial properties of a motion. A Boundary is a surface or volume with which one or more motions can interact, such as by bouncing off or being limited to stay on or within. Algebraic expressions enable motions, behaviors, or boundaries to be combined and they enable the attributes of motions, behaviors, and boundaries to be dynamically interrelated. In many preferred embodiments of the invention the algebraic expressions are retained expressions, which appear to be normal algebraic operators to the user, but which are specially defined operators that cause information defined by the many simultaneous equations, which can be represented by such algebraic expressions, to be propagated in an efficient manner similar to that in which updates propagate through a spreadsheet.

In some embodiment of the invention, motions, behaviors, and boundaries, are each modeled as classes in an object oriented language such as C++. This enables new instances of a particular motion, behavior, or boundary to be created easily, and new types of motions, behaviors, or boundaries to be created easily through inheritance. Since behaviors are attributes of motions, once a given class of behavior has been defined, it can be used to control different motions. Furthermore, in many embodiments of the invention, a behavior can be defined as a sequence of other behaviors, and behaviors can contain conditional statements which can evoke other behaviors, meaning that it is very easy to create complex behaviors out of simple ones.

Another aspect of the invention is the processing method for managing the update loop. The dispatch algorithm has to coordinate a number of independently-moving motions, the behaviors of which may be triggered by spatial predicates (collision detection, unscheduled events), temporal predicates (scheduled events), as well as user-defined Boolean conditions. The algorithm must synchronize and dispatch updates at each frame, as well as predicting, detecting and resolving interactions, such as collisions, that might occur between frames. The method distributes particular responsibilities amongst the functional units in a unique way. The method also supports the run time creation and modification of motions.

Another aspect of this invention is its motion control method. Quantities of motion are interrelated by derivatives or integrals, e.g., for a translation control, any one of position, velocity, or acceleration may be selected as the control parameter, the others being derived from this parameter. The control method dynamically fits a trajectory curve to any input control function, whether a discretely-sampled input, or a continuously-defined function. This model uniformly applies to other degrees of freedom, namely orientation, scaling, shearing, bending, stretching, and possibly others. This model allows us to detect interactions between motions that occur between rendering intervals, which would otherwise be missed.

Another aspect of this invention is its Boundary composition. Boundaries are seen as elemental units that can be combined to form complex structures. Algebraic operators are used to perform user-defined compositions and configurations. When a motion interacts with a Boundary, it is called a Constraint.

Still another aspect of this invention is its use of motion primitives and algebra. A specific set of motion primitives or elemental units can be defined. This set along with a motion algebra can then be used to form more complex motions.

Yet another aspect of this invention is its motion editor which provides visual feedback on the definition of complex and hierarchical motions that are supported by the API.

A more accurate summary of the invention is found in the claims that follow. It should be understood that the invention is meant to include apparatus, methods, computer programming recorded on computer readable media, and propagated signals capable of providing functionality of the type recited in each claim, even if there currently are not claim covering each of these different class of inventions below.

5. DESCRIPTION OF THE DRAWINGS

These and other aspects of the present invention will become more evident upon reading the following description of the preferred embodiment in conjunction with the accompanying drawings, in which:

FIGS. 25–28 illustrate, respectively, the Initial Condition, Translation, Rotation, and Scaling tabs of the New Motion dialog box provided by the Motion Editor/Viewer;

Figure 33:
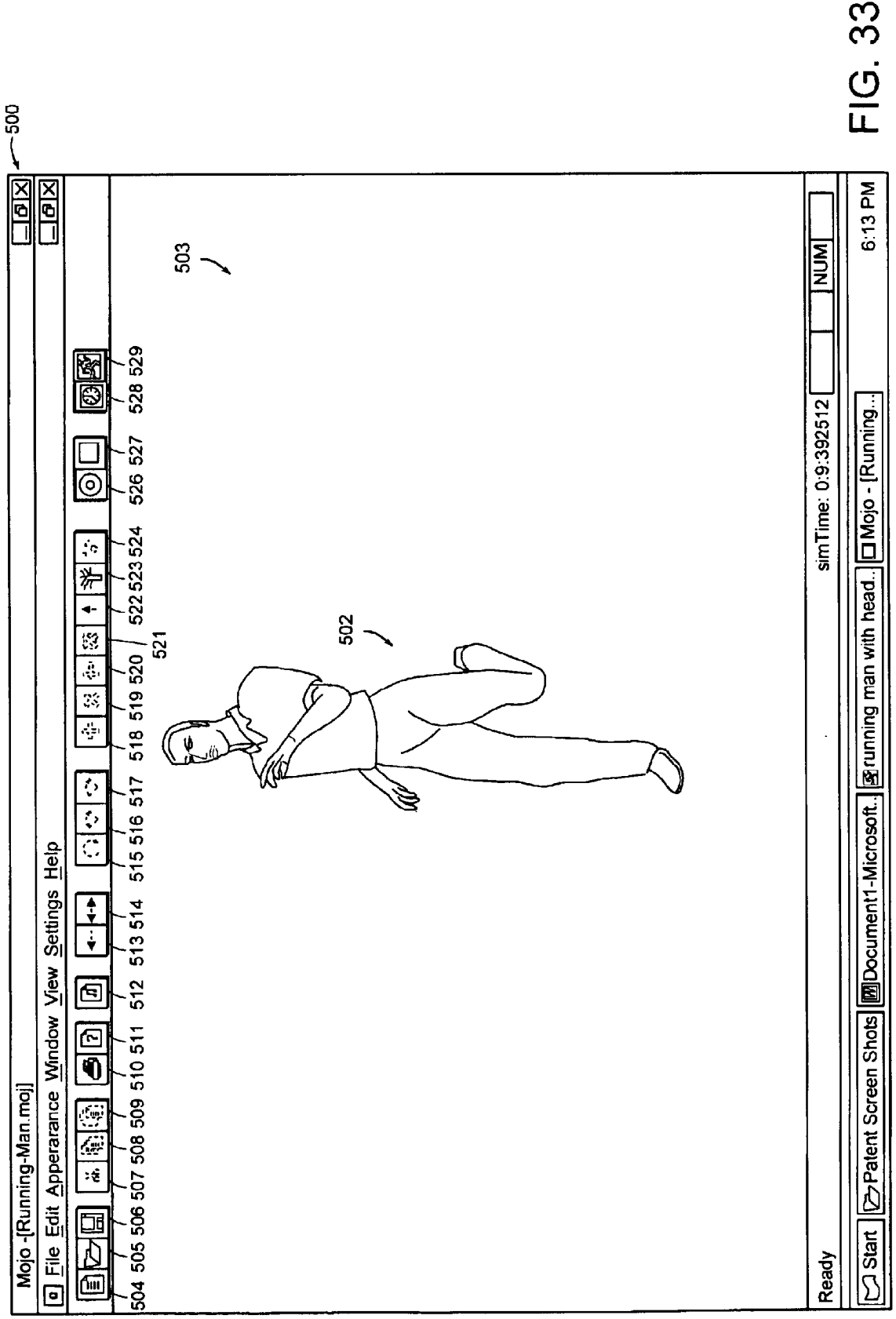
FIG. 33 illustrates the visual user interface of the Mojo motion editor, displaying the editor's scene view window showing animated image of a 3D hierarchical model of a man.
Figure 34:
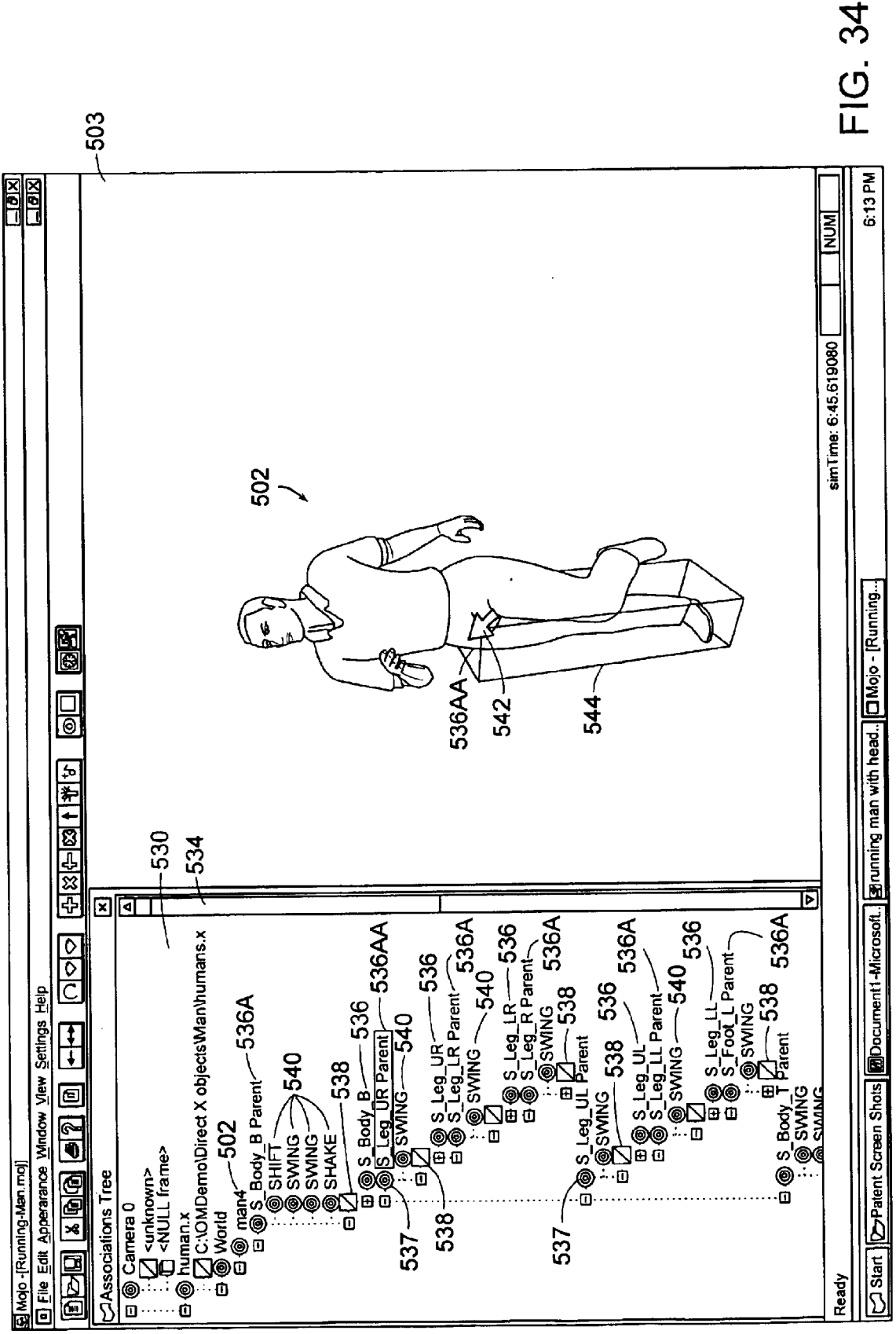
FIG. 34 illustrates the same interface when a tree view window is displayed, showing the hierarchical structure of the human model shown in FIG. 33.
Figure 45:
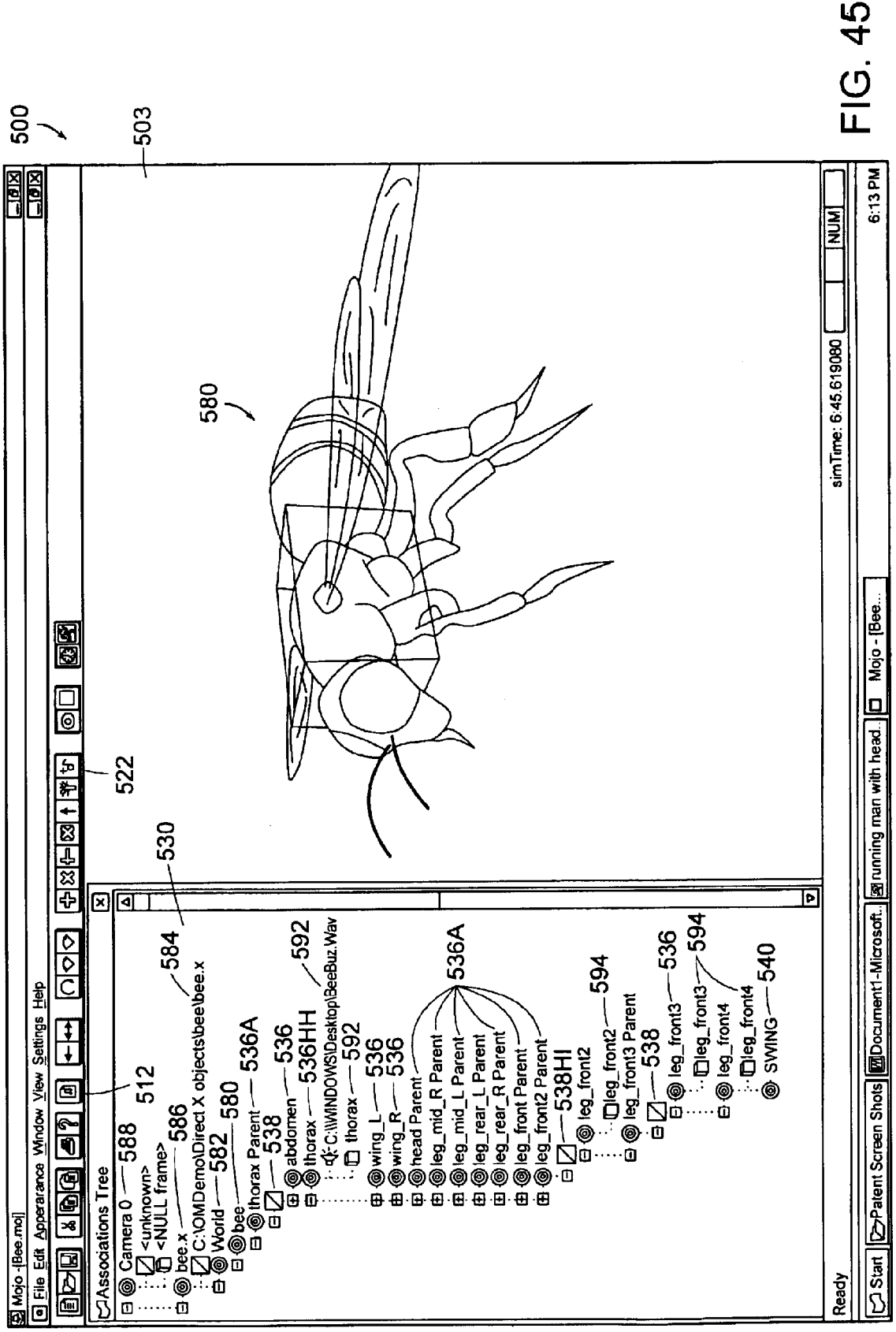
Figure 54:
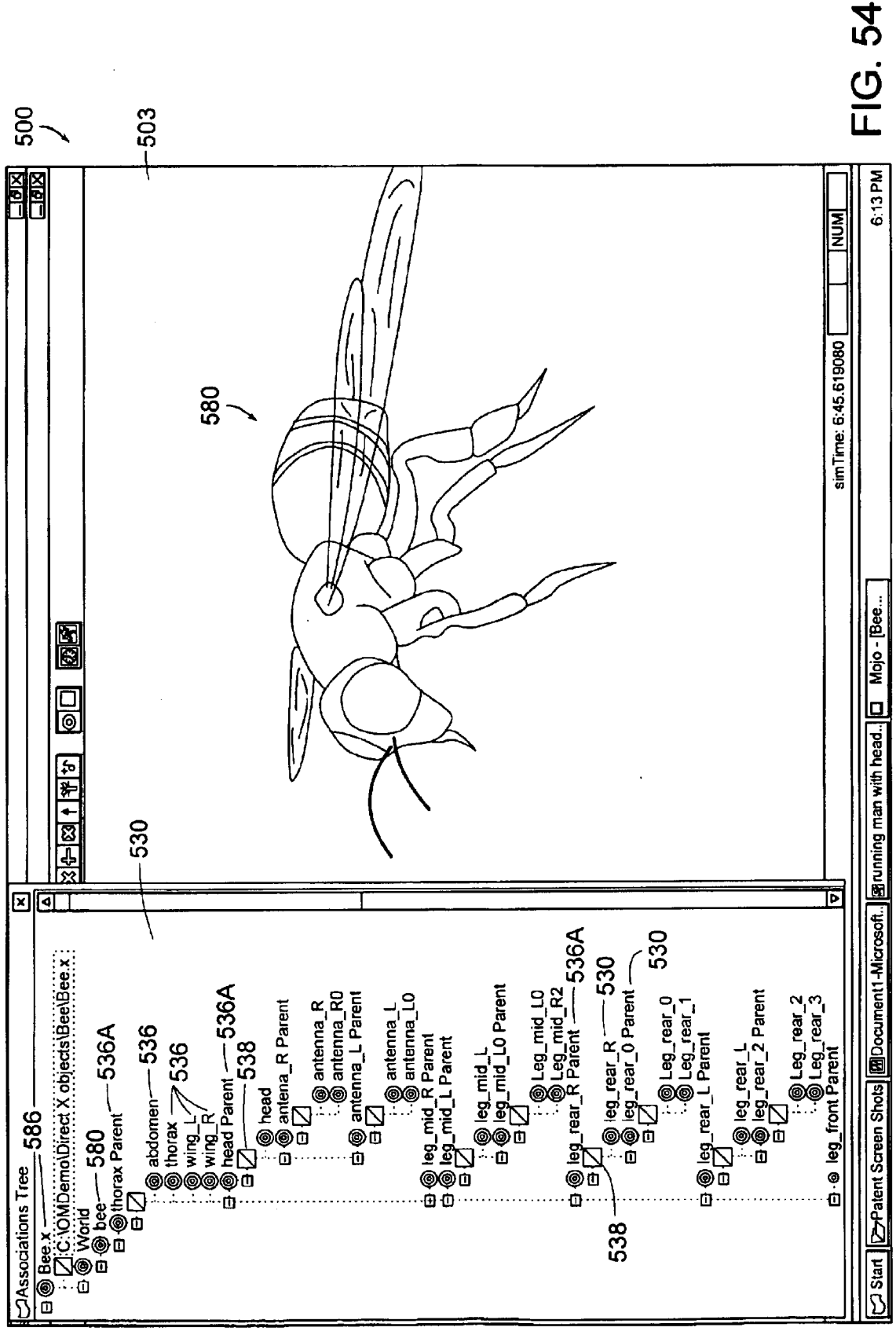
Figure 55:
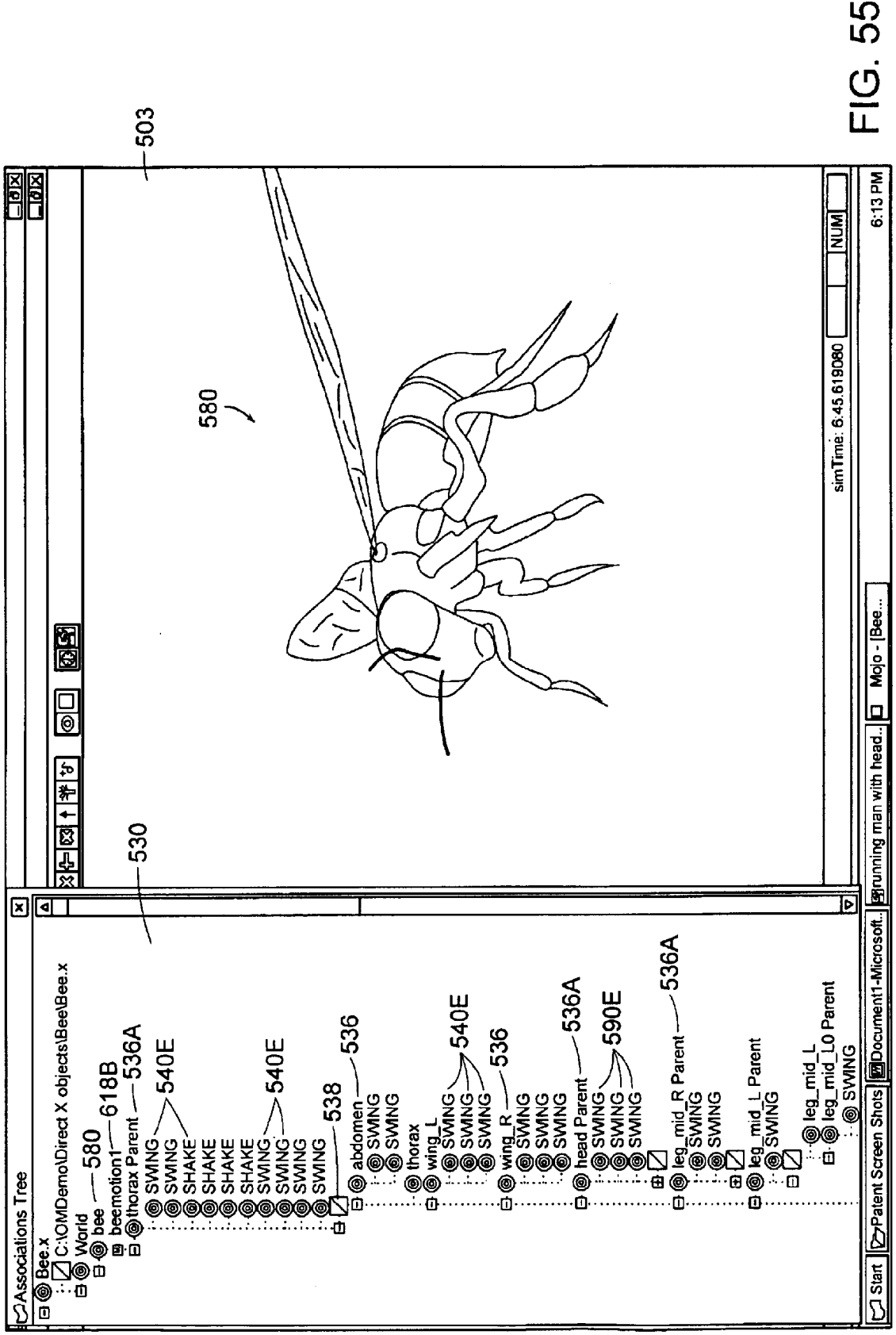
Figure 61:
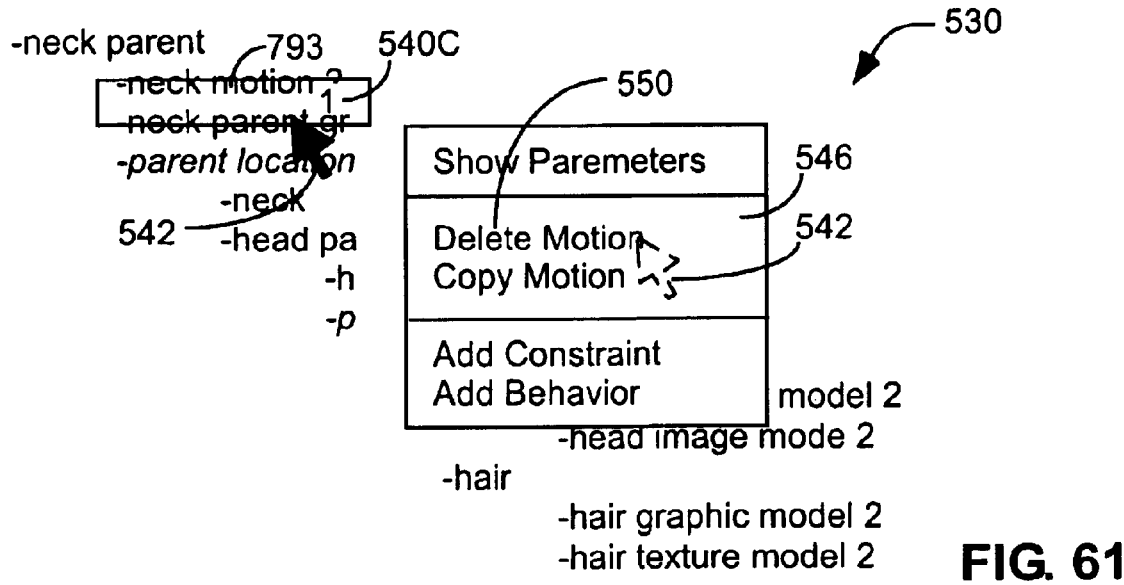
Figure 62:
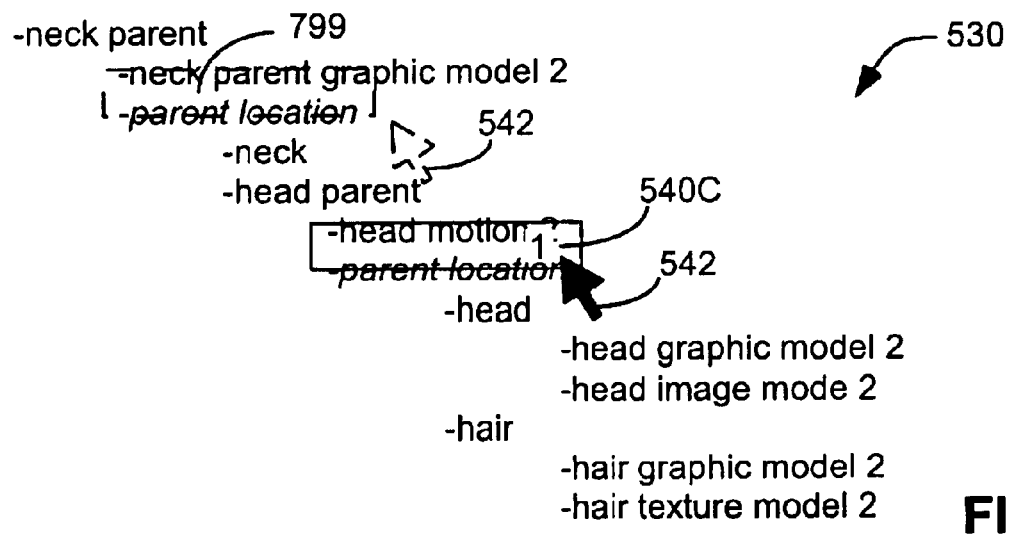
Figure 63:
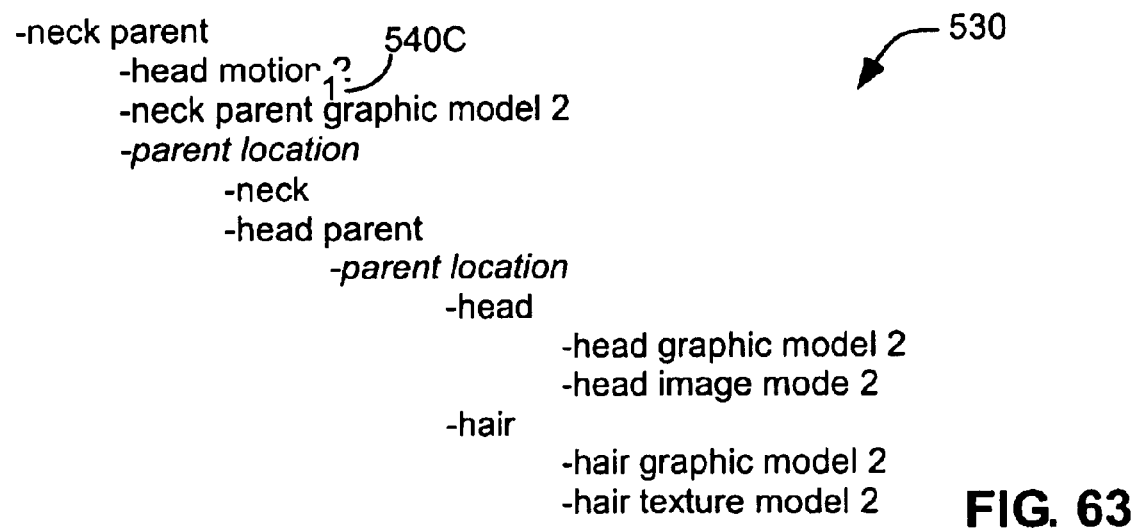
Figure 64:
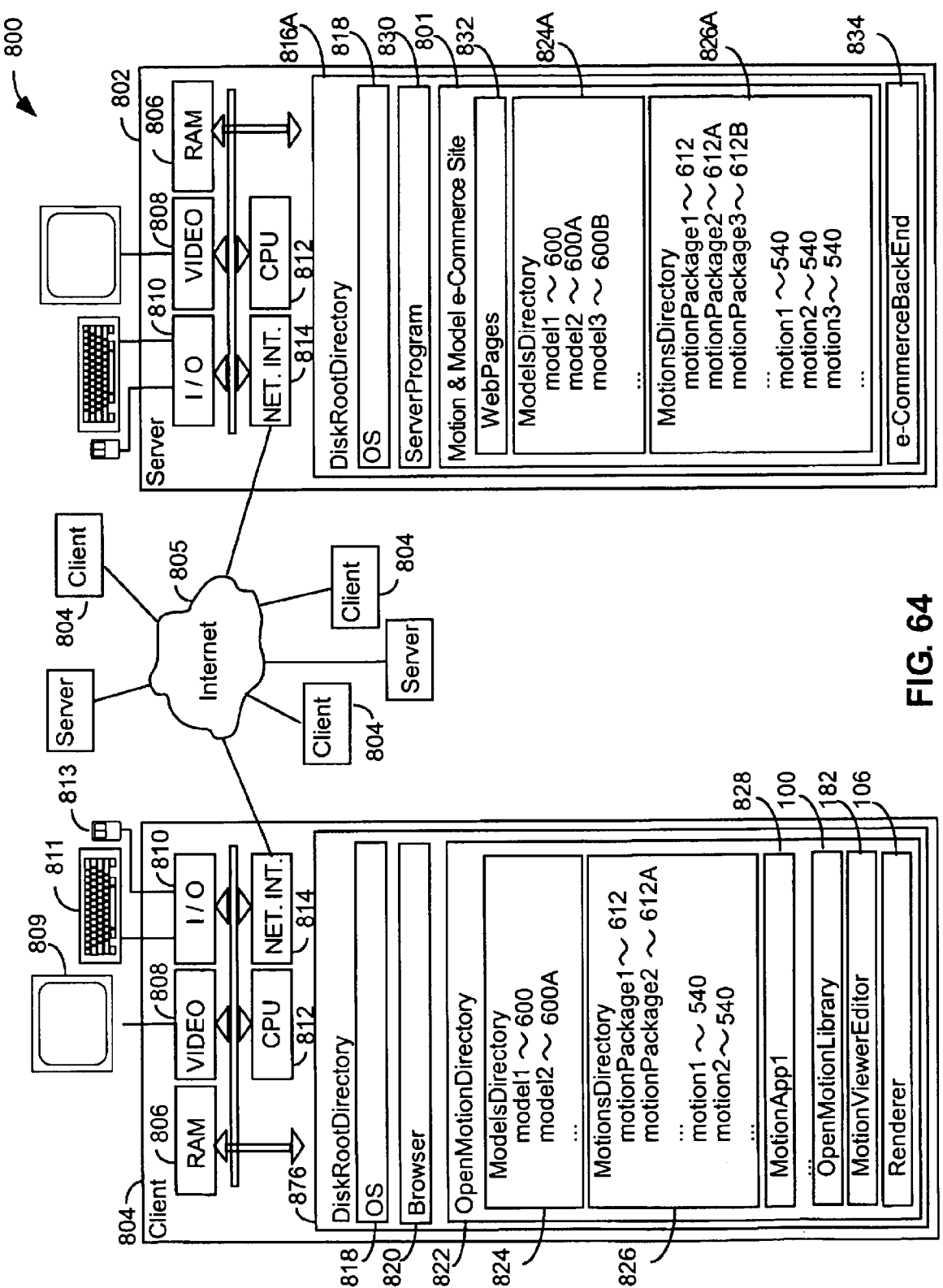
Figure 67:
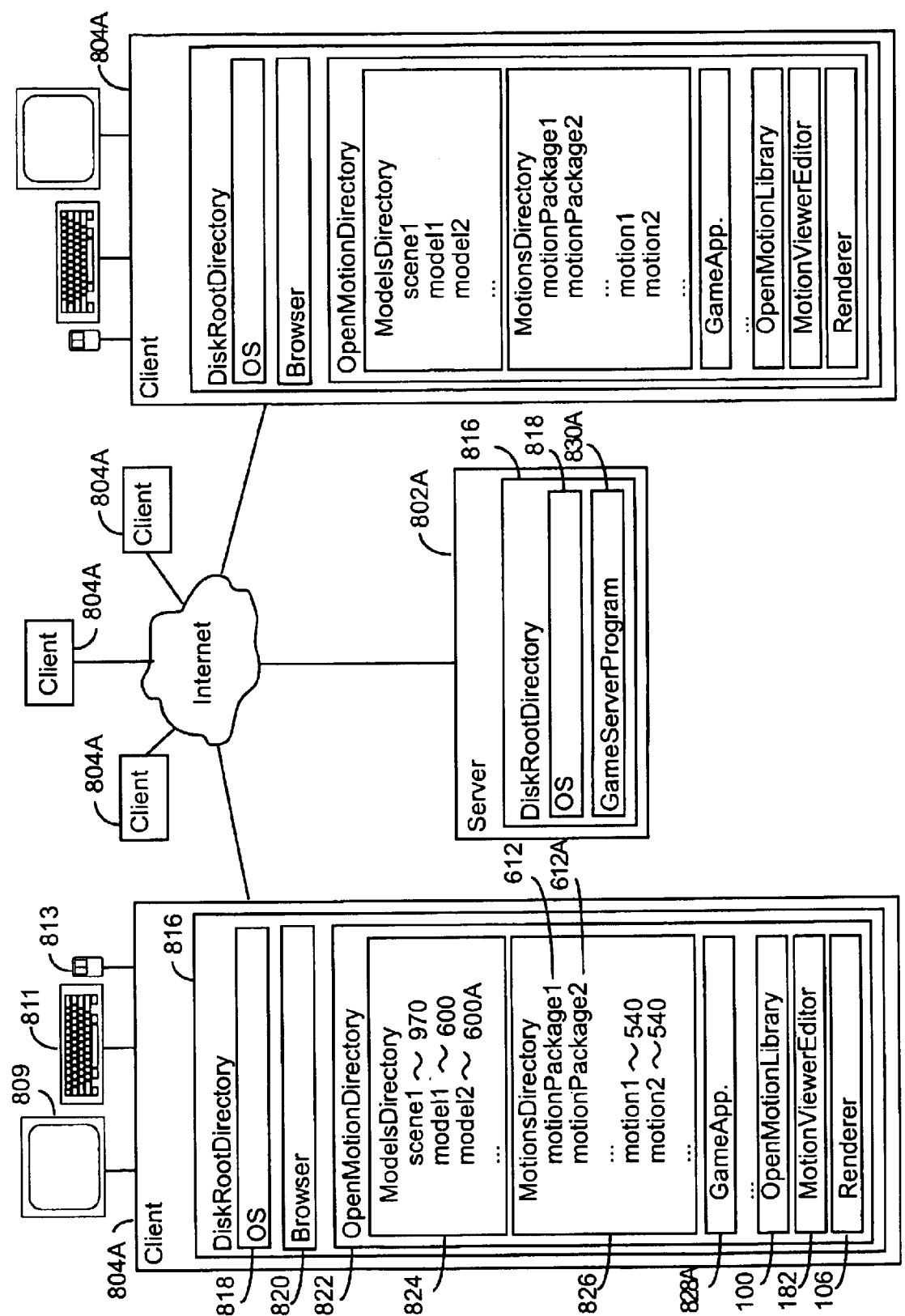
Figure 71:
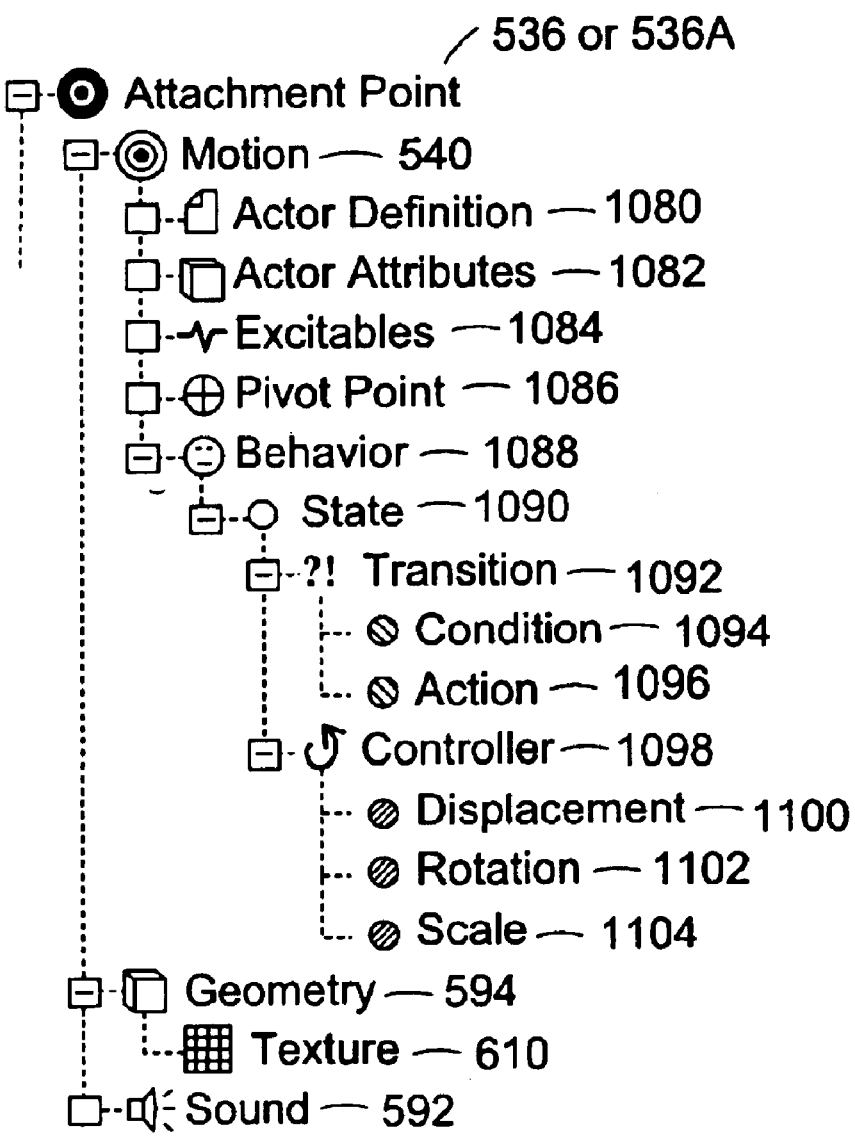

FIG. 35 and FIGS. 36A and 36B provide tree view graphs of the hierarchical model illustrated in FIGS. 33 and 34;

FIGS. 37 through 44 are similar to FIG. 34 except that each illustrates a different aspect of the user interface provided by the Mojo motion editor;

FIG. 45 is similar to FIG. 34 except that it illustrates the Mojo interface when a 3D hierarchical model of a bee is displayed, and the tree view graph illustrates a sound node and several graphic model nodes attached to the bee model;

FIG. 46 displays a tree view of a model, belonging to a class of simplified humanoid models;

FIG. 47 illustrates the appearance of the simplified humanoid model shown in FIG. 46;

FIGS. 48 and 49 are similar to FIGS. 46 and 47, respectively, except they are for a different model from the same class of simplified humanoid models;

FIGS. 50 and 51 illustrates two different motion package is, each of which is designed for use with models of the simplified humanoid class illustrated with regard to FIGS. 46 through 49;

FIGS. 52 and 53 are tree views of the model shown in FIG. 48 after the motion package is a FIGS. 50 and 51, respectively, have been attached to it;

FIG. 54 is similar to FIG. 45 in that it shows the same bee model, but in FIG. 54 the tree view graph is expanded to show all the model nodes within the hierarchical bee model;

FIG. 55 is similar to FIG. 54 except that it shows the tree view graph of the bee model after a complex motion package has been added to it;

FIGS. 56A, 56B, and 56C provide a highly simplified pseudo code description of some of the programming of the Mojo motion editor;

FIGS. 57 through 60 provide highly simplified pseudo code descriptions of subroutines called by the programming of FIGS. 56A through 56C;

FIGS. 61 through 63 illustrates how motions can be deleted from and/or dragged to different locations within Mojo's tree view window;

FIG. 64 is a simplified schematic diagram of a system for selling and buying 3D motions and models over a computer network, such as the World Wide Web;

FIGS. 65 and 66 illustrate steps performed by the e-commerce client and server computer, respectively, illustrated in FIG. 64;

FIG. 67 illustrates in networked computer system allowing multiple users at different computers to share interactive 3D models and motion, such as for use in a computer game;

FIGS. 68 and 69 illustrate steps taken by the client computers and server computer shown in FIG. 67, respectively;

FIG. 70 illustrate steps which can be taken by a computer application to automatically changed the motion package associated with a 3D model in response to program instructions; and FIG. 71 illustrates additional user interface features that can be provided with a tree view graph according to certain aspects of the present invention.

6. DETAILED DESCRIPTION OF PREFERRED EMBODIMENTS

6.1 Overview

6.1.1 The OpenMotion System

Figure 1:
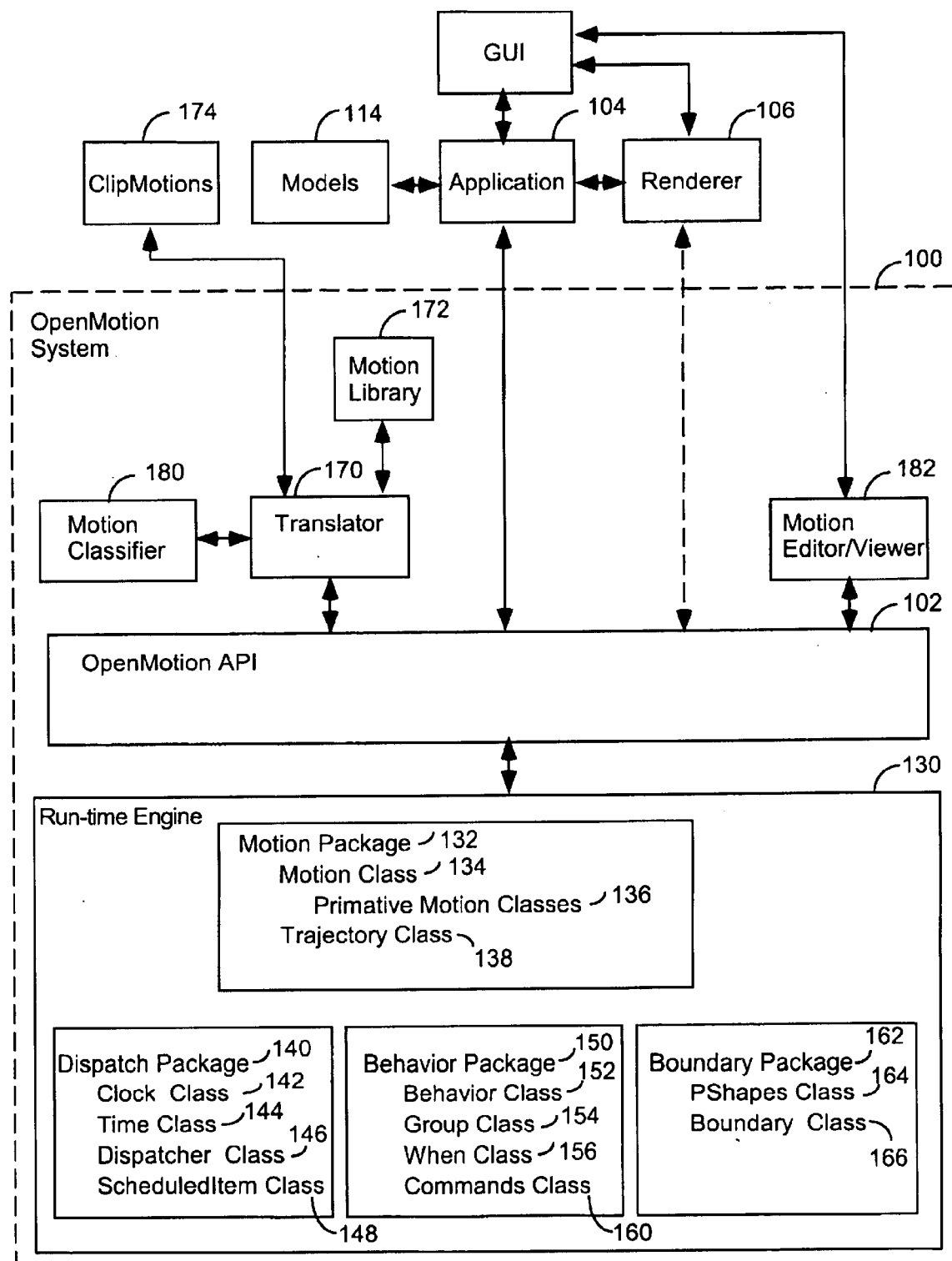
FIG. 1 is a simplified schematic block diagram of one embodiment of the invention, the OpenMotion™ System.

The embodiment of the invention described in greatest detail in this application is the OpenMotion ™ System (or the "System"). FIG. 1 provides a simplified overview of the OpenMotion System 100. The System is a collection of software modules which is being produced by 3D OpenMotion LLC, the assignee of this provisional application. OpenMotion, ClipMotion, and eMotions are trademarks of 3D OpenMotion LLC. As of this writing many of the features described below are currently written and operating. Others of these features are expected to be operating soon.

The OpenMotion System provides a dedicated mechanism for the creation of basic and sophisticated interactive 3D motions independently of any specific object or geometry and independently of any specific rendering environment. These motions can be edited, extended, blended, stored, retrieved, imported and exported and can be independently attached to any number of different 3D objects using the System.

6.1.2 The API and its Relation to Application, Modeling, and Rendering Programs The System includes an Application Program Interface ("API") 102 used for creating and invoking 3D motion and 3D interactive motion control capabilities and their constraints (spatial and temporal), independently of, but in association with, existing or new 3D modeling and/or 3D rendering development environments. Currently the System is written in C++, and an application program 104 which uses the System interfaces to it largely through the C++ API which is defined in greater detail below.

Figure 2:
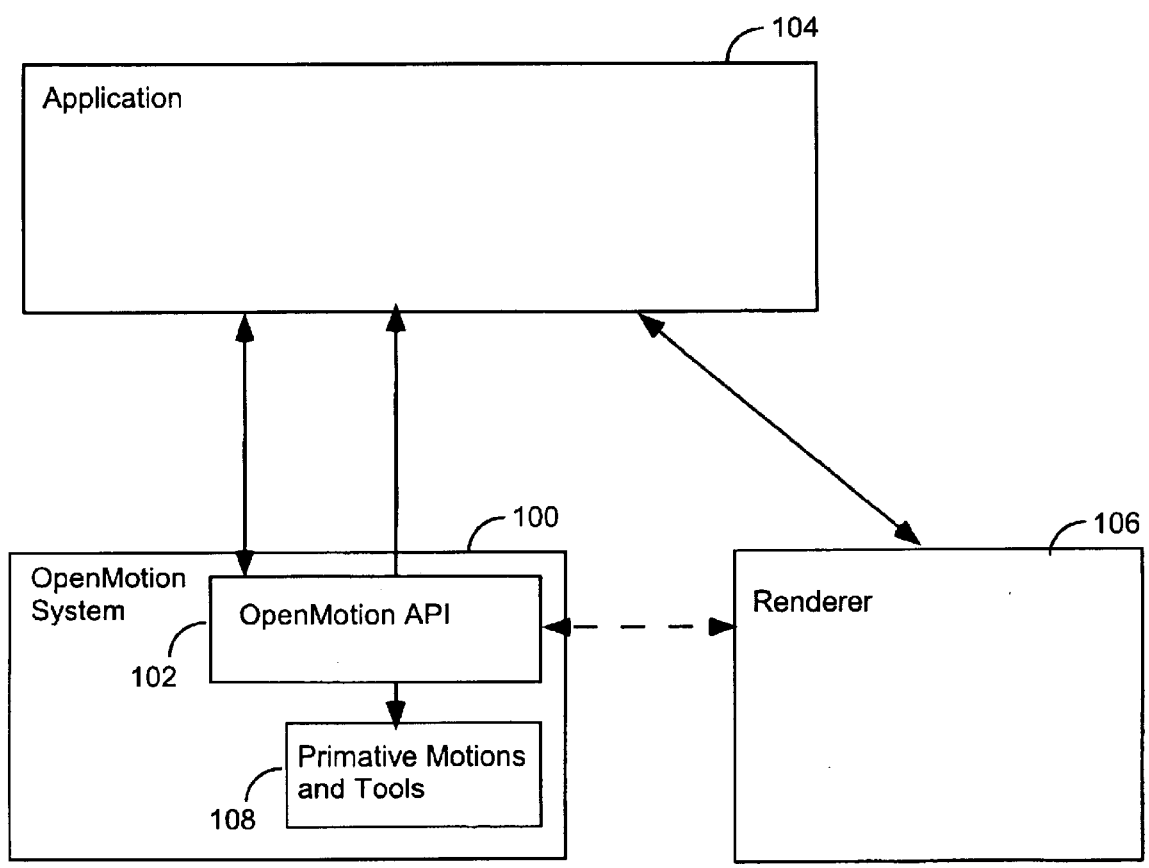
FIG. 2 is simplified schematic block diagram of a possible relationship between the OpenMotion™ System, an application program, and a 3D rendering program.
Figure 3:
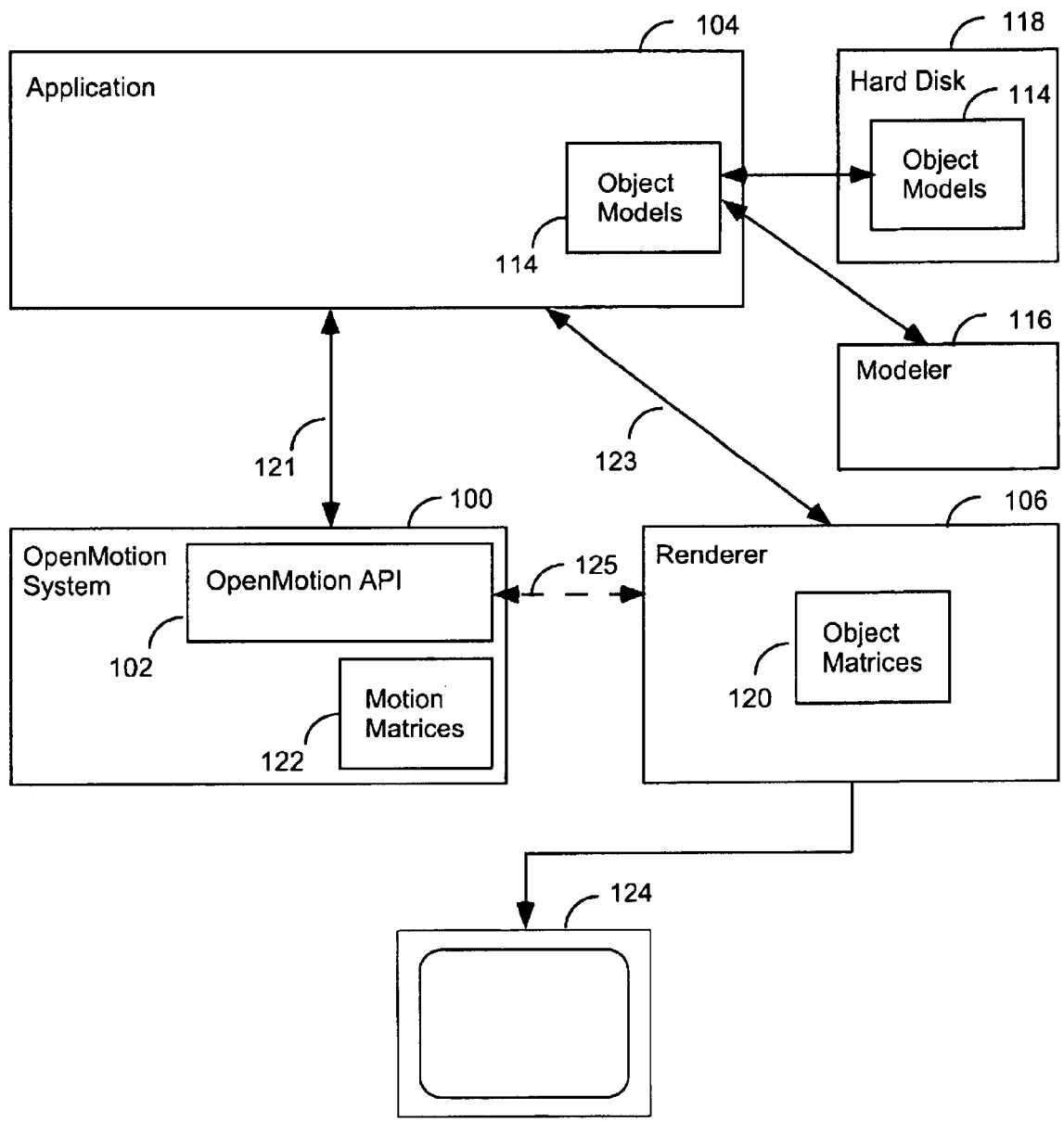
FIG. 3 is another simplified schematic block diagram of the possible relationships between programs shown in FIG. 2, illustrating some of the representational information used by each program.
Figure 4:
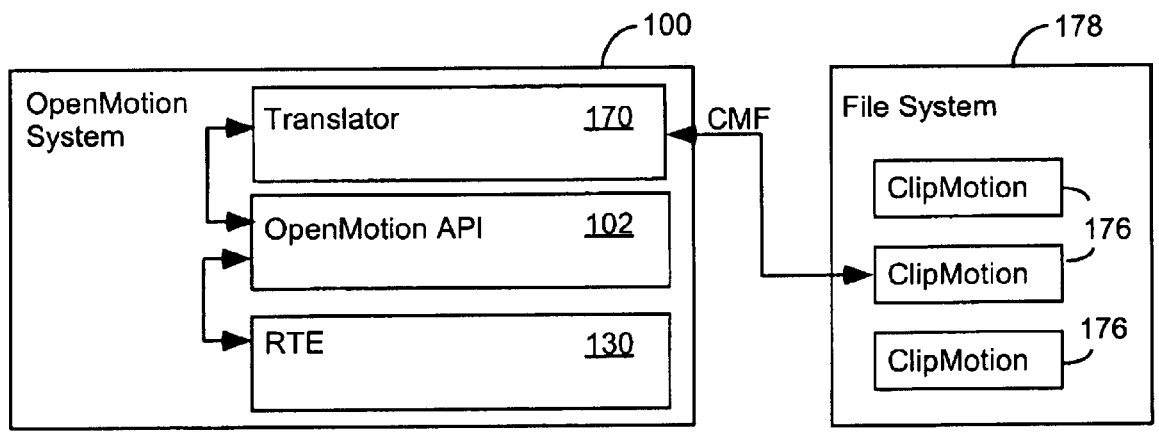
FIG. 4 is a simplified schematic block diagram of the interface between the OpenMotion™ System and motions stored in a file storage device.
Figure 5:
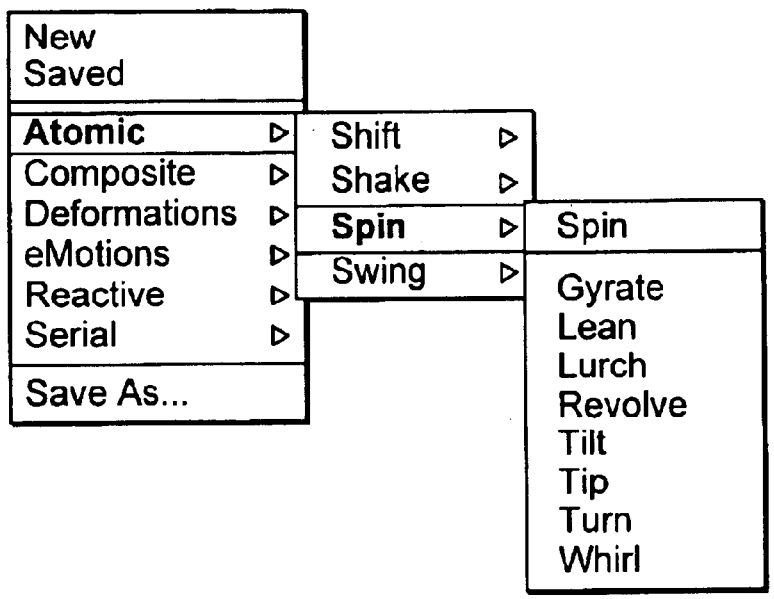
FIGS. 5–8 illustrate pop-up menus for use with the OpenMotion System's Motion Editor/Viewer.
Figure 6:
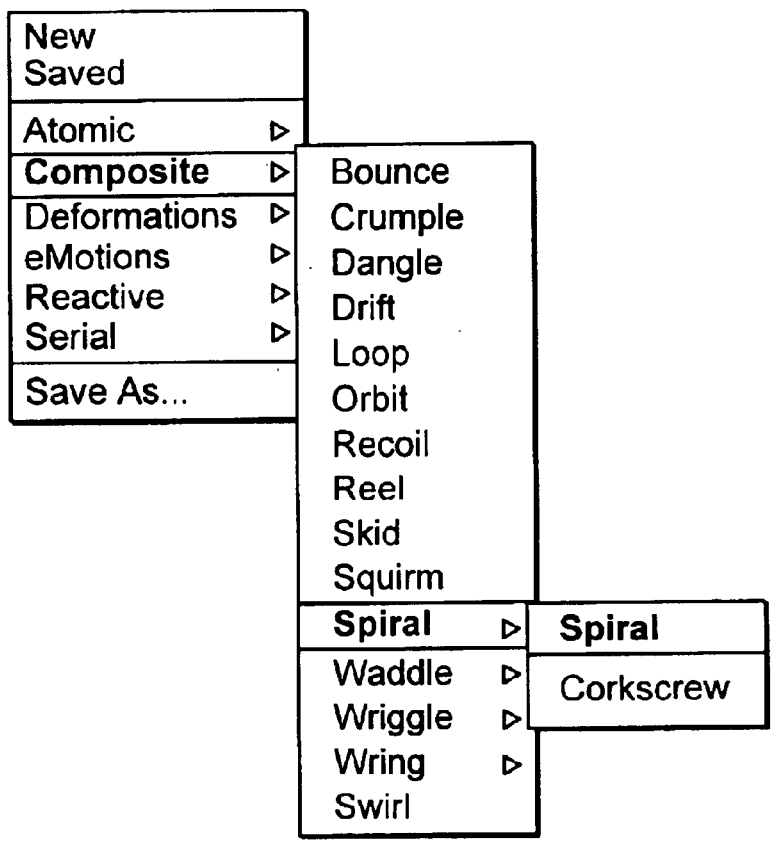
Figure 7:
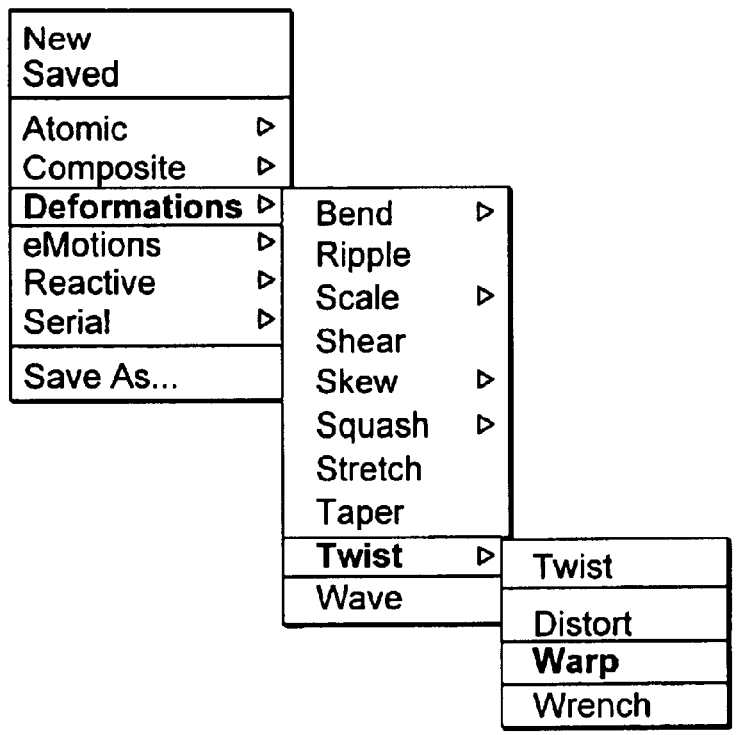
Figure 8:
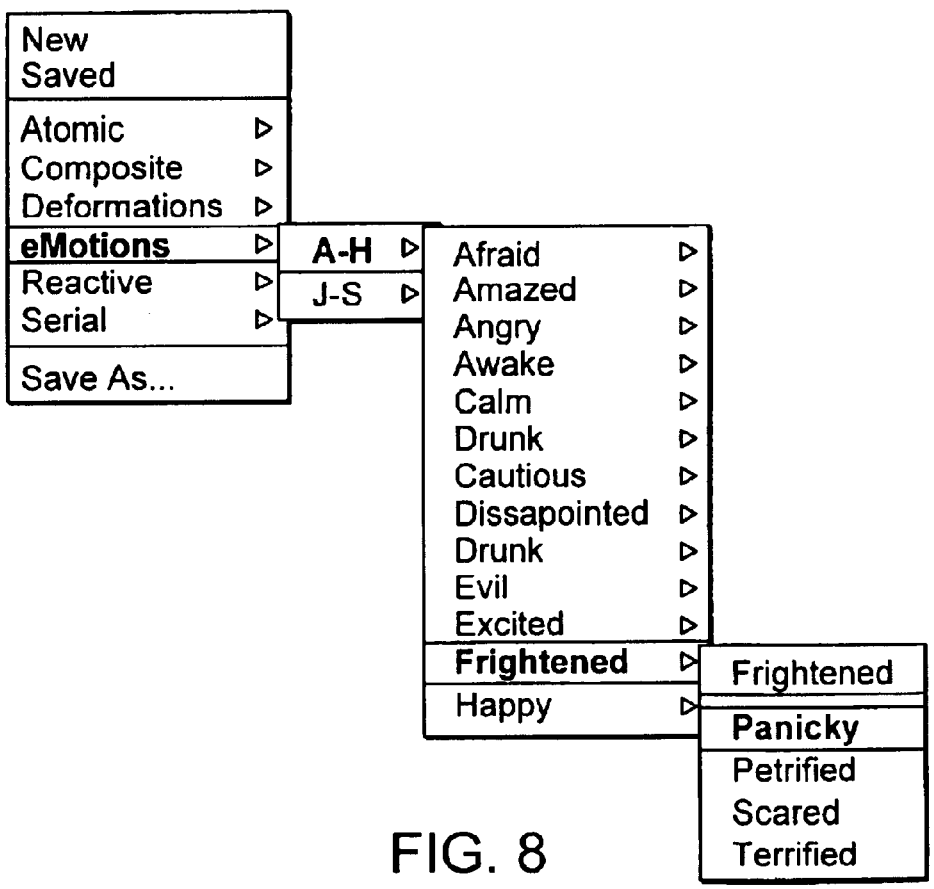
Figure 9:
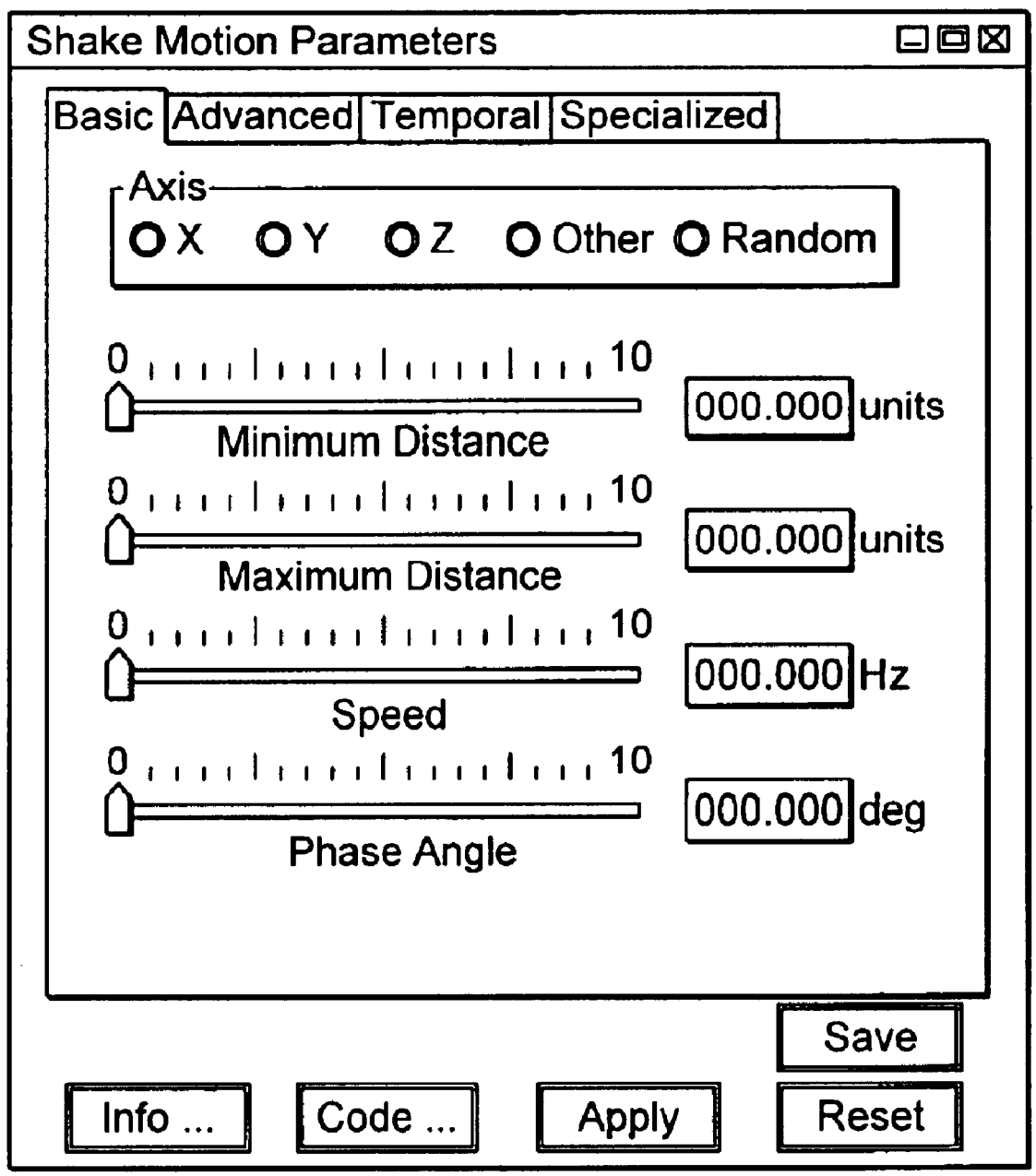
FIGS. 9–12 illustrate, respectively, the Basic, Advanced, Temporal, and Specialized tabs of the Shake Motion dialog box provided by the Motion Editor/Viewer.

FIGS. 3 and 4 illustrate some of the ways in which the System can be used by an application program 104 in conjunction with a rendering program 106. The application program can be any program, whether written by an individual or a software company which models 3D spaces. As shown in FIG. 2, the application program interfaces with the System through the API, by defining motion related objects, variables, and constants through the API and by calling API functions. This includes using the API to define, combine, or manipulate primitive motions 108, shown in FIG. 2. Primitive motions are basic pre-defined motions which are part of the System.

In FIGS. 1–3, the application program 104 uses a separate rendering program 106 to perform the graphic rendering of the 3D world that it is modeling. Although the System can be used easily by an application that performs its own rendering, many of the applications which it is used will use have a separate rendering program perform the task of manufacturing screen images of the 3D worlds they are modeling. This is because drafting the programming for efficient 3D rendering is difficult, and excellent rendering programs are available from several third party vendors, such as OpenGL from Silicon Graphics and Direct3D from Microsoft. Application programs use such third party rendering programs through an API.

An application 104 which is using the OpenMotion System and a separate rendering program 106 can communicate to the OpenMotion system and to the Renderer, as is indicated by the solid arrows in FIGS. 2 and 3. Alternatively, the application could instruct the OpenMotion System to set variables directly in the renderer, as is indicated by the arrow 112 shown in broken lines in FIGS. 2 and 3.

As is shown in FIG. 3, the Application 104 maintains 3D object models 114. These models may have been purchased, authored by an individual user, coded as part of the application program 104, or created by a third party modeling program 116. Creating such models with third party modeling programs, such as SoftImage by AVID Technology Inc. or 3D Studio Max by Kinetix, a business unit of Autodesk Inc., often makes sense, because such programs often greatly increase the speed at which 3D models can be made. Normally, once these models have been created, they can be stored on a mass storage device, such as the hard disk 118 shown in FIG. 3, and then read back into the application program 104 as desired.

Commonly the rendering program 106, maintains a representation of these 3D objects including object matrices 120 which represent the position and orientation of each object model in 3D space. The OpenMotion System also represents the spatial attributes of each 3D object whose motion it is to model in a set of motion matrices 122, which represent the spatial attributes of each object, such as its 3D position, 3D orientation, and scale. Normally the application 104 tells the OpenMotion System the initial spatial attributes, the motions, the boundaries, and the rules for motion interaction for each of its object models. This is indicated by the arrow 121 in FIG. 3. Then it asks the OpenMotion System to give it the updated value of the spatial attributes of each such object at each screen redraw time. This is also indicated by the arrow 121. Then the application provides this information to the renderer program 106. This information flow is indicated by the arrow 123 in FIG. 3. The renderer then calculates a screen image of the objects, given their just-updated spatial attributes. The renderer then sends this updated screen image to the computer screen 124, where it can be seen by a user of the application.

Some applications and some renderers may allow the renderer program to directly obtain updated positional or other attributes for the modeled objects from the OpenMotion System. In such a case the information flow between the renderer and the OpenMotion System is indicated by the arrow 125 in FIG. 3, which is drawn with a broken line to indicate that it is not always used.

The application programs with which the OpenMotion System can be used can be of virtually any type. For example, it is possible that the program might even be used with application programs that do not even require 3D rendering. This might be the case where the application program is performing physical modelling not to produce a visual output, but rather to obtain simulated test results, and uses the OpenMotion system to perform the motion computation of the objects it is modeling.

6.1.3 The Run Time Engine

The basic functional code of the System is called the Run-time Engine 130, shown in FIG. 1. The Run-time Engine ("RTE") contains all of the functions, types, and classes which are accessible through the API 102 as well as some which are accessible only from within the code of the RTE itself.

The RTE contains pure motion and kinematic algorithms (referred to as the "The Math Engine" or TME) for both basic and complex 3D motion generation and control. These include algorithms required for: a) procedural or pre-defined motion generation and control such as in 3D animation creation; b) interactive motion and motion control such as in real-time manipulation and navigation; and c) behavioral or responsive motion and motion control such as in proximity, flocking, blending and time-sensitive (temporal) situations.

FIG. 1 shows some of the more important object oriented classes in the RTE, and how they are divided into object oriented groups, called packages.

The motion package 132, includes the motion class 134, sub-classes of the motion class called primitive motion classes 136, and the trajectory class 138. The motion class is the class which is used to defined the motion of an object. Each object for which the OpenMotion System is to compute a motion is given an instance derived directly from the motion class or from a subclass of this class. The motion class is accessible through the API and is explained below in greater detail. The primitive motion classes are sub-classes of the motion class which model particular types of relatively simple motions. These primitive motion classes come predefined as a standard part of the System. Many of them are explained in greater detail below. The trajectory class are used to define the path through space defined by a motion over a given portion of time.

The dispatch package 140 is a group of related classes which the RTE uses to update motions, schedule events, and represent time. These include the Clock class 142, the Dispatcher class 146, and the ScheduledItem class 148. The clock class is used to define a computational object which represents the passage of time. The dispatcher class determines the order in which Behavior, ScheduledItem, and Motion class instances are updated. The ScheduledItem class, defines items which require updating at a given time.

The Behavior package deals with state changes and various predicates. This includes the Behavior class 152, the Group class 154, the When class 156, and the Command class 160. The Behavior class 152 controls and changes the spatial attributes of a motion, including the first and second derivations of at least some such attributes. This class is accessible through the API and is defined in much greater detail below. The Group class enables behavior commands to be grouped together. The When class monitors an OpenMotion-defined predicate that controls state transitions. The Command class is an encapsulation of certain actions, such as the setting of a spatial controller.

The boundary package 162 deals with boundaries. The boundary class 166 defines surfaces and volumes with which motions can interact. It is accessible through the API and is discussed in more detail below. The pShape class 164, which stands for "primitive shape", is a class used by boundary predicates, that is, predicates that test whether or not a given point, such as that associated with a motion, has a particular spatial relationship with a boundary. Such predicates are described in greater detail below in section 6.2.7.5.

6.1.4 The Motion Translator, the OpenMotion Format, ClipMotions and the CMF

The System also contains the Motion Translator 170, shown in FIG. 1. This includes an interpreter for reading, and a translator for writing, statements in the OpenMotion Format, a language and file format described in more detail below. The OpenMotion Format enables one to make statements which are equivalent in their effect on the OpenMotion System to virtually any statements which can be made using the C++ OpenMotion API. The OpenMotion Format allows statements to be made which are interpreted, and, thus, do not require compilation. Its statements can also be stored on disk and then interpreted by the Translator in real time, as desired by an application program. The translator's interpreter parses the OpenMotion Format and then calls the corresponding functions of the API.

The ClipMotion Format ("CMF") is a subset of the OpenMotion Format used for the efficient storage, retrieval, and classification of motions created using the OpenMotion System. Files written in CMF which record motions are called ClipMotions. The OpenMotion System will normally include a ClipMotion Library 172, which defines a relatively large number of motions. A user or an application developer can create more ClipMotions 174. When a ClipMotion file is read and translated by the Motion Translator, the Translator will interpret the file into a set of corresponding calls to the OpenMotion API.

FIG. 4 is a simplified block diagram showing how ClipMotions provide for persistance in the definition and specification of motions in the OpenMotion System, by allowing motions to be read from and written to a mass storage device 178. These saved Clipmotions 176 shown in FIG. 4 can included the ClipMotion Library 172 of FIG. 1, which comes as part of an OpenMotion System, as well as the new ClipMotions 174 of FIG. 1, which are programmed by a user, by an application programmer, or, in the future, by third-party ClipMotion vendors.

Some embodiments of the System will include a Motion Classifier 180. The Classifier 180 will sort motions created using the API or read from an external source into discrete classes. The classification used by such sorting can be used to label motions and ClipMotions, and to sort them when stored in a file system. For example, motions can be classified as to whether they are primitive or composite, as defined below, by what motion classes they are derived from, or by the class of motion-enabled model they are designed to provide motion to, such as four legged animals. These motions are accessible for assignment to any objects in different programming environments that contain the OpenMotion System. For example, all kinds of motions for specific types of objects such as animals, vegetation, terrain vehicles, flying vehicles, flags, balls, people, two legged animals, insects, fish, monsters, etc., can be generated. Similarly different classes of motions such as walking, jumping, flying, spinning, or combinations of these can be created.

The OpenMotion System also includes a class of motions that represent emotions, called ClipEmotions. These are a specific class of ClipMotions that, through motion, characterize emotional behavior like "doze-off", "act frightened", "act disappointed".

6.1.5 Motion-Enabled Objects

The invention includes the extension of the OpenMotion Format to provides for the storage and access of Object Models. A motion-enabled object is one that is modeled in such a way as to facilitate the addition of separately defined motion to it and its parts. For example, a motion-enabled object representing a four legged animal will contain sufficient information to instruct the System how to connect it to any ClipMotion designed to provide motion to such a model. The motion-enabled object is built in a hierarchical manner with a classic tree structure that contains additional information at each of the nodes. This additional information, or metadata, incorporated in the model or added to the model facilitates the attaching of motions in an intelligent manner. The metadata includes the object's physical structure, its hierarchical structure, its geometry, its pivot points, and various coordinate systems. For example in the case of the fish, each connected pair of parts is built as a ball and socket pair. It is intended that representations of all this information will be supported by future extensions to the OpenMotion Format.

We have identified a number of items that are part of the motion-enabling of models and these include the hierarchy structure (node structure and naming), pivot point specification, axes normalization (X, Y, or Z), and scaling information.

A motion-enabled model may be directly connected to a ClipMotion file. It is possible that the object with which a motion has been associated may change its form as an application progresses, or that a user or application might well try to apply a motion to an object having a very different structure than the structure of the class of objects for which it was originally designed. For example, a user might apply a ClipMotion file representing a fish motion to an airplane motion-enabled model. There will be rules which provide for mapping the object hierarchy of a ClipMotion to node hierarchy of a motion-enabled object, when those two hierarchies do not have the same structure.

We call a motion-enabled model and its associated motion Motion Art.

6.1.6 Encryption

The design of the OpenMotion System provides the equivalent of a "watermark", an encryption technique, in our ClipMotion, motion-enabled object, and Motion Art format. This will help in guaranteeing that models can be owned and that purchasers with the right key could have access. This will also support making models available only for certain application but not others. This should help provide incentive for the development of a rich and varied collection of ClipMotions and motion-enabled objects.

6.1.7 Motion Editor/Viewer

The Motion editor/viewer 182, shown in FIG. 1, is a part of the OpenMotion System which allows programmers to interactively access, view and edit motions, whether these motions are created by programming in C++ or have been recorded in the ClipMotion Format. The motion editing dialog boxes described below are a subset of this interface

6.1.8 Description of the Types of Motions Supported by the System

Tables 1, 2, and 3, below, respectively, show some of the Procedural Motions and Kinematics, some of the interactive motions, and some of the behavioral. motions which are included in the design of the OpenMotion System.

TABLE 1

Procedural Motions and Kinematics

| Application | Key Features | Examples |
|---|---|---|
| Procedural Motions and Kinematics | | |
| Autonomous rigid motion | 3D motions are defined by mathematical functions. | Projectile motion, harmonic motion, orbital motion |
| Articulated linkages | Hierarchical motion. | plants, robots, characters |
| Simple constraints | Limits to motion. | balls bouncing in a box, door stops, chair rolls on floor |
| Events | Actions occur periodically and at scheduled times. | cukoo clock |
| | | Allows users to select a 3D scene, populate the scene from a set of pre-defined objects and characters, and set typical screen-saver parameters. When the application is executed, the motions associated with the objects and characters exhibit constantly changing and appealing activities. A Spaceball can be used to move the viewpoint. Example: a motion viewer with tropical fish tank, funny fish tank, holiday scenes. |

TABLE 2

Interactive Motions

| Application | Key Features | Examples |
|---|---|---|
| Interactive Motions | | |
| Spaceball | 6DOF velocity controller. Use existing drivers as template. | 6DOF object control, viewpoint control |
| Mouse | 2DOF locator, 6DOF emulation | Pick objects on screen, attach predefined motions |
| Keyboard | Button device | Text input, function keys |
| Record and Playback | Define keyframe animations | User can define a path that is to be used for camera fly-through using Spaceball. |
| Preliminary ClipMotion storage format | Save and restore procedural motions and keyframe animations. | create predefined motions |
| | | Users combine graphic objects and ClipMotions, creating motion-enabled content used in presentations and other applications. The user may have the ability to modify existing parameters of motion, but not to create totally new types of motions. A class of products aimed at putting 3D motion on the business desktop. A plug-in would work with popular business applications such as Word, WordPerfect, PowerPoint, CorelDraw, Excel, Netscape, etc. It would contain functionality for 3D text, charts, and presentation animations, as well as support for the Spaceball. User can define scenes with pre-selected objects and attach more complex motions. Some motions parameters are made visible to the user for editing. |

TABLE 3

Behavioral Motions

| Application | Key Features | Examples |
| --- | --- | --- |
| Behavioral Motions | | |
| Proximity | Relative distance between objects | |
| Follow | Behavior characterized by the proximity relationship among objects | follow, avoid, look-at, go-to |
| Flocking | Group behaviors | flocks of birds, schools of fish, herds of cattle |
| Motion blending | Assign weighting functions to a linear combination of motion | transitions between walk, run, jump |
| Paths and path constraints | Define paths with key frames & interpolating function. Simplify motion capture data with compact representation | scripting |
| Revised ClipMotion format | Save motions that include behavior | |
| | | 3D Games incorporating highly-interactive motion content, comprising both educational and entertainment product categories. Motion Editor to create and edit new ClipMotions, encapsulate and export them to other applications. |

6.2 OpenMotion API Programmer's Guide

The OpenMotion API 102, shown in FIG. 1, is a C++ class library made available to programmers by the OpenMotion System for incorporating motion into real-time interactive 3D applications. The API provides a powerful and flexible set of functions for adding motions to applications.

6.2.1 Scope

The OpenMotion API is designed to work with 3D applications, such as the application 104 shown in FIG. 1, without trying to become the center of an application's architecture. It does not provide graphic rendering. It is independent of and compatible with any graphic API or game engine the programmer may choose. It does not incorporate physical dynamics. It does provide general-purpose motion parameters that may be driven interactively or under control of the application. These parameters may be linked to variables representing anything ranging from game play to a physical simulation.

6.2.2 Overview

The OpenMotion API comprises a set of C++ classes that the programmer uses to do the work of motion calculations, including synchronization, interaction, and update of multiple simultaneous motions. The classes implement new data types that are declared in the program code. Expressions embedded in the program using these types are, updated automatically during motion processing.

Although OpenMotion API has an object-oriented class architecture, it is neither intended nor necessary for the programmer to derive new classes from OpenMotion API base classes. Instead, OpenMotion API provides a complete set of flexible types that can be reconfigured to any situation. If necessary, the programmer may extend OpenMotion API by supplying callbacks that add application-specific functionality.

6.2.2.1 Namespace

The classes and functions that comprise OpenMotion API are declared in a header file:

include "om.h"

Naturally, class names used in the OpenMotion API are not completely unique. To avoid the chance that other APIs or the application might use the same names, we use the C++ namespace feature. All OpenMotion API classes and functions are encapsulated. in a namespace. In most cases, the application program simply declares use om; and the OpenMotion API can be accessed directly. In the event of a naming collision, the programmer qualifies OpenMotion API names with the om::scoping operator.

Within this document, the scoping operator om:: indicates a class or function that is visible at global scope. Member values and functions are indicated by the scoping operator for that class, e.g., Motion::

6.2.2.2 Update Loop

At the top level, most applications, such as the application 104 shown in FIGS. 1–3, have some kind of update loop. In many circumstances, this loop is part of the application program. In other situations a graphic API or game engine supplies the update loop, and the application supplies a callback function. OpenMotion API is compatible with both cases.

6.2.2.2.1 Loop in Application

OpenMotion API is integrated into an application which can be programmed to call its functions directly using one or two function calls:

```
while (!done) // application's update loop
{
    // . . . application-specific code here . . .
    om::update( ); // required: update all motions
    // . . . graphic display-list updates here . . .
    om::frame( ); // recommended: mark end of graphic-
        update The first call, om::update( ), is required. It
        performs all the actions and motion calculations for
        the next update. The second call, om::frame( ), is
        recommended. This call is normally used to provide
        OpenMotion with an indication of the actual time at
        which the objects for which it has calculated posi-
        tions are shown to users on the screen 124 shown in
        FIG. 3. Thus, it allows OpenMotion API to compen-
        sate for latency in the update cycle due to both
        application and graphic processing time, by delaying
        the actual time for which it calculates the position of
        objects to reflect such delays. If om::frame( ) is not
        used, the motions will not be affected, but the display
``` will lag behind the time for which OpenMotion calculates positions by the graphic and application update latency.

The above programming represents one way of achieving part of the information flow indicated by the arrow 121 shown in FIG. 3. After om::update( ) updates the frame, the application would then ask the API for the spatial attributes for each object or sub-object in the display list, as indicated by the comment after the call to om::update( ), and then call the renderer 106 over the communication path represented schematically by arrow 123 in FIG. 3 to render the display list.

6.2.2.2.2 Loop in Graphic System

Many graphic programs, such as commercial, graphic system or game engine, interface with other programs though callbacks. This is commonly the case for commercial program which are sold in object code form, and, thus, which cannot be programmed to include calls to OpenMotion. With programs which use a callback architecture, OpenMotion API can be integrated like this:

```
void app_update (. . .)//the application-defined callback
{
    om::frame(); //recommended: mark end of previous frame update
    // . . . application-specific code here . . .
    om::update(); //required: update all motions
    // . . . graphic display-list updates here . . .
}
```

This code represents another way of communicating between the programs shown in FIG. 3.

Simulation Clock

The OpenMotion API internally maintains a simulation clock. This clock can be configured by the programmer as a real-time clock, or as a fixed-increment frame clock. A unique instance of the class Dispatcher 140, shown in FIG. 1, maintains the Clock (see table 4 below), which is an instance of the clock class 142 also shown in that figure. The simulation time begins at zero when the system is initialized and increases monotonically.

The real-time mode is recommended for most interactive applications, and it is the default configuration. The fixed-increment mode is useful for debugging and certain animation applications.

The simulation clock can also run faster or slower than real-time, by configuring a speed factor.

TABLE 4

Simulation clock controls

| Dispatcher:: | Return type | Description |
| --- | --- | --- |
| simTime() | Scalar | The current simulation time. |
| clock() | Clock& | Get a reference to the clock. |
| Clock:: | | |
| pause () | Clock& | Detach from real-time clock (fixed-increment mode) |
| resume () | Clock& | Attach to real-time clock (real-time mode) |
| step ( size ) | Clock& | Set fixed-increment size (default: 1 sec.) |
| factor ( f ) | Clock& | Set clock speed factor (default: 1 => real time) |

6.2.3 Principal Types

There are three principal families of classes in the API. Various specialized classes are derived from these families.

I. An instance of the motion class, or motion, contains state information for multiple spatial degrees of freedom, such as translation, rotation, and scaling which can be associated with an object. Each degree of freedom has a characteristic trajectory. Motions may be combined by expressions that specify hierarchical parent-child relationships, expressions that specify blending of simultaneous motions, and expressions that extract attribute information.

II. An instance of the behavior class, or a behavior, is used as a parameter of an instance of the motion class. A motion's behavior describes how one or more degrees of freedom changes over time. Behavior expressions can specify a state machine in which each state has a set of initializing actions, and a set of transitions.

The actions set up the controllers for the motion using that behavior. The state transitions are triggered by predicates, expressions, and callbacks.

III. An instance of a boundary class, or a boundary, is geometrical entity defining a surface or volume that can interact with one or more motions. A motion may have a boundary attribute, which defines a surface or volume that travels with the point defined by the motion's position attribute. A motion's boundary attribute. is commonly used to model the surface of the object being represented by a motion.

The programmer specifies interactions in terms of boundary predicates that are combined in Boolean. expressions to form triggers. The programmer may use boundaries to represent graphic objects, or the boundaries may represent virtual objects or regions of space.

These principal types, together with Vars discussed below, have built-in memory management, so that memory is automatically deallocated when the object is no longer used.

6.2.4 Expressions

Expressions, referred to as "algebraic expressions" above, may be regarded as the "cables" that interconnect the elements of the motion model. The programmer uses expressions to link motions, behaviors, and boundaries to each other, and to transmit data to and from application-specific code. Expressions look just like regular arithmetic operations; they differ because OpenMotion API retains each expression, and defers the actual calculation until the results are needed. Then the expression is automatically evaluated, and the results are passed on to any other expression that might require the information using an "observed-observer" architecture, somewhat similar to that used to propagate related changes through a spreadsheet.

When an expression is used as input to one of the principal types (i.e., motion, behavior, or boundary) it is called a parameter. A parameter is a configurable value or expression that affects the character of an object.

A characteristic or output of a principal type is called an "attribute". An attribute is a value that is derived from the current state of an object. Functions are provided to extract attributes from objects. In general the form object.attribute( ) returns a value, whereas the form attribute( object ) returns a Var expression. This is explained further in the next few sections.

6.2.4.1 Values

The simplest kind of expression is a value. The OpenMotion API has its own arithmetic value types:

Boolean. True or False.

Scalar. Representation of a real number.

Vector. A 3D vector implemented in terms of Scalar.

Quaternion. An arithmetic entity uniquely suited to represent orientation.

Matrix. A 4×4 homogeneous transformation matrix.

Value types are generally available to the programmer for use as automatic variables anywhere in the application. A full complement of basic math functions (table 5) and C++ operators (table 6) are overloaded and behave as expected. Operations among these types provide immediate numerical results.

TABLE 5

Math functions.

| Type family | Function | Result | Description |
|---|---|---|---|
| Scalar | mag ( const Scalar& a ) | Scalar | magnitude |
| | abs ( const Scalar& a ) | Scalar | absolute value, alias for mag() |
| | sin ( const Scalar& a ) | Scalar | sine |
| | cos ( const Scalar& a ) | Scalar | cosine |
| | tan ( const Scalar& a ) | Scalar | tangent |
| | asin ( const Scalar& a ) | Scalar | arc sine |
| | acos ( const Scalar& a ) | Scalar | arc cosine |
| | atan ( const Scalar& a ) | Scalar | arc tangent |
| | atan ( const Scalar& opp, const Scalar& adj ) | Scalar | arc tangent opp/adj |
| | ln ( const Scalar& a ) | Scalar | natural logarithm |
| | exp ( const Scalar& a ) | Scalar | exponential |
| | sqrt ( const Scalar& a ) | Scalar | square root |
| | cbrt ( const Scalar& a ) | Scalar | cube root |
| | trunc ( const Scalar& a ) | int | truncation |
| | round ( const Scalar& a ) | int | rounding |
| Vector | x ( const Vector& val ) | Scalar | get x component |
| | y ( const Vector& val ) | Scalar | get y component |
| | z ( const Vector& val ) | Scalar | get z component |
| | mag ( const Vector& val ) | Scalar | magnitude |
| | distance ( const Vector& a, const Vector& b ) | Scalar | distance between a & b |
| | unit ( const Vector& val ) | Vector | unit vector |
| Quaternion | mag ( const Quaternion& q ) | Scalar | magnitude |
| | ln ( const Quaternion& q ) | Vector | logarithm |
| | exp ( const Vector& v ) | Quaternion | exponential |
| | conj ( const Quaternion& q ) | Quaternion | conjugate |
| | inverse ( const Quaternion& q ) | Quaternion | multiplicative inverse |
| | slerp ( const Quaternion& p, const Quaternion& q, const Scalar& t ) | Quaternion | spherical linear interpolation |
| Matrix | inverse ( const Matrix& val ) | Matrix | multiplicative inverse |
| | translation ( const Matrix& val ) | Vector | get translation component |
| | scaling ( const Matrix& val ) | Vector | get scaling component |
| | rotation ( const Matrix& val ) | Vector | get rotation component |

Value operations have been optimized with efficient C++ implementations. Although low-level optimization using assembly-language is possible, experience has shown that motion processing is insignificant compared to graphic rendering.

TABLE 6

C++ operators

| Type family | Operator | Arguments | Result | Description |
|---|---|---|---|---|
| Scalar | − | (void) | Scalar& | unary negate |
| | = | ( const Scalar& s ) | Scalar& | assign |
| | += | ( const Scalar& s ) | Scalar& | add to |
| | −= | ( const Scalar& s ) | Scalar& | subtract from |
| | *= | ( const Scalar& s ) | Scalar& | multiply by |
| | /= | ( const Scalar& s ) | Scalar& | divide by |
| | %= | ( const Scalar& s ) | Scalar& | modulo by |
| | + | ( const Scalar& lhs, const Scalar& rhs ) | Scalar | sum |
| | − | ( const Scalar& lhs, const Scalar& rhs ) | Scalar | difference |
| | * | ( const Scalar& lhs, const Scalar& rhs ) | Scalar | product |
| | / | ( const Scalar& lhs, const Scalar& rhs ) | Scalar | quotient |
| | % | ( const Scalar& lhs, const Scalar& rhs ) | Scalar | modulus |
| | == | ( const Scalar& lhs, const Scalar& rhs ) | Boolean | equality |
| | != | ( const Scalar& lhs, const Scalar& rhs ) | Boolean | inequality |
| | > | ( const Scalar& lhs, const Scalar& rhs ) | Boolean | greater than |
| | >= | ( const Scalar& lhs, const Scalar& rhs ) | Boolean | greater than or equal to |
| | <= | ( const Scalar& lhs, const Scalar& rhs ) | Boolean | less than or equal to |
| | < | ( const Scalar& lhs, const Scalar& rhs ) | Boolean | less than |

TABLE 6-continued

C++ operators

| Type family | Operator | Arguments | Result | Description |
|---|---|---|---|---|
| | << | ( ostream& s, const Scalar& v ) | ostream& | stream output |
| | >> | ( istream& s, Scalar& v ) | istream& | stream input |
| Vector | − | (void) | Vector& | unary negate |
| | = | ( const Vector& r ) | Vector& | assign |
| | %= | ( const Vector& v ) | Vector& | cross product by |
| | += | ( const Vector& r ) | Vector& | add to |
| | −= | ( const Vector& r ) | Vector& | subtract from |
| | *= | ( const Scalar& r ) | Vector& | scale by |
| | /= | ( const Scalar& r ) | Vector& | scale by inverse |
| | + | ( const Vector& lhs, const Vector& rhs) | Vector | sum |
| | − | ( const Vector& lhs, const Vector& rhs) | Vector | difference |
| | * | ( const Vector& lhs, const Vector& rhs) | Scalar | inner (dot) product |
| | % | ( const Vector& lhs, const Vector& rhs) | Vector | vector (cross) product |
| | * | ( const Vector& lhs, const Scalar& rhs) | Vector | scale |
| | * | ( const Scalar& lhs, const Vector& rhs ) | Vector | scale |
| | / | ( const Vector& lhs, const Scalar& rhs ) | Vector | inverse scale |
| | == | ( const Vector& lhs, const Vector& rhs ) | Boolean | equality |
| | != | ( const Vector& lhs, const Vector& rhs ) | Boolean | inequality |
| | << | ( ostream& strm, const Vector& v ) | ostream& | stream output |
| | >> | ( istream& strm, Vector& v ) | istream& | stream input |
| Quaternion | ~ | (void) | Quaternion& | unary conjugate |
| | = | ( const Quaternion& q ) | Quaternion& | assign |
| | += | ( const Quaternion& q ) | Quaternion& | add to |
| | −= | ( const Quaternion& q ) | Quaternion& | subtract from |
| | *= | ( const Quaternion& q ) | Quaternion& | multiply by |
| | /= | ( const Quaternion& q ) | Quaternion& | divide by |
| | + | ( const Quaternion& lhs, const Quaternion& rhs ) | Quaternion | sum |
| | − | ( const Quaternion& lhs, const Quaternion& rhs ) | Quaternion | difference |
| | * | ( const Quaternion& lhs, const Quaternion& rhs ) | Quaternion | product |
| | / | ( const Quaternion& lhs, const Quaternion& rhs ) | Quaternion | quotient |
| | == | ( const Quaternion& lhs, const Quaternion& rhs ) | Quaternion | equality |
| | != | ( const Quaternion& lhs, const Quaternion& rhs ) | Quaternion | inequality |
| | << | ( ostream& s, const Quaternion& q ) | ostream& | stream output |
| | >> | ( istream& s, Quaternion& q ) | istream& | stream input |
| Matrix | = | ( const Matrix& right ) | Matrix& | assign |
| | += | ( const Matrix& r ) | Matrix& | pre-multiply by |
| | %= | ( const Matrix& r ) | Matrix& | post-multiply by |
| | * | ( const Matrix& lhs, const Matrix& rhs ) | Matrix | matrix product |
| | + | ( const Matrix&lsh, const Vector& rhs ) | Vector | vector product |
| | == | ( const Matrix& lhs, const Matrix& rhs ) | Matrix | equality |
| | != | ( const Matrix& lhs, const Matrix& rhs ) | Matrix | inequality |
| | << | ( ostream& s, const Matrix& q ) | ostream& | stream output |
| | >> | ( istream& s, Matrix& q ) | istream& | stream input |

6.2.4.2 Notation

In this document, value types are written using literal values and punctuation illustrated in table 7. In source code, values use explicit class constructors. Multiple constructors are offered for conversions between types, only some of which are shown in this table.

TABLE 7

Literal values notation.

| Type | Example | Description |
|---|---|---|
| Boolean | true, false | C++ keywords |
| | True, False | Boolean class constants |
| | Boolean (false) | |
| Scalar | 1 | Integer and floating-point |
| | 1.0 | values all convert to Scalar |
| | 1.0f | |
| | Scalar(1) | |
| Vector | [1 0 0] | Three Scalars enclosed in |
| | Vector( 1, 0, 0 ) | brackets, delimited by spaces |
| Quaternion | [1 0 0] @ 1 deg | Vector axis of rotation '@' rotation angle |

TABLE 7-continued

Literal values notation.

| Type | Example | Description |
|---|---|---|
| | [1 0 0] @ 0 rad | Degrees or radians explicit in text |
| | Quaternion (axis, angle) | Radians required in code |
| Matrix | Translate (x, y, z) | Parameterized Matrix operators |
| | Rotate (roll, pitch, yaw) | Translate, Rotate, and Scale |
| | Scale (sx, sy, sz) | are subclasses of Matrix Multiple forms allow Scalar or Vector arguments |

6.2.4.3 Predefined Values

Each value type has predefined constant values that are available for general use. To access these constant values, they must be qualified using that type's scoping operator. For example, Scalar::Zero has the value 0. These constants are given in table 8.

TABLE 8

Class constants.

| Type | Name | Value | Description |
|---|---|---|---|
| Boolean:: | True | true | boolean (!0) |
| | False | false | boolean (0) |
| Scalar:: | Zero | 0.0 | additive identity |
| | One | 1.0 | multiplicative identity |
| | Half | 0.5 | 1/2 |
| | Min | | smallest negative number |
| | Max | | largest positive number |
| | Epsilon | | smallest epsilon such that 1 + epsilon != 1 |
| | Pi | pi | |
| | Pi2 | pi * 2 | |
| | Pi_2 | pi / 2 | |
| | E | e | base of natural logarithm |
| Vector:: | Zero | [0 0 0] | additive identity |
| | Xaxis | [1 0 0] | |
| | Yaxis | [0 1 0] | |
| | Zaxis | [0 0 1] | |
| Quaternion: | One | [0 0 0] @ 0 | multiplicative identity |
| | Fore | user specified | forward orientation, default is (Vector::Yaxis, 0) |
| | Aft | derived | 180 deg. yaw left |
| | Left | derived | 90 deg. yaw left |
| | Right | derived | 90 deg. yaw right |
| | Up | user specified | up orientation, default is (Vector::Zaxis, 0) |
| | Down | derived | 90 deg. pitch down |
| | TiltRight | derived | 90 deg. roll right |
| | TiltLeft | derived | 90 deg. roll left |
| Matrix:: | One | Scale(1) | multiplicative identity |

Two directions may be configured by the programmer to reflect the orientation of the application's prevailing coordinate system. The default coordinate system is right-handed, with X axis to the right, Y axis forward, and Z axis up. The programmer may specify an alternate coordinate system by supplying direction vectors forward and up, and rotation convention of counter-clockwise (right-handed) or clockwise (left-handed). This configuration determines the values for the standard orientations, as well as the interpretation for Euler angles of roll, pitch, and yaw. The programmer optionally configures the coordinate system using om::defineCoordinates(const Vector& forward,
        const Vector& up,
        const Boolean& isLeftHanded=False);

This setting remains in effect until reset by the user. The default values are: forward=Vector::Yaxis, up=Vector::Zaxis, isLeftHanded=False.

6.2.4.4 Vars

Retained expressions are typed to correspond to their value type, suffixed with "Var":

BooleanVar
    ScalarVar
    VectorVar
    QuaternionVar
    MatrixVar

When Var types are used in an expression, that expression is automatically retained until needed. Vars and values can be mixed indiscriminately; value types will be promoted to Var types. Vars are memory-managed objects, so that if all references to a Var have been deleted, the expression is de-allocated and its memory is returned to the heap.

Just as the C++ compiler combines a constant sub-expression into a single constant value, OpenMotion API will evaluate a value sub-expression once, convert it to a constant-valued Var, and use it repeatedly as needed.

6.2.4.5 Callbacks

Most functionality can be specified directly using retained expressions. However, the program may embed application-specific algorithms and values in retained expressions by defining a callback function. The callback function must return an OpenMotion API value type.

Callbacks support a finite number of function signatures. The programmer must choose. to implement one of the supported signatures. Many useful signatures are available. User-defined data may be passed to function signatures supporting void*.

const Boolean fcn(void);
    const Boolean fcn(const Boolean&);
    const Boolean fcn(const Boolean&, const Boolean&);
    const Boolean fcn(const Scalar&);
    const Boolean fcn(const Scalar&, void*);
    const Boolean fcn(const Scalar&, const Scalar&);
    const Boolean fcn(const Vector&, const Vector&);
    const Boolean fcn(const Quaternion&, const Quaternion&);
    const Boolean fcn(const Matrix&, const Matrix&);
    const Scalar fcn(void);
    const Scalar fcn(const Scalar&);
    const Scalar fcn(const Scalar&, void*);
    const Scalar fcn(const Scalar&, const Scalar&);
    const Scalar fcn(const Vector&);
    const Scalar fcn(const Quaternion&);
    const Vector fcn(void);
    const Vector fcn(const Vector&);
    const Vector fcn(const Vector&, const Vector&);
    const Vector fcn(const Scalar&);
    const Vector fcn(const Scalar&, void*);
    const Vector fcn(const Scalar&, const Scalar&, const Scalar&);
    const Vector fcn(const Vector&, const Scalar&);
    const Vector fcn(const Quaternion&);
    const Vector fcn(const Quaternion&, const Vector&);
    const Vector fcn(const Matrix&);
    const Vector fcn(const Matrix&, const Vector&);
    const Quaternion fcn(void);
    const Quaternion fcn(const Quaternion&);
    const Quaternion fcn(const Quaternion&, const Quaternion&);
    const Quaternion fcn(const Scalar&);
    const Quaternion fcn(const Scalar&, void*);
    const Quaternion fcn(const Scalar&, const Scalar&, const Scalar&);
    const Quaternion fcn(const Vector&, const Scalar&);
    const Quaternion fcn(const Matrix&);
    const Matrix fcn(void);
    const Matrix fcn(const Matrix&);
    const Matrix fcn(const Matrix&, const Matrix&);
    const Matrix fcn(const Scalar&);
    const Matrix fcn(const Scalar&, void*);
    const Matrix fcn(const Matrix&, const Scalar&);
    const Matrix fcn(const Matrix&, const Vector&);
    const Matrix fcn(const Matrix&, const Vector&, const Scalar&);
    const Matrix fcn(const Vector&);
    const Matrix fcn(const Quaternion&);

The programmer references a callback using the syntax, call(fcn, <args> ... )

where fcn is the programmer-defined function and <args> are the arguments. OpenMotion API automatically takes care of calling the function when the arguments have been updated and value is needed.

For example, the programmer defines a callback implementing an application-specific function of time that calculates an angle. This angle is input to a dynamic expression containing a sinusoid:

```
const Scalar myFunc( const Scalar& time, void* pData ) // the callback
function
{
    myType* theData = (myType *) pData; // data passed thru void*
    ...
}
...
myType myData = ...;       // the data for this instance
ScalarVar myExDr = sin( call( myFunc, simTime(), &myData));
```

6.2.4.6 Temporal Predicates

Predicates are functions that return a Boolean expression. Temporal predicates allow the programmer to sequence movements based on time.

TABLE 9

Temporal predicates.

| Predicate | Duration | Description |
|---|---|---|
| before( time ) | interval | True before time equals expression. |
| at( time ) | impulse | True when time equals expression. |
| after( time ) | iriterval | True after time equals expression. |
| during( start, span ) | interval | True when time is between start and start+span. |
| cyclic( start, span, period = 0, duration = 0, offset= 0 ) | interval(s) | True cyclically, between start and start+span, whenever 0 < ( t – start – offset ) % period < duration |

6.2.5 Motions

Motions are idealized points traveling through space. Each point has a number of degrees of freedom. Mathematically, these degrees of freedom (DOFs) naturally fall into groups. For example, translation is a 3D group that is described by vector algebra. The Rotation group behaves quite differently; it is described by quaternion algebra. Scaling is yet another 3D group; vector algebra does not handle scaling, but it is a subset of homogeneous (4×4) transformation matrices. In other embodiments, additional degrees of freedom will be considered (shearing, bending, tapering, to name a few).

One creates a Motion by declaring a variable using the Motion type.

Motion myMotion;

6.2.5.1 Parameters

The parameters of Motion specify its initial conditions and behavior. The initial conditions specify values for the trajectory at simulation time zero. The behavior sets up which parameters are interactive and which are derived, and how a Motion responds to new conditions.

TABLE 10

Parameters of movement.

| Parameter | Notation | Type | Definition |
|---|---|---|---|
| position | p | Vector | [x y z] location in 3-space |
| velocity | v | Vector | dp/dt, time derivative of position |
| acceleration | a | Vector | dv/dt, time derivative of velocity |
| orientation | q | Quaternion | orientation |
| spin | w | Vector | axis of rotation, magnitude is spin rate in radians per second |
| revolve | r | Vector | acceleration causing spin axis to precess |
| scale | s | Vector | 3-tuple of scale factors, $[s_x\ s_y\ s_z]$ |
| growth | g | Vector | time derivative of scale, ds/dt |
| growthRate | e | Vector | time derivative of growth, dg/dt |

6.2.5.1.1 Initial Conditions

Internally, each DOF group is assigned its own trajectory. All trajectories must "start" somewhere. By default, all motions begin at the origin, with zero velocity. The programmer may specify an initial condition for each motion to make it unique to its intended application. This is done using the syntax myMotion.<initial condition>(<initial value>);

where <initial condition> specifies which parameter, and <initial value> specifies its value.

TABLE 11

Initial conditions of Motion.

| Motion:: | Argument Type | Default Value | Description |
|---|---|---|---|
| .initialPosition (p) | Vector | [0 0 0] | position |
| .initialVelocity (v) | Vector | [0 0 0] | velocity |
| .initialAcceleration (a) | Vector | [0 0 0] | acceleration |
| .initialOrientation (q) | Quaternion | [0 0 0] @ 0 rad | orientation |
| .initialSpin (w) | Vector | [0 0 0] | spin |
| .initalRevolve (r) | Vector | [0 0 0] | spin axis of precession |
| .initialScale (s) | Vector | [1 1 1] | scale |
| .initialGrowth (g) | Vector | [0 0 0] | growth |
| .initialGrowthRate (e) | Vector | [0 0 0] | growth rate of change |

Methods that set a parameter return a reference to the modified object. This feature allows "chaining" of parameter configurations into one C++ statement. For example, myMotion
   .initialPosition(Zero)
   .initialVelocity(Vector::Xaxis)
   .initialSpin(Vector::Yaxis*Scalar::Pi2/10);

This statement causes myMotion to turn about its Y axis once every 10 seconds, while translating along the X axis. Of course, this specification is not very flexible because the initial conditions remain constant over time. However, many useful motions can be created using nothing but initial conditions.

If multiple initial conditions are set for a given action which are derivatives or integrals of each other, the last set of these initial conditions will dominate. Thus, if an initial value is set for acceleration and then for velocity of a given motion, the velocity value will dominate, meaning the velocity will stay constant, and acceleration will become zero until either a new initial condition affecting position is set for the motion or a behavior attached to the motion changes this condition. If, on the other hand, velocity is set first and then acceleration, the acceleration value would dominate and the motion would accelerate continuously until a new initial condition or a behavior changes this condition.

6.2.5.1.2 Behavior

Motions have a parameter called Behavior, which is described in a subsequent Motion objects. For example, p1 myMotion.behavior(myBehav); // chainable ... or ...

myMotion.behavior( )=myBehav; // as assignment

Each object gets its own copy, or instance, of the Behavior.

6.2.5.2 Attributes

A trajectory, corresponding to an instance of the trajectory class 138 shown in FIG. 1, for each DOF group is always defined, and we can use the trajectory to get the current conditions, to predict short intervals into the future, or even to extrapolate into the past. Functions are provided to get these attributes from a Motion object.

6.2.5.2.1 Current Attributes of Motion

The current attributes of a motion are given in table 12.

TABLE 12

Attributes of Motion.

| DOF Group | Motion:: | Result Type | Description |
|---|---|---|---|
| Translation | .position () | Vector | position |
| | .velocity () | Vector | velocity |
| | .acceleration () | Vector | acceleration |
| Rotation | .orientation () | Quaternion | orientation |
| | .spin () | Vector | spin |
| | .revolve () | Vector | spin axis of precession |
| Scaling | .scale () | Vector | |
| | .growth () | Vector | growth |
| | .growthRate () | Vector | growth rate of change |
| Combined | .local () | Matrix | local transformation |
| | .global () | Matrix | global transformation |

6.2.5.2.2 Predict

A motion's trajectory is constantly adapted to inputs from control variables (more on this later). At any moment, the trajectory represents a curve in space that goes through the current position, and continues into the future (and past). Of course, some kind of interaction may occur in the near future that could drastically change the prediction. However, based on the current situation, barring drastic changes, the prediction is pretty accurate. All the predictors take one argument representing the simulation time.

TABLE 13

Predicted attributes of Motion.

| Motion:: | Result Type | Description |
|---|---|---|
| .predictPosition (t) | Vector | position |
| .predictVelocity (t) | Vector | velocity |
| .predictAcceleration (t) | Vector | acceleration |
| .predictOrientation (t) | Quaternion | orientation |
| .predictSpin (t) | Vector | spin |
| .predictRevolve (t) | Vector | spin axis of precession |
| .predictScale (t) | Vector | scale |
| .predictGrowth (t) | Vector | growth |
| .predictGrowthRate (t) | Vector | growth rate of change |
| .predictLocal (t) | Matrix | local transformation |
| .predictGlobal (t) | Matrix | global transformation |

6.2.5.2.3 Boundary

Boundaries are discussed in detail in their own section, below. The boundary attribute of an individual motion affects the character of the motion indirectly. A motion's boundary participates in interactions between the motion. and other boundary objects. Multiple motion objects may have different instances of the same boundary class as their boundary attribute. A given motion's boundary is defined within the motion's individual frame of reference. A boundary is associated with a motion as shown in the example:

VectorVar origin;

ScalarVar radius,

Boundary myBounds=Sphere(origin, radius);

Motion myMotion;

myMotion.boundary( )=myBounds; // parameter assignment

... or ...

myMotion.boundary(myBounds); // equivalent form

Note that origin and radius are expression types, which may be bound to dynamic expressions. For example, radius might be defined by a formula or user-input value.

6.2.5.3 Complex Motions

Motions may be combined into complex forms by use of hierarchy and blending. C++ operators have been overloaded to make this notation easier.

6.2.5.3.1 Hierarchy

Motions may be assembled into hierarchies. This could be used, for example, to dynamically assemble various graphical parts, all of which move independently. A Motion object may have any number of children, but only one parent. The parent establishes a frame of reference for its children. The global( ) attribute discussed above composes the local transformation with its parent's global transformation.

There are two ways to specify a hierarchy using member functions or the operator /. These forms are equivalent:

```
myMotion.parent( parentMotion );                              // specify parent
myMotion.child( childMotion );                                // specify child
..or..
myMotion.parent( parentMotion ).child( childMotion );         // use chaining
..or..
parentMotion / myMotion / childMotion;                        // use operators
```

The notation for hierarchy uses operator / because it is similar to a file system hierarchy path name. A complex system of motion hierarchies can be set up simply by stating the various path specifications. When a hierarchical. motion is associated with a given object by a program or programmer using the API, expressions can be used to define the length between nodes of the hierarchy, so that, for example, as a parent node rotates its child nodes will be moved by the appropriate amount.

6.2.5.3.2 Blending

Sometimes a complex motion is a blend of two motions acting independently. In contrast to hierarchy, blending is accomplished by weighted averaging of degree-of-freedom parameters, not by composing transformations. This is written using operator + and operator *. The multiplication operator is used to scale a motion by a constant or variable scalar value, and the addition operator combines the degrees-of-freedom of different motions.

```
Motion         thisMotion;
Motion         thatMotion;
ScalarVar      a(0);                          // varies 0..1
MotionVar blendMotion = thisMotion * a + thatMotion * ( 1 − a );
```

This technique can be used, for example, to effect smooth transitions between a set of concurrent motions. As one may infer, a MotionVar is a variable that refers to a Motion value or a motion expression. A MotionVar has the same attribute interface as Motion value, except no input parameters.

6.2.6 Behaviors

Although one can specify simple motions using nothing but initial conditions, they cannot change or respond to external stimuli. To specify this, OpenMotion API uses a class called Behavior. A Behavior is an action that changes a Motion's parameters. Behaviors are constructed by declaring Behavior variables and assigning descriptions to them.

BehaviorVar myBehav;

myBehav=<action>;

... or ...

myBehav=(<action>, ... );

A Behavior expression may be a single action, or a list of actions enclosed in parentheses and separated by commas. Behavior expressions are sequenced to produce complex responses. The ordering of actions is significant; the actions are executed in the specified order. Taken together, a collection of related Behaviors comprise a finite state machine.

6.2.6.1 Interactive Controllers

One of the most useful actions is to effect an interactive controller. A controller links a parameter of motion to an expression. While the controller is in effect, the trajectory of the motion is continually adapted to this input parameter.

TABLE 14

Interactive controller actions.

| om:: | Argument Type |
| --- | --- |
| positionControl (p) | Vector |
| velocityControl (v) | Vector |
| accelerationControl (a) | Vector |
| orientationControl (q) | Quaternion |
| spinControl (w) | Vector |
| revolveControl (r) | Vector |
| scaleControl (s) | Vector |
| growthControl (g) | Vector |
| growthRateControl (e) | Vector |

Only one controller for each DOF group can be active at one time. For example, a velocityControl means that the position is derived from the velocity by integrating over time. Actions occur in the order specified, so that the last action for each DOF group will be the one that remains in effect.

6.2.6.2 Constant Controllers

Sometimes one needs to set a motion parameter to a fixed value. This is done by a sub-class of behaviors called a constant controller. These actions evaluate their expressions just once when they come into effect. They modify the trajectory to keep this value constant. For continuity, previous conditions remain in effect. For example, setting a constant velocity would set the acceleration to zero (since nonzero acceleration would change the velocity), but the calculated position would join the old and new trajectories at that point in time.

TABLE 15

Constant controller actions.

| om:: | Argument Type |
| --- | --- |
| position (p) | Vector |
| velocity (v) | Vector |
| acceleration (a) | Vector |
| orientation (q) | Quaternion |
| spin (w) | Vector |
| revolve (r) | Vector |
| scale (s) | Vector |
| growth (g) | Vector |
| growthRate (e) | Vector |

Note that constant attributes can still effect interesting motions. For example, projectile motion is simply constant acceleration, namely gravity.

6.2.6.3 Reset Parameter

Sometimes a discontinuity is desired. For example, a ball bouncing off the floor has a sudden change in its velocity vector. In this case one must reset a motion parameter. These actions evaluate their expression arguments once, and reset. the corresponding. parameter. If a controller is in place, the reset action does not remove that controller. Derived parameters, if any, are not affected. For example, one may reset the velocity while maintaining continuity of position.

TABLE 16

Reset motion parameter actions.

| om:: | Argument Type |
| --- | --- |
| resetPosition (p) | Vector |
| resetVelocity (v) | Vector |
| resetAcceleration (v) | Vector |
| resetOrientation (q) | Quaternion |
| resetSpin (w) | Vector |
| resetRevolve (r) | Vector |
| resetScale (s) | Vector |
| resetGrowth (g) | Vector |
| resetGrowthRate (e) | Vector |

6.2.6.4 States and Transitions

So far we have discussed simple actions. These actions change the trajectories of the motion that uses the behavior. We now consider actions that change the behavioral state of the motion.

A behavior may represent a complex finite state machine. Each state contains a list of actions to be performed when entering that state. Each state also has a list of state transitions. Each transition is guarded by a Boolean condition. The conditions are activated when the state is first entered. When the condition evaluates to true, the corresponding action is triggered. The action is either a callback, a state transition, or both.

The basic syntax for a state transition is:

when(<condition>).perform(<behavior>);

The when (<condition>) clause contains the trigger condition; the .perform(<behavior>) clause specifies the new state when and if that trigger fires. Such a when conditional is an instance of the when class 156, discussed above with regard to FIG. 1. The when clause may also have an optional callback attached. For example:

BehaviorVar state1;

BehaviorVar state2;

BooleanVar cond1(false);

VectorVar p;

VectorVar v;

state1=(positionControl(p), when(cond1).perform
(state2));

state2=(velocityControl(v), when(!cond1).perform
(state1));

myMotion.behavior( )=state1;

These statements set up two states controlled by a Boolean variable. Under state1, the motion exhibits a position control attached to expression p; under state2, the motion has a velocity control attached to expression v. A state transition occurs whenever cond1 changes value under control of expressions attached to cond1, or by direct control of the application.

6.2.6.5 Assignments and Callbacks

There are several actions that allow the programmer to set application-specific variables within each behavioral state. They include assignment and callbacks. The action is performed once each time a state is entered.

TABLE 17

Assignment and callback actions.

| om:: | Argument Type | Description |
| --- | --- | --- |
| assign( b, expr ) | Boolean | b = expr; |
| assign( s, expr ) | Scalar | s = expr; |
| assign( v, expr ) | Vector | v = expr; |
| assign( q, expr ) | Quaternion | q = expr; |
| assign( m, expr ) | Matrix | m = expr; |
| call( f, <args . . . >) | varies | Function signatures: void f( void* ); void f( Motion& , const Scalar& ); |

For example:

BooleanVar cond1;

ScalarVar myVar;

BehaviorVar yourState;

. . .

BehaviorVar myState=(
assign(myVar, <expr>),
call(fcn),
when(cond1).perform(yourState));

Callbacks can also be attached to trigger conditions. In this case the callback occurs only when the trigger condition becomes true, as the Behavior is about to exit the state. The forms are:

when(<condition>).call(fcn, pdata ).perform(<behavior>)

when(<condition>).call(fcn).perform(<behavior>)

when(<condition>).call(fcn, pdata)

when(<condition>).call(fcn)

where pdata is an optional void* pointer to programmer-defined data, and fcn is a programmer-defined function having the signature void fcn (void* p=0). In other words, the callback is optional, and it may occur with or without a state transition.

6.2.6.6 Attributes and Predicates

Behaviors have attributes that may participate in expressions and parameters. These attributes are useful for calculating movements, setting up triggers, and coordinating triggers between different states.

TABLE 18

Behavioral attributes and predicates.

| om:: | Result type | Description |
| --- | --- | --- |
| simTime( ) | Scalar | Current simulation time within Behavior state. |
| enterTime( behavior ) | Scalar | Time Behavior state was most recently entered. |
| exitTime( behavior ) | Scalar | Time Behavior state was most recently exitted. |
| localTime( behavior ) | Scalar | Time since Behavior state was most recently entered. |
| elapsedTime( behavior ) | Scalar | Time accumulated in previous activations. |
| totalTime( behavior ) | Scalar | Time accumulated in previous and current activations. |
| isActive( behavior ) | Boolean | True while behavior state is active in a Motion. |

For example, a state that is active for 10 seconds, then transitions to another state:

BehaviorVar state0;

BehaviorVar state1;

state10=(velocityControl( . . . ), . . .
when(localTime(state10)>10).perform(state0));

6.2.7 Boundaries

Although Motions are independent of graphics, a Motion object must know something about geometrical shapes in order to interact within a 3D scene that is represented graphically to the user. A Boundary is a geometrical shape which works within the dynamic OpenMotion API environment.

6.2.7.1 Primitive Shapes

In the embodiment of the invention described here there are seven primitive Boundary shapes. In other embodiments there can be more or different primitive Boundary shapes. These shapes share a common Boundary interface, each adding its own unique properties PointShape
Point(const Vector& origin);

Edge Shapes
Line(const Vector& origin, const Vector& direction);
LineSegment(const Vector& origin, const Vector& end);

Surface Shapes
Plane(const Vector& origin, const Vector& normal);
Rectangle(const Vector& origin, const Vector& h, const Vector& w), Volume Shapes
Sphere(const Vector& origin, const Scalar& radius);
Box(const Vector& origin, const Vector& size);

These elementary shapes may be regarded as value types in a Boundary expression. To get different orientations, one may either associate the Boundary with a Motion by making it the boundary attribute for a motion, or one may construct Boundary expressions using regular transforms to modify the primitive shapes. These primitive shapes are available for general use within the application. They support functions to get attribute values, as well as spatial computations.

In other embodiments of the invention, the API will be modified to allow Boundaries to be defined by more complex shape modeling methods such as splines, NURBS, and parametric solid geometry; and Boundaries will be able to be derive their shape definition directly from standard data structures used to define shapes by major 3D modeling programs.

6.2.7.2 Attributes

The attribute functions in table 19 apply to all boundaries regardless of shape.

TABLE 19

Boundary attributes.

| Boundary:: | Result Type | Description |
|---|---|---|
| .origin( ) | Vector | Origin of boundary |
| .distance( p ) | Scalar | Distance from p to boundary |
| .projection( p ) | Vector | Projection of p onto boundary |
| .normal( p ) | Vector | The normal vector of boundary at projected point p. |
| .tangent( p ) | Vector | A tangent vector of boundary at projected point p. |

6.2.7.3 Composite Boundaries

Composite boundaries allow the programmer to construct complex boundaries by using Boolean logic to combine basic shapes. These composite boundaries permit logical groupings of motions, which will allow collision detection among groups of objects, without having to specify all combinations explicitly.

6.2.7.4 Expressions

A BoundaryVar is a variable that may take on Boundary values and dynamic expressions. Boundary expressions support functions that can be used as parameters to Behaviors and other Boundaries. The functions in table 20 are dynamic analogues to the attributes and functions of the primitive shapes.

TABLE 20

Boundary expressions.

| om:: | Result Type | Description |
|---|---|---|
| point( origin ) | Boundary | Dynamically construct Point boundary |
| line( origin, direction ) | Boundary | Dynamically construct Line boundary |
| lineSegment( origin, end ) | Boundary | Dynamically construct LineSegment boundary |
| plane( origin, normal ) | Boundary | Dynamically construct Plane boundary |
| rectangle( origin, height, width ) | Boundary | Dynamically construct Rectangle boundary |
| sphere( origin, radius ) | Boundary | Dynamically construct Sphere boundary |
| box( origin, size ) | Boundary | Dynamically construct Box boundary |
| origin( boundary ) | Vector | Origin of boundary |
| distance( boundary, point ) | Scalar | Distance from point to boundary |
| projection( boundary, point ) | Vector | Projection of point onto boundary |
| normal( boundary, point ) | Vector | The normal vector of boundary at projected point |
| tangent( boundary, point ) | Vector | A tangent vector of boundary at projected point |

In the following example, the Boundary is controlled by a dynamic expression, which is also transformed by the Motion's frame of reference:

VectorVar origin;

Motion myMotion;

myMotion.boundary( )=point(origin);

6.2.7.5 Predicates

Predicates are especially useful when constructing conditions that trigger state transitions. Boundaries support their own set of predicates.

First we consider proximity predicates. These predicates test the relationship between a Motion's boundary attribute and another boundary.

TABLE 21

Proximity predicates.

| Predicate | Duration | Description |
|---|---|---|
| isApproaching( motion, boundary ) | impulse | True at the moment the motion's boundary enters proximity of the test boundary. |
| isDeparting( motion, boundary ) | impulse | True at the moment the motion's boundary leaves proximity of the test boundary. |
| isNear( motion, boundary ) | interval | True while the motion's boundary is in proximity of the test boundary. |

Spatial predicates test the relationship between a Motion and another boundary. For spatial predicates the Motion is an idealized point, defined by the Motion's position, regardless of its boundary attribute.

TABLE 22

Spatial predicates.

| Predicate | Duration | Description |
|---|---|---|
| isOn( motion, boundary) | interval | True while the trajectory is on the boundary, neither inside, outside, above, nor below. |
| isInside( motion, boundary) | interval | True while the trajectory is inside the boundary. For a surface boundary, same as isAbove. Disjoint with isOn. |
| isOutside( motion, boundary) | interval | True while the trajectory is outside the boundary. For a surface boundary, same as isBelow. Disjoint with isOn. |
| isAbove( motion, boundary) | interval | True while the trajectory is |

TABLE 22-continued

Spatial predicates.

| Predicate | Duration | Description |
|---|---|---|
| | | above the surface of a boundary. For a volume boundary, not necessarily the same as isOutside. Disjoint with isOn. |
| isBelow( motion, boundary) | interval | True while the trajectory is below the surface of a boundary. For a volume boundary, not necessarily the same as isInside. Disjoint with isOn. |

For edge or point boundaries, isInside and isBelow are always False; isOutside and isAbove are always True.

6.2.7.6 Behaviors

Sometimes a Motion's behavior is constrained by interactions among shapes. There are special Behavior actions for these situations.

TABLE 23

Boundary behaviors.

| Boundary Actions | Optional Parameters | Description |
|---|---|---|
| reflect( boundary ) | gain, bias | Whenever the trajectory crosses the boundary, the trajectory is reflected about the normal at the point of intersection. The gain and bias, respectively, scale the normal and tangential components of the interaction. |
| clamp( boundary ) | gain, bias | Whenever the trajectory encounters the boundary, the trajectory is clamped to the boundary. The gain and bias, respectively, scale the normal and tangential components of the interaction. A clamped trajectory may leave the boundary, but not pass through it. |
| onto( boundary ) | gain, bias | The boundary becomes part of the trajectory, and the trajectory is continually forced onto the boundary. The gain and bias, respectively, scale the normal and tangential components of the interaction. |

The parameters, gain and bias, affect the normal and tangential components of a boundary interaction. These parameters can be adjusted to simulate effects of gain or loss of momentum, for example due to elasticity and friction. To set these parameters, they are chained off the end of the boundary Behavior, VectorVar myGain;
    VectorVar myBias;
    BoundaryVar myBounds;
    BehaviorVar myBehav=reflect(myBounds).gain(myGain).bias(myBias);

6.2.8 Examples 6.2.8.1 Swing

Swing is extracted from our motion editor prototype. Swing has lots of parameters so that everything is dynamically adjustable through the user interface. It is a typical example of the use of the cyclic( ) temporal predicate. Also note the use of simTime( ), which makes signal a dynamic function of time. Swing is one of the most often-used motions, because it can be applied to any articulated joint to create animated models. Most of this code is declaration of parameters; the motion specification itself is three statements.

```
// input parameters defined by the user interface
VectorVar axis;              // axis to swing about
ScalarVar activeCycle;       // fraction [0..1] of cycle that is active
ScalarVar startTimeSec;      // start time (sec)
ScalarVar stopTimeSec;       // stop time (sec)
ScalarVar periodSec;         // period (sec)
ScalarVar offsetSec;         // offset for TP
ScalarVar minAngleRad;       // min angle for swing
ScalarVar maxAngleRad;       // max angle for swing
ScalarVar angFreq;           // angular freq for swing
ScalarVar phaseRad;          // phase offset of parent
// derived parameters
ScalarVar cycleSec    = activeCycle * periodSec;           // active cycle (sec);
ScalarVar deltaAngleRad = maxAngleRad - minAngleRad;       // range of angles
// define a boolean that controls whether to spin or not
BooleanVar isSwinging = cyclic( startTimeSec, stopTimeSec, period Sec, cycleSec, offsetSec
);
// based on the parameters above, we create a 'signal' expr node. The value of signal
// oscillates as a funct(time) from 0 to 1 with the freq and phase specified.
ScalarVar signal = 0.5f* ( 1.0f + sin( angFreq * simTime( ) + phaseRad ) );
BehaviorVar swinging = (// the 'swinging' state
     orientationControl( quaternion( axis, minAngleRad + deltaAngleRad * signal ) ),
     when( !isSwinging ).perform( stopped ) );
BehaviorVar stopped = (// the 'stopped' state
     spin( Vector::Zero),
     when( isSwinging ).perform( swinging ) );
```

-continued

```
myMotion.initialOrientation( Quaternion::One )    // reset the orientation first
    .behavior( swinging);                          // begin in the spinning state
```

6.2.8.2 Two Balls Bouncing in Box

This example uses boundaries. Two balls of equal radius are in a box. They bounce elastically off each other and the box, with gravity. The box can be dynamically moved and resized, as can the radius of both balls. (For brevity, we do not validate the input parameters.)

```
const Vector gravity(0, 0, −9.8);
VectorVar boxOrigin(0, 0, 0);
VectorVar boxSize(10, 10, 10);
ScalarVar ballSize(1);
BoundaryVar myBox=box(boxOrigin, boxSize);
BoundaryVar Ball=Sphere(Vector::Zero, ballSize);
Motion ball1;
Motion ball2;
ball1.initialPosition(2, 2, 2)
    .initialVelocity(1, 1, 1)
    .initialAccleration(gravity)
    .boundary(aBall)
    .behavior((reflect(myBox), reflect(ball2.boundary( ))))
ball2.initialPosition(8, 8, 8)
    .initialVelocity(−1, 1, 1)
    .initialAcceleration(gravity)
    .boundary(aBall)
    .behavior((reflect(myBox), reflect(ball1.boundary( ))));
```

6.2.8.3 Motion Derivatives

Motion Derivitive shows how the 0–2$^{nd}$ order motion derivatives can be used as parameters to create complex, interrelated motions

```
// first, define a signal that oscilates as a funct(time) from −1 to 1
ScalarVar signal = sin(simTime( ) );
// now, using this signal, define a "Shake" motion that moves back and
// fourth along the X axis
Motion shake;
shake.position( Vector::Xaxis * signal );
// now we can create a derived motion whose position is controlled by the
// velocity of the Shake motion.
Motion derivedShake;
derivedShake.positon( velocity( Shake ) );
```

6.2.8.4 Motion Blending

Blend shows how motions can be combined

```
// We define two motions and dynamically combine these. The first motion
// is simple rectilinear (straight line) motion along the Z axis. The second
// motion is circular motion in the XY plane.
Motion straightMotn;
Motion circularMotn;
// the StraightMotn is constructed so that it moves in the +Z direction at a
// constant speed of 10 units per second.
StraightMotn.velocity( 0, 0, 1 );
// The CircularMotion is constructed so that it moves in a circular path in
// the XY plane centered about the origin. The circular path has a radius of
// 1 unit and the motion completes 10 revolutions every second.
circularMotn.position( sin( simTime( ) * 10 ), cos( simTime( ) * 10 ), 0 ),
// now create a blend signal that oscilates as a funct(time) from 0 to 1
with
a period of 21.4 seconds.
```

-continued

```
ScalarVar blendSgnl = 0.5 * ( 1 + sin(simTime( ) * 0.1 ) );
// now create an expression that blends the two motions using the blending
// signal as a dynamic weighting factor. The result will be a motion that
// gradually changes from "straight line" motion to "circular motion"
// every 21 seconds.
Motion Blend =
blendSgnl * straightMotn + (1−blendSgnl) * circularMotn;
```

6.2.8.5 Boundary Bounce

Boundary Bounce shows how boundaries can be created and combined with constraints and spatial predicates to create complex behaviors. For this example, we construct a "room" by combining simple boundary shapes and define a motion with behavior for bouncing off the "walls" or surfaces of the room. We further define the "balls" behavior by the "room", we also define a "goal" volume within the room and stopping the ball's motion if it penetrates the "goal".

```
// define the room to be a sphere with a radius of 10 units.
Boundary room
room = sphere( Vector::Zero, 10 );
// another option for the room would be to combine two or more
// boundaries to create a composite shape.
Room = sphere( Vector::Zero, 10 ) + box( Vector::Zero,
vector( 10, 10, 10) );
// now define the boundary volume for the goal, which is a small sphere at
// the origin
Boundary goal = sphere( Vector::Zero, 0.1 );
// Now create the behavior for the ball when it is moving. We will define
// a random wandering movement for the ball. The ball will have a
// constant speed of 1 unit per second but the velocity direction will be
// varying randomly.
BehaviorVar wander=( velocityControl( randomDir( simTime( ) ) );
// Now create a behavior for the ball when it enters the goal volume. For
// this example, the goal behavior will be to simply stop. We also create a
// boundary predicate for detection goal penetration.
BehaviorVar stop = ( velocity( Vector::Zero ) );
// now create the ball motion, using the boundaries and behaviors. The
ball
// has three different behavioral states. The first is random wandering. The
// second is to bounce (or reflect) off the room surface. The third is to stop
// if it penetrates the goal.
Motion Ball;
Ball.behavior ( wander,
            reflect( room ),
            when ( isInside( goal, Ball) ).perform( stop) );
```

6.3 OpenMotion Format

The OpenMotion File Format (of which the ClipMotion Format is a subset) is a universal motion description language. Ideally, the OMF is completely equivalent and interchangeable with a C++ representation, or with a protected binary representation. The only differences are those imposed by the syntactical rules and conventions of the host language, such as C++ (or Java). The Translator 170, shown in FIG. 1, can read and write the OMF in ASCII or binary. Furthermore, the translator can export a set of OMF statements, such as a ClipMotion, into a C++ source program that may be immediately compiled and linked with a user's motion-enabled program.

6.3.1 Notation

BNF (Backus-Naur Form) is a meta-language for specifying the syntax of computer languages. Here are the conventions we are using:

```
symbol
    non-terminal symbol
literal
    literal terminal symbol
token
    built-in lexical terminal symbol: string, number, identifier, nil
::=
    is defined as
|
    alternatives
```

6.3.2 Syntax Specification

The following is a current specification of the OMF. This specification will be expanded to include more functionality as the functionality of the API is extended.

```
file ::= definitions
definitions ::= definition ; definitions | nil
definition ::=
    parameter parameter-id is expression |
    boundary boundary-id is boundary |
    behavior behavior-id is behavior |
    motion motion-id is motion
boundary-id ::= identifier
parameter-id ::= identifier
behavior-id ::= identifier
motion-id ::= identifier
motion ::=
    { body } |
    motion-id
body ::= definitions initialization behaviors
initialization ::= init-attribute ; initialization | nil
init-attribute ::=
    initial vector-attr is vector |
    initial orientation-attr is orientation
vector-attr ::=
    position | velocity | acceleration |
    scale | growth | growthdot |
    shear | slip | slipdot
orientation-attr ::=
    orientation | spin | spindot
behavior ::=
    { behaviors } |
    behavior-id
behaviors ::= behavior-stmt ; behaviors | nil
behavior-stmt ::=
    when predicate opt-call behavior |
    movement |
    constraint |
    behavior
opt-call ::= call identifier arguments | nil
movement ::=
    vector-attr = vector |
    orientation-attr = orientation
constraint ::=
    boundary-constraint boundary constraint-opts |
    speed scalar-range |
    turn ori-range |
    direction ori-range
boundary-constraint ::= reflect | clamp | onto
constraint-opts ::= gain scalar opt-offset | offset scalar opt-gain | nil
opt-gain ::= gain scalar | nil
opt-offset ::= offset scalar | nil
scalar-range ::= min scalar max scalar
ori-range ::= axis vector opt-twist
opt-twist ::= twist angle to angle | nil
boundary ::=
    boundary-id |
    point-shape |
    edge-shape |
    surface-shape |
    volume-shape
point-shape ::=
    point vector |
    volume-shape . point |
    surface-shape . point |
    edge-shape . point
edge-shape ::=
    line vector vector |
    linesegment vector vector |
    path vector-list |
    surface-shape . edge |
    volume-shape . edge
surface-shape ::=
    plane vector vector |
    rectangle vector vector vector |
    volume-shape . surface |
volume-shape ::=
    sphere vector scalar |
    box vector vector orientation |
    frustum vector vector vector vector scalar scalar
vector-list ::= vector , vector-list | vector
expression ::= boolean | scalar | vector | matrix
vector-expr ::=
    vector-expr + vector-term |
    vector-expr - vector-term |
    vector-term
vector-term ::=
    scalar-term * vector-term |
    vector-term % vector-unary |
    vector-term * matrix |
    matrix * vector-term |
    vector-unary
vector-unary ::=
    neg vector |
    unit vector |
    noise vector |
    vector
vector ::=
    matrix . matrix-attr |
    motion-spec . vector-attr |
    orientation . axis |
    [ scalar scalar scalar ] |
    (vector-expr) |
    parameter-id
matrix-attr ::= position | scale | shear
motion-spec ::= motion-id | absolute motion-id | relative motion-id motion-id
scalar-expr ::=
    scalar-expr + scalar-term |
    scalar-expr - scalar-term |
    scalar-term
scalar-term ::=
    scalar-term * scalar-exp |
    scalar-term / scalar-exp |
    scalar-term % scalar-exp |
    vector-term * vector-unary |
    scalar-exp
scalar-exp ::=
    scalar ^ scalar-unary |
    scalar-unary
scalar-unary ::=
    neg scalar |
    mag scalar |
    mag vector |
    sin angle |
    cos angle |
    tan angle |
    ln scalar |
    sqr scalar |
    cbr scalar |
    noise scalar |
    angle |
    time |
    scalar
angle ::=
    scalar rad |
    scalar deg |
```

```
        orientation . angle-attr |
        asin scalar |
        acos scalar |
        atan scalar scalar
angle-attr ::= roll | pitch | yaw | twist
scalar ::=
        e |
        pi |
        number |
        ( scalar-expr ) |
        vector . scalar-attr |
        parameter-id
scalar-attr ::= x | y | z
orientation ::=
        vector angle |
        matrix . orientation |
        motion-spec . orientation-attr
matrix-expr ::=
        scalar-term * matrix-expr |
        matrix-expr * matrix-unary |
        matrix-unary
matrix-unary ::=
        inverse matrix |
        matrix
matrix ::=
        rotate orientation |
        translate vector |
        scale vector |
        shear vector |
        motion-spec . movement |
        ( matrix-expr ) |
        parameter-id
boolean-expr ::=
        boolean-expr or boolean-term |
        boolean-expr xor boolean-term |
        boolean-term
boolean-term ::=
        boolean-term and boolean-primary |
        boolean-primary
boolean-primary ::=
        scalar < scalar |
        scalar <= scalar |
        scalar == scalar |
        scalar != scalar |
        scalar >= scalar |
        scalar > scalar |
        predicate
predicate ::=
        true |
        false |
        not predicate-condition |
        predicate-condition
predicate-condition ::=
        at time |
        after time |
        before time |
        during interval |
        accessed parameter-id |
        modified parameter-id |
        above surface-shape |
        below surface-shape |
        inside volume-shape |
        on surface-shape | on edge-shape | on point-shape
        outside volume-shape
        approach boundary opt-offset |
        proximity boundary opt-offset |
        depart boundary opt-offset |
        started behavior-id |
        active behavior-id |
        terminated behavior-id |
        stationary motion-id |
        ( boolean-expr ) |
        parameter-id
interval ::= interval-type time opt-duration
interval-type ::= lifetime | period | episode
opt-duration ::= duration time-spec | nil
time ::=
        time
        time-spec |
        time-spec oclock |
        motion-id . time |
        interval . interval-attr
time-spec ::=
        hours opt-mins |
        minutes opt-secs |
        seconds
opt-mins ::= minutes opt-secs | nil
opt-secs ::= seconds | nil
hours ::= scalar hrs
minutes ::= scalar min
seconds ::= scalar sec
interval-attr ::= begin | end | duration
```

6.3.3 Examples

Here are a few examples (use case scenarios) of the ClipMotion format.

6.3.3.1 The Simplest Motion

A constant linear velocity.

motion myMotion is {initial velocity is [1 0 0];};

6.3.3.2 Velocity Controller Restricted to Plane p

In the example below a six-degree-of-freedom input device is used as a velocity controller and the motion is constrained to the xz plane. In this example the 6 DOF input device is a Spaceball, a 6 DOF input device made by Labtec, a company located at 1499 SE Tech Center Place, Ste. 350, Vancouver, Wash. 98683-9575. The Spaceball is only one of multiple input devices which the OpenMotion API will support.

```
motion myMotion is
{
    velocity = spaceball.velocity;
    onto plane [ 0 0 0 ] [ 0 1 0 ];
}
```

6.3.3.3 Flag Waving (Hierarchical Motion)

Flag is modeled as three "hinged" hierarchical sections. Each section moves relative to the local frame of reference defined by the enclosing, or parent, motion. Nesting the sections effects articulated hierarchical motion.

```
motion flagpole is    // position determines how high the flag is
{
    parameter amp is ( pi/4 ); // amplitude
    parameter freq is ( 1/2/pi ); // frequency
    parameter phase is ( freq/8 ); // phase offset
    motion flagBase is    // part attached to pole
    {
        motion flagMiddle is // part in the middle
        {
            motion flagEnd is // part that flaps
            {
                initial position is [ 0.5 0 0 ];
                orientation = [0 1 0] (amp * sin (freq * time – 2 *
            phase) rad) rad;
            };
            initial position is [ 0.5 0 0 ];
            orientation = [0 1 0] (amp * sin (freq *
            time – phase) rad)     rad;
        };
        orientation = [0 1 0] (amp * sin (freq * time) rad) rad;
    };
    initial position is [ 0 2 0 ];
};
```

6.3.3.4 One Ball Bouncing in Box

The ball (radius 0.1) moves at constant linear velocity inside a box and bounces off the walls of the box.

```
motion ball is
{
    initial velocity is [ .1 .2 .3 ];
    reflect box [0 0 0] [10 10 10] [0 1 0] 0 rad offset 0.1;
};
```

6.3.3.5 Two Balls Bouncing in Box

Two balls bounce in a box. When they collide, they exchange momentum in proportion to their mass.

parameter radius1 is 0.75;

parameter radius2 is 1.5;

boundary myBox is box [0 0 0] [10 10 10] [0 1 0] 0 rad;

```
motion ball1 is
{
    initial velocity is [ 0.1 0.1 0.1 ];
    reflect myBox offset radius1;
    reflect sphere ball2.position offset (radius1 + radius2) gain (radius2 / radius1)^3;
};
motion ball2 is
{
    initial position is [ 1 1 1 ];
    initial velocity is [ -0.1 -0.1 -0.15 ];
    reflect myBox offset radius2;
    reflect sphere ball1.position offset (radius1 + radius2) gain (radius1 / radius2)^3;
};
```

6.3.3.6 Harmonic (Spring) Motion

A particle oscillates on the x-axis between [−1 1].

```
motion harmonic is
{
    parameter freq = 10 deg;        // degrees (per second) are
    converted into radians
    parameter amplitude is [ 1 0 0 ];   // how far the spring moves
    position = amplitude * cos (freq * time) rad;   // sinusoidal
    function of time
};
```

6.3.3.7 Circular Motion

One can specify circular motion using sine and cosine, however this version uses the relationship from physics, which states that the centripetal acceleration is equal to the square of the tangential velocity divided by the radius.

```
motion circular is
{
    parameter radius is 10;
    initial position is [ radius 0 0 ];
    initial velocity is [ 0 10 0 ];
    acceleration = neg (mag circular.velocity)^2 / radius * unit
    circular.position;
};
```

6.3.3.8 Orbital Motion

Orbital motion traces an ellipse, however the velocity varies along this path. We can use Newton's law of gravitation to synthesize this path from initial conditions.

```
motion earth is
{
    parameter Me is 5.98e24;            // mass of earth
    parameter Ms is ( 329390 * Me );    // mass of sun
    parameter GMs is ( 6.6732 * Ms );   // gravitational constant
                                        times mass of sun
    parameter radius is ( mag earth.position );
    initial position is [ 1.49e11 0 0 ];
    initial velocity is [ 0 2.96e4 0 ];
    acceleration =                      // Newton's law
    GMs / radius^2 * neg (unit earth.position);
    spin = [0 0 1] (2 * pi / 86400) rad;   // day-night rotation
};
```

6.4 OPENMOTION LIBRARY: MOTIONS AND INTERFACES FOR ACTIONS

6.4.1 Overview

This section identifies a set of primitive motion classes 136, shown in FIG. 1. These are motions that are available for use as a standard part of the OpenMotion Library. The primitive motions are a sub-set of the OpenMotion Library, a possibly larger set of motions which may include ClipMotions, which will commonly be sold as part of the OpenMotion System. The. primitive motions are constructed using the C++ API functions described above.

This section also describes part of the interfaces of the Motion Editor/Viewer 182, shown in FIG. 1, which can be used to produce a wide variety of complex actions.

Giving character to any 3D object is what makes 3D interesting. The object's character is determined by its actions and reactions and these are represented by motion. The motions can be created using some fundamental building blocks. Cartoon-like gestures and emotional expressions are complex but they can be broken down into relatively few elemental or atomic motions. These motions can be adjusted easily in real time using the Motion Editor/Viewer until they look just right.

The Motion Editor/Viewer interface designs described below are part of the current design for the OpenMotion System. In other embodiments of the invention other design tools could be used. When the OpenMotion Library is incorporated into different products, it might be desirable to provide it with different design tools. For example, motion design tools used with a child's product might be very different than that described above. The idea of what motion is and how it is used is the focus of this section.

6.4.2 Foundation Motions for Action Definition

6.4.2.1 Atomic Motions

In the OpenMotion Library there are four primary atomic motions: shake, shift, spin, and swing. In. other embodiments of the invention there can be a differing number and a differing selections of atomic motions and the motions which are derived from them.

Each of the Open Motion Library's primary atomic motion will be used as a template for all other elementary motions within each category. For example, with various settings of the parameters on spin we can derive new primitives, that is derived primitives like turn, gyrate, and revolve, which are simply variations of spin. All the derived atomic motions indented under spin in Table 24 below are available as part of the OpenMotion Library, but they are simply variations of spin. This makes it easier for the user to select and apply a more precisely defined motion, since such motions can be selected by means of pop-up menus, as is shown in FIGS. 5–8. This variety of motions with predefined settings provides a head start on what the various settings should be for a particular motion. Thus gyrate has a different look than spin as a result of the different initial values but each of the motions' parameters can be changed to any specification, Each of the above four primary motions depends on the transformations translate and rotate. Some can have spatial constraints such as along a certain axis, vector, or path. Each can have some temporal constraint such as the number of times the motion is to be repeated or whether it is to run continuously.

The OpenMotion Library currently contains 4 primary and 25 secondary atomic motions (see Table 24), although this number may well be changed in the future.

TABLE 24

Atomic Motions

| Primary Atomic Motions | Secondary Atomic Motions | Motion Definition |
|---|---|---|
| 1 Shift | | translate |
| | 1.1 descend | slow fall |
| | 1.2 dunk | inverted jump |
| | 1.3 fall | downward movement influenced by gravity |
| | 1.4 jump | spring vertically upward |
| | 1.5 lunge | spring horizontally |
| | 1.6 move | continuous translation |
| | 1.7 plunge | fast fall |
| | 1.8 spring | decelerated shifting |
| 2 Shake | | translate back and forth |
| | 2.1 jiggle | multidirectional soft random shake |
| | 2.2 judder | multidirectional shake with intensity |
| | 2.3 shimmy | random shake in one direction |
| | 2.4 waggle | quick small shake in one direction |
| 3 Spin | | rotate |
| | 3.1 gyrate | random turning on various axes |
| | 3.2 lean | accelerated tilt |
| | 3.3 lurch | abrupt tilt |
| | 3.4 revolve | spin with a radius greater than zero |
| | 3.5 tilt | incomplete spin on the vertical |
| | 3.6 tip | decelerated tilt |
| | 3.7 turn | incomplete spin |
| 4 Swing | | rotate back and forth |
| | 4.1 nod | accelerated swing to one side |
| | 4.2 rock | decelerated swing to one side |
| | 4.3 sweep | abrupt fast swing |
| | 4.4 swoop | accelerated and decelerated swing |
| | 4.5 totter | random rotations on horizontal |
| | 4.6 wobble | random rotations on vertical |

6.4.2.2 Composite Motions

Motions that comprise more than one primitive motion are called composite motions. An example of this would be spiral which is made up of one spin and two shifts (see Table 25, below, and FIG. 24). Altering any one of these three primitive motions' parameters can change that component of spiral.

Currently there are 14 primary and 7 secondary composite motions as shown in table 25, although this number may well be varied in the future.

TABLE 25

Composite Motions

| Primary Composite Motions | Secondary Composite Motions | Motion Composition |
|---|---|---|
| 1 Bounce | | plunge + spring |
| | 1.1 hop | shift + bounce |
| 2 Crumple | | several deformations |
| 3 Dangle | | bounce + swing |
| 4 Drift | | move + turn |
| 5 Loop | | shift + turn |
| 7 Orbit | | spin + revolve |
| 8 Recoil | | (−shift) + (+shift) |
| 9 Reel | | spin + loop |
| 10 Seesaw | | bounce + dip |
| 11 Skid | | slide + turn |
| 12 Squirm | | move + seesaw |
| | 12.1 slither | squirm + seesaw |
| 13 Spiral | | revolve + shift + shift |
| | 13.1 corkscrew | revolve + perpendicular shift |
| 14 Waddle | | rock + turn |
| | 14.1 toddle | rock + turn |
| 15 Wriggle | | move + twist |
| | 15.1 writhe | move + twist |
| 16 Wring | | twist + scale |
| 17 Swirl | | turn + orbits |

6.4.2.3 Reactive Motions

Reactive motions are atomic or composite motions triggered by a specific motion trigger. These motions generalize object control. Reactive motions are intended to be used in interaction and are defined to facilitate the development of interactive applications. Motion triggers are generalizations of triggers, which typically only have an on/off setting, and provide access to a parameter with varying magnitude and direction (a force). As is indicated by Table 26, the OpenMotion Library currently has 14 primary and 17 secondary reactive motions.

For example, referring to Table 26, if the reactive motion push/pull is applied to an object, the object will either swing or shift around relative to the mouse interaction. If the reactive motion wind is applied to say a field of daisies then these will sway in response to the direction and magnitude of the parameter.

TABLE 26

Reactive Motions

| Primary Reactive Motion | Secondary Reactive Motion | Motion Definition | Mouse movement |
|---|---|---|---|
| 1 grab | | shift and turn with freedom | 6DOF |
| | 1.1 float | move with changing velocity | 6DOF |
| | 1.2 twirl | spin with changing velocity | 6DOF |
| 2 hurl | | turn | None |
| | 2.1 fling | turn abruptly | None |
| 3 jerk | | shift towards | None |
| | 3.1 tug | small shifts towards | None |
| 4 jostle | | decelerated judder | None |
| | 4.1 joggle | decelerated jiggle | Relative |
| | 4.2 wiggle | decelerated waggle | Relative |
| 5 jounce | | seesaw abruptly | None |
| 6 lift/lower | | shift upward or downward | Relative |
| | 6.1 drop | move downward | None |
| | 6.2 heave | shift abruptly upward | None |
| | 6.3 hoist | small recoil upward | None |
| | 6.4 raise | move upward with constant velocity | None |
| | 6.5 sink | small recoil downward | None |
| 7 push/pull | | shift or swing | Relative |
| | 7.1 bump | shift or swing | None |

TABLE 26-continued

Reactive Motions

| Primary Reactive Motion | Secondary Reactive Motion | Motion Definition | Mouse movement |
|---|---|---|---|
| 8 roll | | move and turn relative to position | Relative |
| 9 shove | | shift away | None |
| | 9.1 jolt | small shifts away | None |
| 11 slide | | move with changing velocity | Relative |
| | 11.1 coast | move with deceleration | None |
| | 11.2 glide | move with constant velocity | None |
| 12 strike | | decelerated shimmy | Relative |
| 13 tumble | | turn downward | Relative |
| | 13.1 topple | turn downward | None |
| 14 wind | | turn repeatedly in circles | Relative |
| | 14.1 coil | curl repeatedly in circles | None |

6.4.2.4 Deformations

Distortions of the geometry such as twist or stretch are known as deformations. As is indicated in Table 27, there are currently 10 primary and 10 secondary deformations in the OpenMotion Library.

TABLE 27

Deformations

| Primary Deformations | Secondary Deformations | Definitions |
|---|---|---|
| 1 bend | | to assume a different and curved shape |
| | 1.1 curl | bend beyond 180 degrees forming small circles |
| | 1.2 flex | bending repeatedly |
| 2 ripple | | an undulating motion radiating out from a central point |
| 3 scale | | to proportionally change in size |
| | 3.1 deflate | to reduce in size |
| | 3.2 swell | to expand gradually beyond normal limits |
| 4 shear | | to slide two contiguous parts parallel to each other |
| 5 skew | | to place or turn at an angle. a slanted or oblique direction |
| | 5.1 slant | to lie in an oblique direction a degree of deviation from a horizontal plane |
| 6 squash | | to flatten out under pressure or impact |
| | 6.1 squeeze | to squeeze or force by pressure so as to alter or destroy structure |
| | 6.2 crush | to exert pressure on opposite sides causing compression |
| 7 stretch | | extend to or beyond the ordinary limit |
| 8 taper | | diminish gradually |
| 9 twist | | turn in the opposite directions |
| | 9.1 distort | twist out of proper shape or condition |
| | 9.2 warp | twist or bend out of a plane |
| | 9.3 wrench | twist violently |
| 10 wave | | an undulating curve, a sinuate margin and rippled surface |

6.4.2.5 New Motions

The user can create new motion from motions defined in the OpenMotion Library in several different ways. One is by using the New Motion dialogue boxes shown in FIGS. 25–28. These enable a user to set the Initial Conditions of motion or input an expression for Transition, Rotation, and Scaling.

6.4.2.6 Saved Motions

The OpenMotion Library supplies lists of standard motions the user can work with. A user may change the setting of such a standard motion and save it under a new name. To retrieve it, he or she either uses the pop-up menu to open a "Saved" motion or accessed it from the menu bar commands. Saved motions are any motions that are different than the standard motions originally provided by the library. Saved motions can be a composite of any number or combined motions, even previously saved ones.

6.4.2.7 Serial Motions

Any motion that uses temporal. predicates to control a series of motions falls into this category with the exception of eMotions and a few of the Atomic motions such as "Turn". An example of this would be the current "Flap-Stop" or "Orbit-Stop". With the new design of motions, these would actually be created using the Atomic motion "Swing" and "Spin" respectively. This category is generally composed of motions that have been customized for a particular purpose, such as "Butterfly Wing". Even though "Butterfly Wing" is a composite of three "Swing" motions, its components still only have two states, active and static.

6.4.2.8 eMotions

Motions that tend to give the appearance of exhibiting emotional qualities are called eMotions. With the combination of primitive motions and deformations with state changes, these motions are able to make an object act as if it had believable human emotions. There are 25 primary and 88 secondary eMotions (see Table 28).

TABLE 28 eMotions

| Primary eMotions | Secondary eMotions | Motion Composition |
|---|---|---|
| 1 afraid | 1.1 anxious | |
| | 1.2 apprehensive | |
| | 1.3 concerned | |
| | 1.4 nervous | |
| 2 amazed | 2.1 astonished | |
| | 2.2 baffled | |
| | 2.3 confused | |
| | 2.4 perplexed | |
| | 2.5 puzzled | |
| 3 angry | 3.1 furious | |
| | 3.2 raging | |
| | 3.3 raving | |
| | 3.4 spontaneous | |
| | 3.5 violent | |
| | 3.6 wild | |
| 4 awake | 4.1 alarm | nod (nod + nod + nod + jiggle) |
| | 4.2 alert | |
| | 4.3 aware | |
| | 4.4 quick-witted | |
| | 4.5 sharp | |
| | 4.6 wake | |
| 5 proud | 5.1 boastful | |
| | 5.2 smart | |
| 6 drunk | 6.1 blind | |
| 7 calm | 7.1 composed | |
| | 7.2 placid | |
| | 7.3 relaxed | |
| | 7.4 sedate | |
| | 7.5 tame | |
| | 7.8 tranquil | |
| 8 cautious | 8.1 careful | |
| | 8.2 conservative | |
| | 8.3 timid | |
| 9 disappointed | 9.1 defeated | |
| | 9.2 desolate | |
| | 9.3 frustrated | |
| | 9.4 let down | |
| 10 evil | 10.1 harmful | |
| | 10.2 vicious | |
| | 10.3 wicked | |
| 11 excited | 11.1 activated | |
| | 11.2 agitated | |
| | 11.3 aroused | |
| | 11.4 delirious | |

TABLE 28-continued eMotions

| Primary eMotions | Secondary eMotions | Motion Composition |
|---|---|---|
| | 11.5 emotional | |
| | 11.6 frantic | |
| | 11.7 stimulated | |
| | 11.8 unrestrained | |
| 12 frightened | 12.1 panicky | turn + stretch + lunge |
| | 12.2 petrified | (squash) + gyrate (joggle) |
| | 12.3 scared | |
| | 12.4 terrified | |
| 13 happy | 13.1 carefree | |
| | 13.2 euphoric | |
| | 13.3 exhilarated | |
| | 13.4 glad | |
| | 13.5 lighthearted | |
| | 13.6 pleased | |
| 14 jealous | 14.1 covetous | |
| | 14.2 envious | |
| 15 kind | 15.1 attentive | |
| | 15.2 compassionate | |
| | 15.3 friendly | |
| | 15.4 gentle | |
| | 15.5 sensible | |
| | 15.6 thoughtful | |
| | 15.7 tolerant | |
| | 15.8 warm | |
| 16 lazy | 16.1 exhausted | |
| | 16.2 shiftless | |
| | 16.3 slothful | |
| | 16.4 sluggish | |
| 17 lustful | | |
| 18 mean | 18.1 hateful | |
| | 18.2 spiteful | |
| 19 regretful | 19.1 regretful | |
| | 19.2 sorrowful | |
| | 19.3 wished | |
| 20 sad | 20.1 pitiful | |
| | 20.2 sorry | |
| | 20.3 woeful | |
| 21 sexy | 21.1 seductive | |
| 22 shy | 22.1 timid | |
| 23 silly | 23.1 dazed | |
| | 23.2 dizzy | |
| | 23.3 giddy | |
| | 23.4 goofy | |
| | 23.5 ridiculous | |
| | 23.8 wacky | |
| 24 sleepy | 24.1 bored | |
| | 24.2 tired | |
| 25 sly | 25.1 crafty | |
| | 25.2 cunning | |
| | 25.3 secretive | |
| | 25.4 slick | |
| | 25.5 slink | |
| | 25.6 tricky | |

6.4.2.9 Special or Behavioral Motions

Special motions are basically motions that have more than one behavioral state using more than just temporal predicates. These motions contain several states changes and triggers, unlike Serial Motions which cycle between active and static. An example would be "Bounce On" which uses proximity predicates and is linked directly with another unique motion node.

6.4.2.10 Controlled Motions

Wind and Gravity are two global controllers that influence Controlled motions. The variable parameters on a controlled. motion are derived from the controllers. For example, Sway is applied to the three segments that make up the stem. Sway has the same Basic parameters as Swing except a dialog box is never seen. Instead we see the Wind dialog box and the changes we make to it affect Sway. This is discussed further in the Dialog Boxes section.

There are currently 4 Controlled motions: Sail, Sway, Waver, and Whirl, as is indicated in Table 29. They complement the four Atomic motions (Shift, Swing, Shake, and in) respectfully.

TABLE 29

Controlled Motions

| Controlled Motions | Motion Definition | Controllers |
|---|---|---|
| 1 Sail | translate see shift | wind, gravity, . . . |
| 2 Waver | translate back and forth see shake | wind, gravity, . . . |
| 3 Whirl | rotate see spin | wind, gravity, . . . |
| 4 Sway | rotate back and forth see swing | wind, gravity, . . . |

6.4.3 Dialog Boxes

FIGS. 9–29 and 32 illustrate some of the Motion Editor/Viewer's dialog boxes. Additional dialog boxes will be added to the Editor/Viewer in the future. For example, additional controllers will probably be needed for Deformations and Special behavioral motions.

The top of each motion dialog box, of the types shown in FIGS. 9–28, contain the name of the motion and, although not shown in these figures, the name of object it is associated with, if any. The dialog boxes can be minimized for ease of viewing. At the bottom of each there are four buttons: Info, Code, Apply, Reset, and Save. The motion will automatically update as the sliders are moved. The Apply button is used when typing in a numerical value to indicate the current typed value is to be applied. The Code button causes an editable window to be popped up showing the C++ or OpenMotion Format code corresponding to the current motion. The Reset button returns the Motion to the values it had when read from the OpenMotion Library or when last saved. Pressing the Save button causes a dialog box to pop up which allows the motion to be saved and, if the user has changed any of its values, renamed.

Within each motion dialog box there are three or more tabbed parameter groups; Basic, Advanced, Temporal, Specialized. In the future, additional tabs can be added, such as for "Triggers".

6.4.3.1 Atomic Motions

Primitive motion dialog boxes currently have the three or four tabbed parameter groups just discussed: Basic, Advanced, Temporal, and Specialized.

6.4.3.1.1 Basic Parameters

The Basic tab contains the common controls for a particular motion. FIGS. 9, 13, 16, 19, and 23 show examples of Basic setting tabs. They control the axis, speed, and displacement of the motion. In the axis selections X, Y, or Z may be chosen. "Other" indicates an axis vector other than the standard XYZ. Random chooses an axis at random but only when the object has reached the end of its active cycle or a maximum or minimum displacement.

Figure 13:
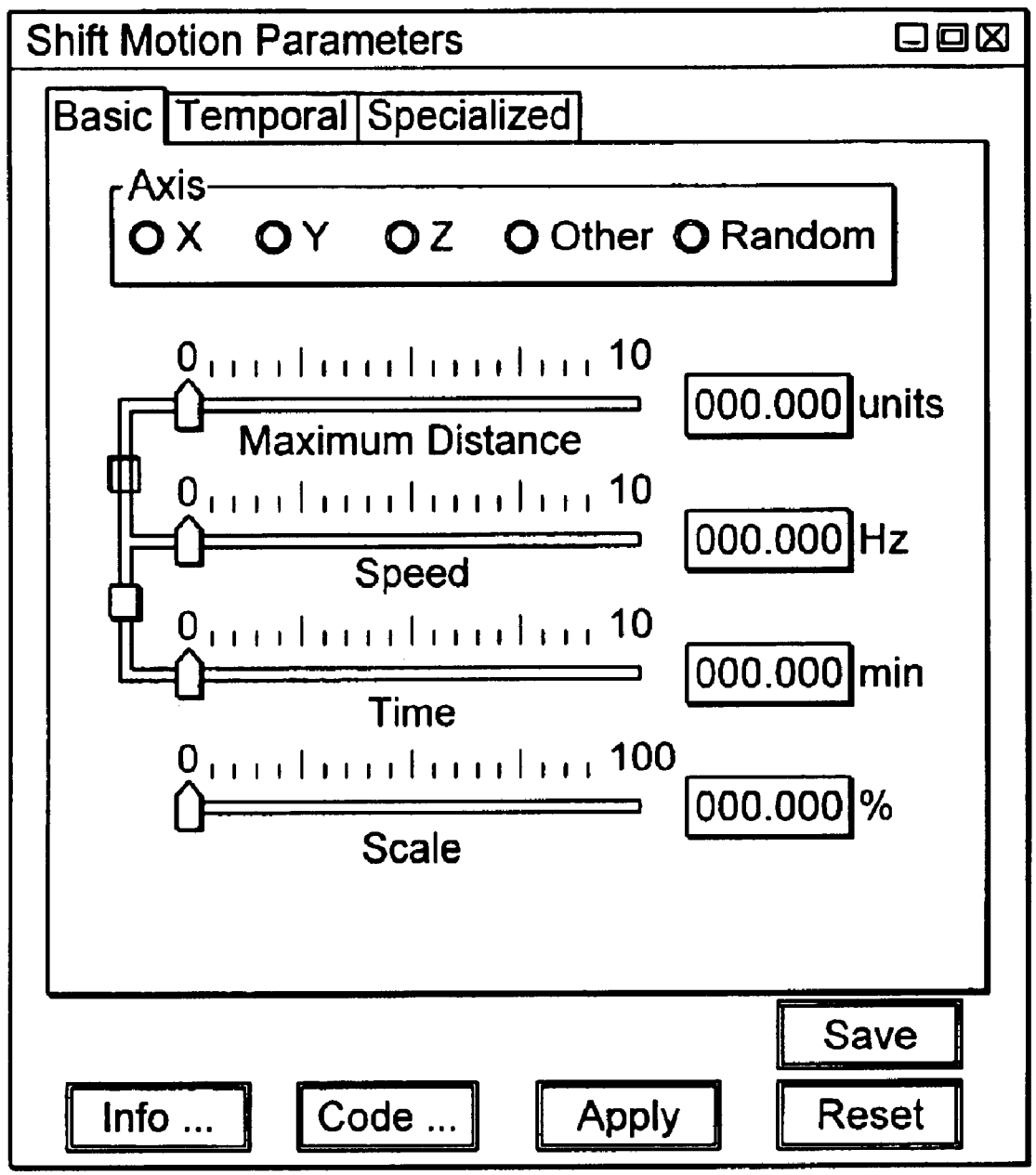
FIGS. 13–15 illustrate, respectively, the Basic, Temporal, and Specialized tabs of the Shift Motion dialog box provided by the Motion Editor/Viewer.
Figure 14:
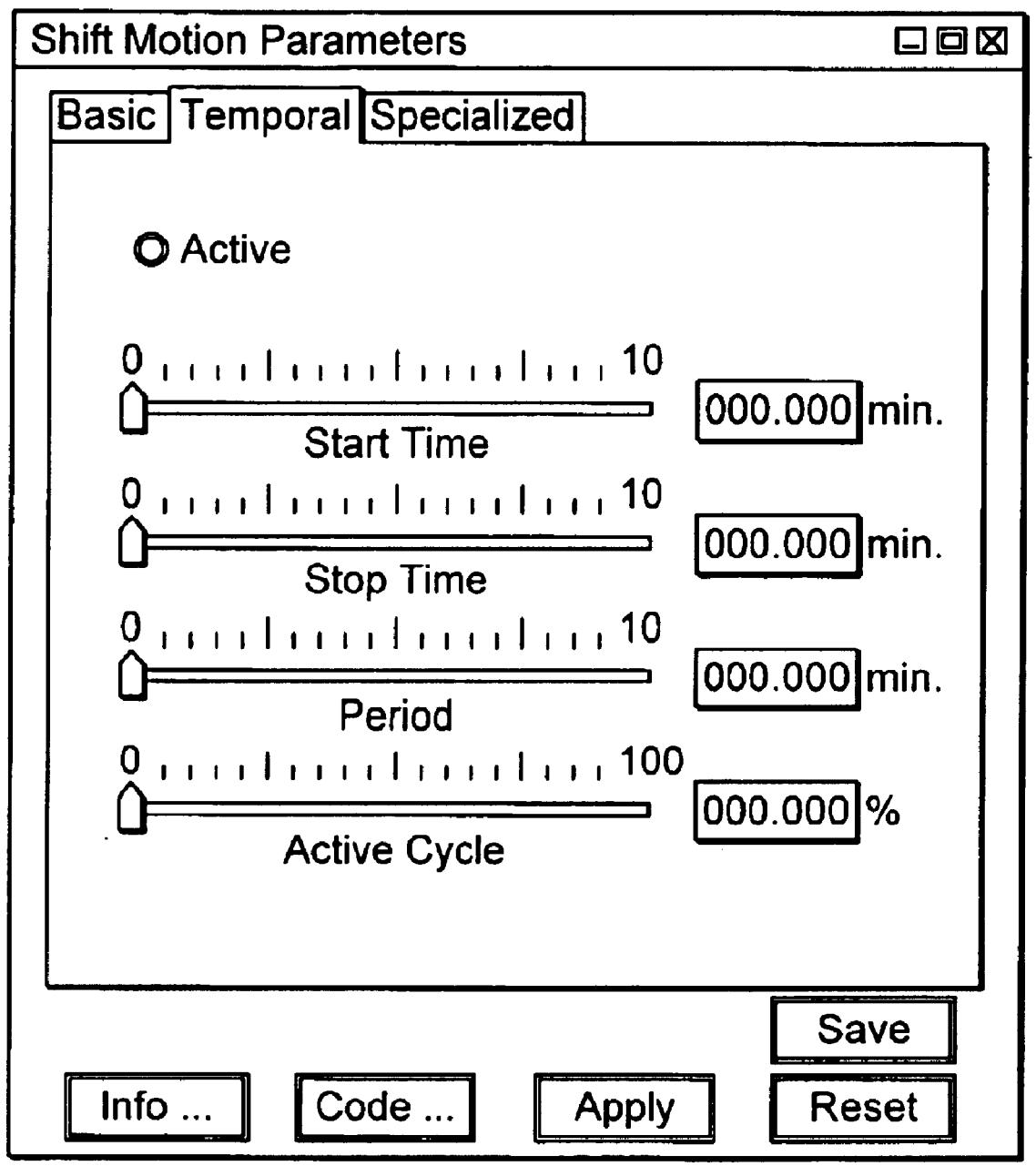
Figure 15:
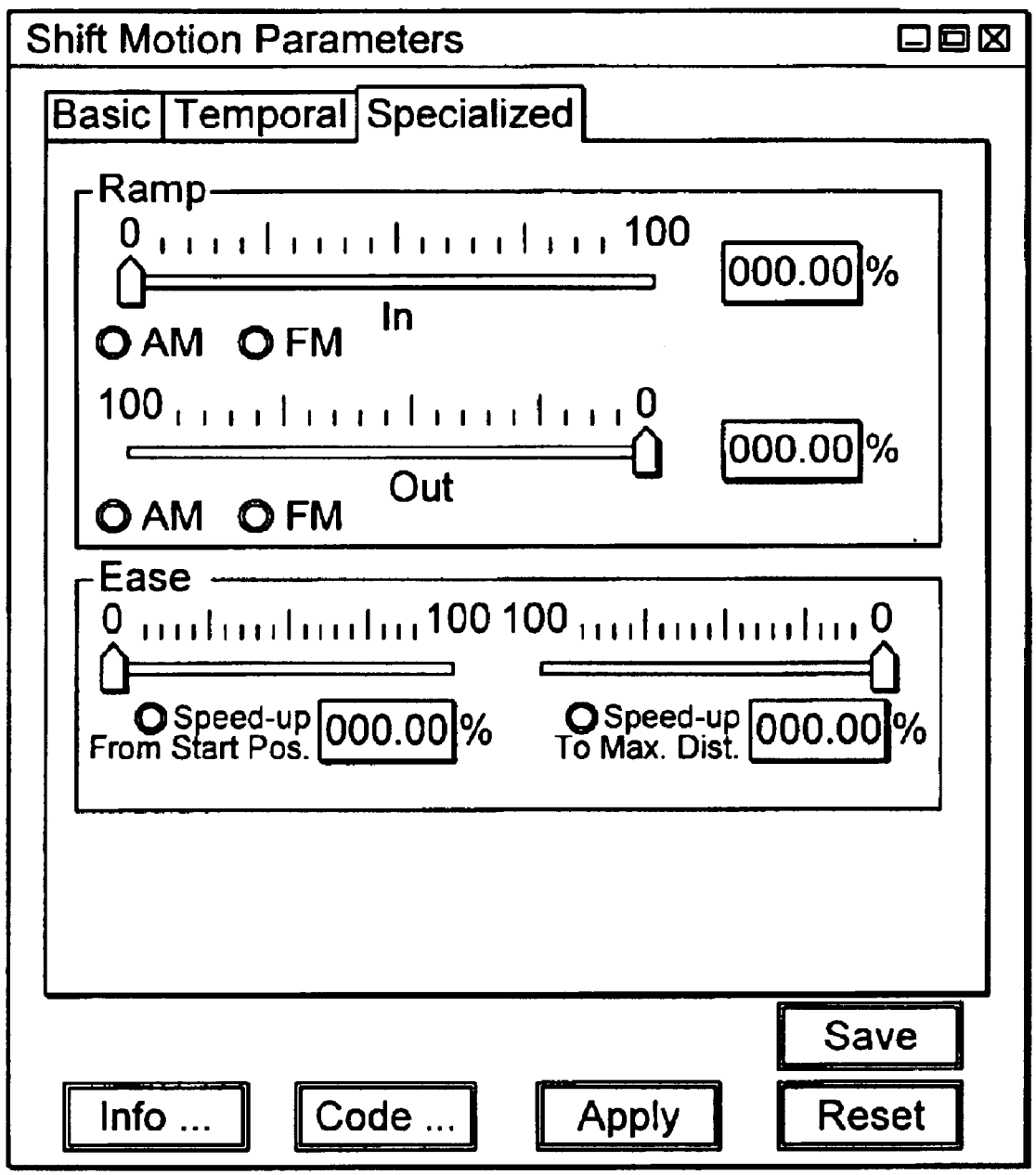
Figure 16:
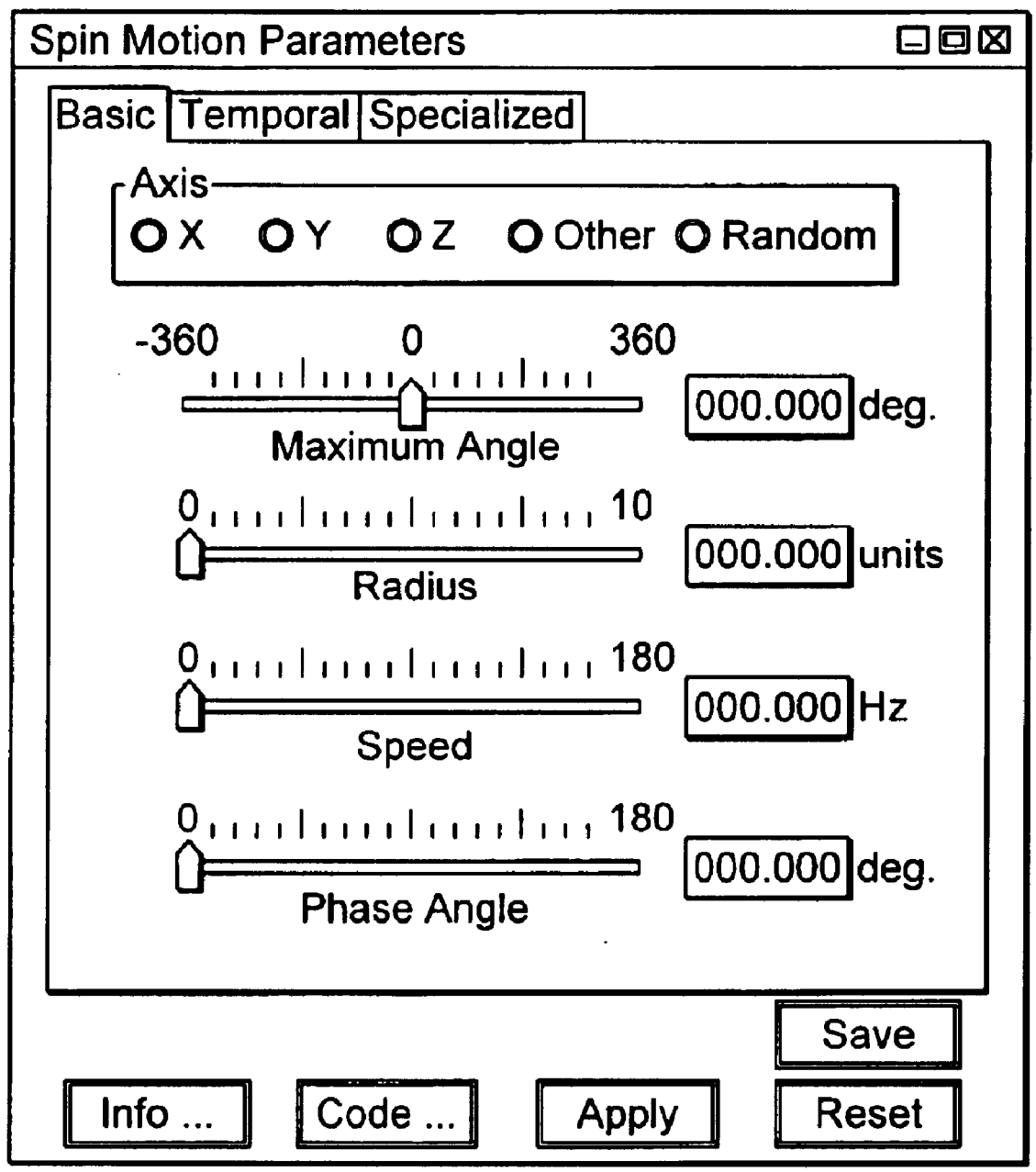
FIGS. 16–18 illustrate, respectively, the Basic, Temporal, and Specialized tabs of the Spin Motion dialog box provided by the Motion Editor/Viewer.
Figure 17:
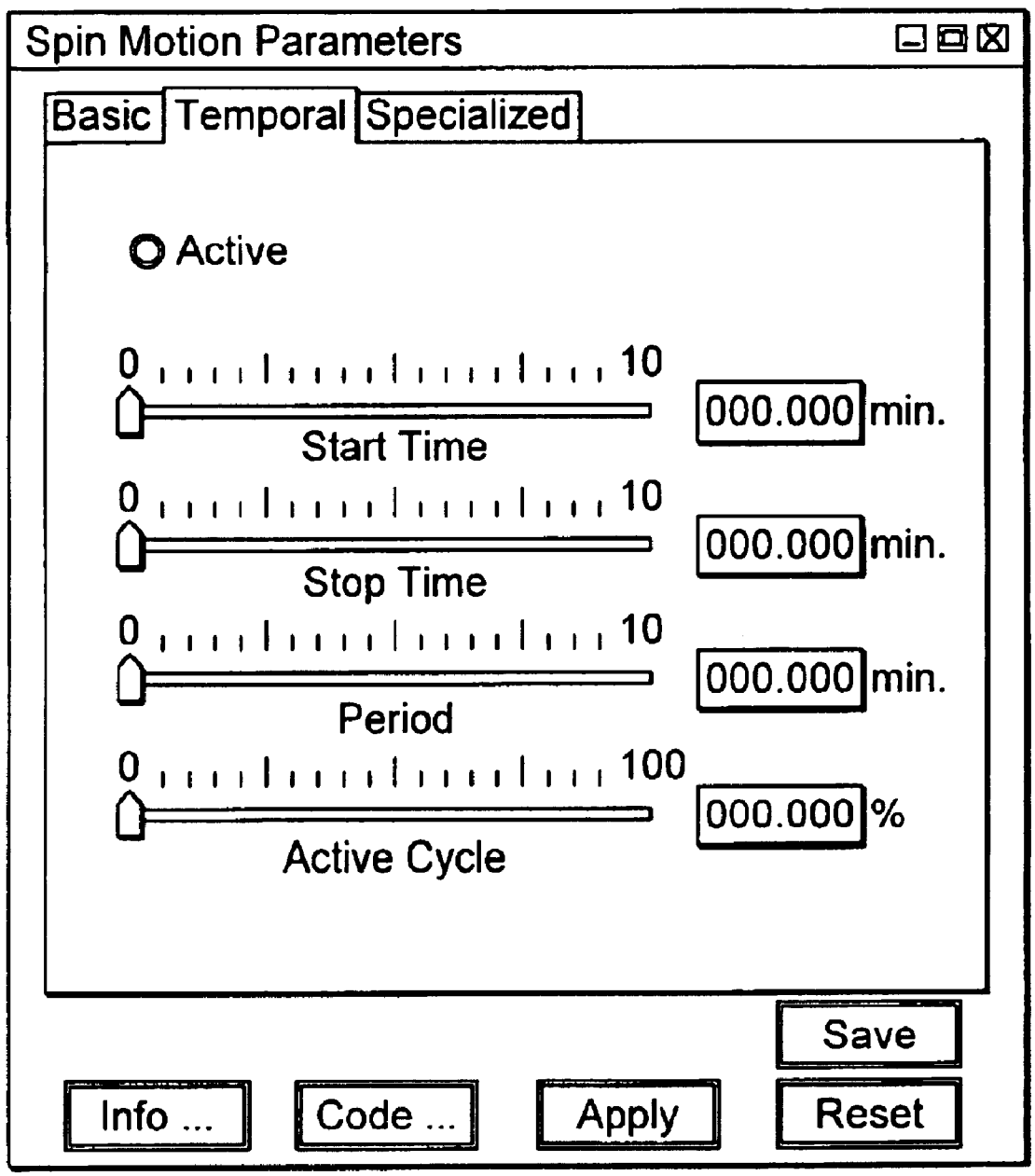
Figure 18:
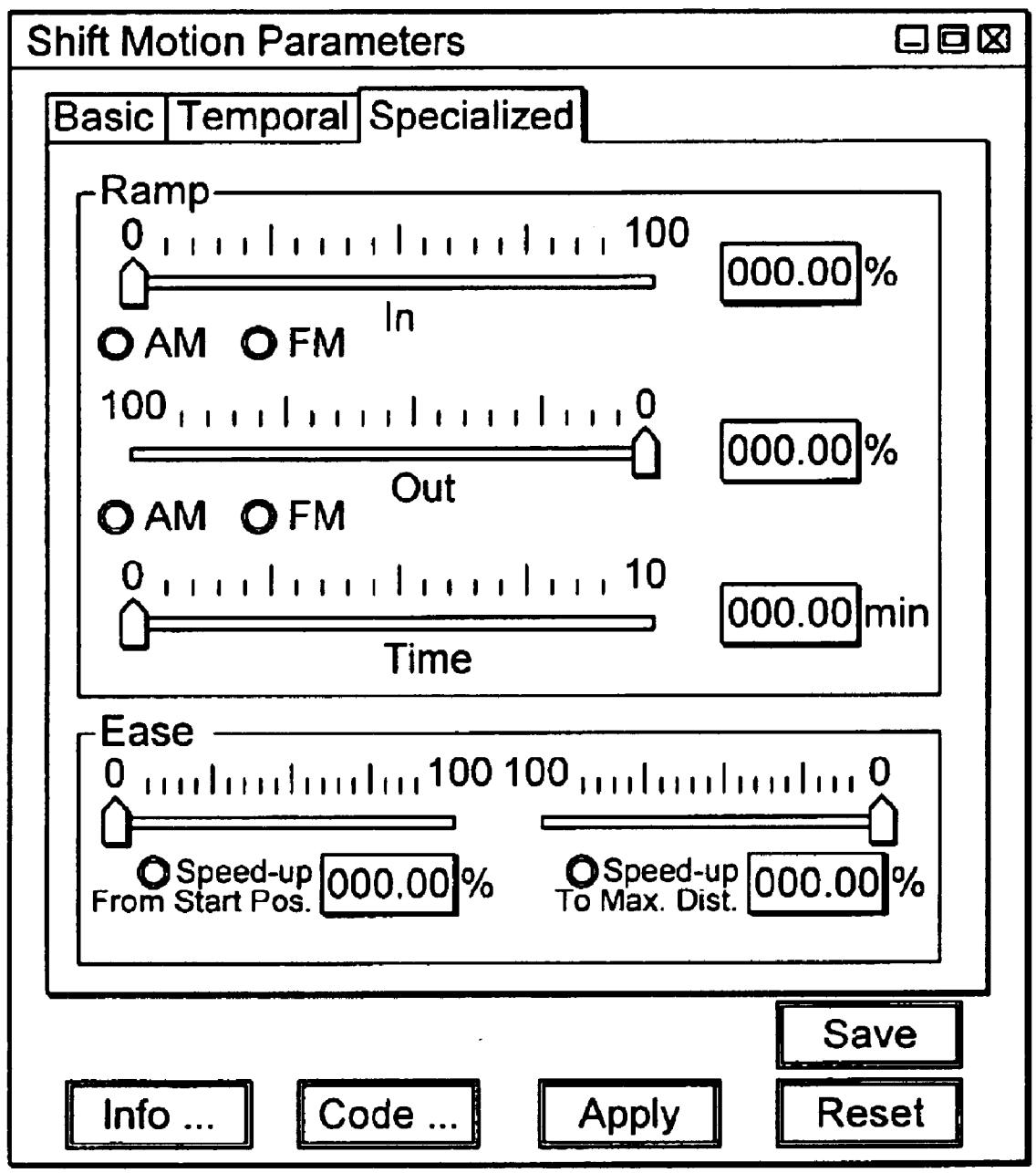
Figure 19:
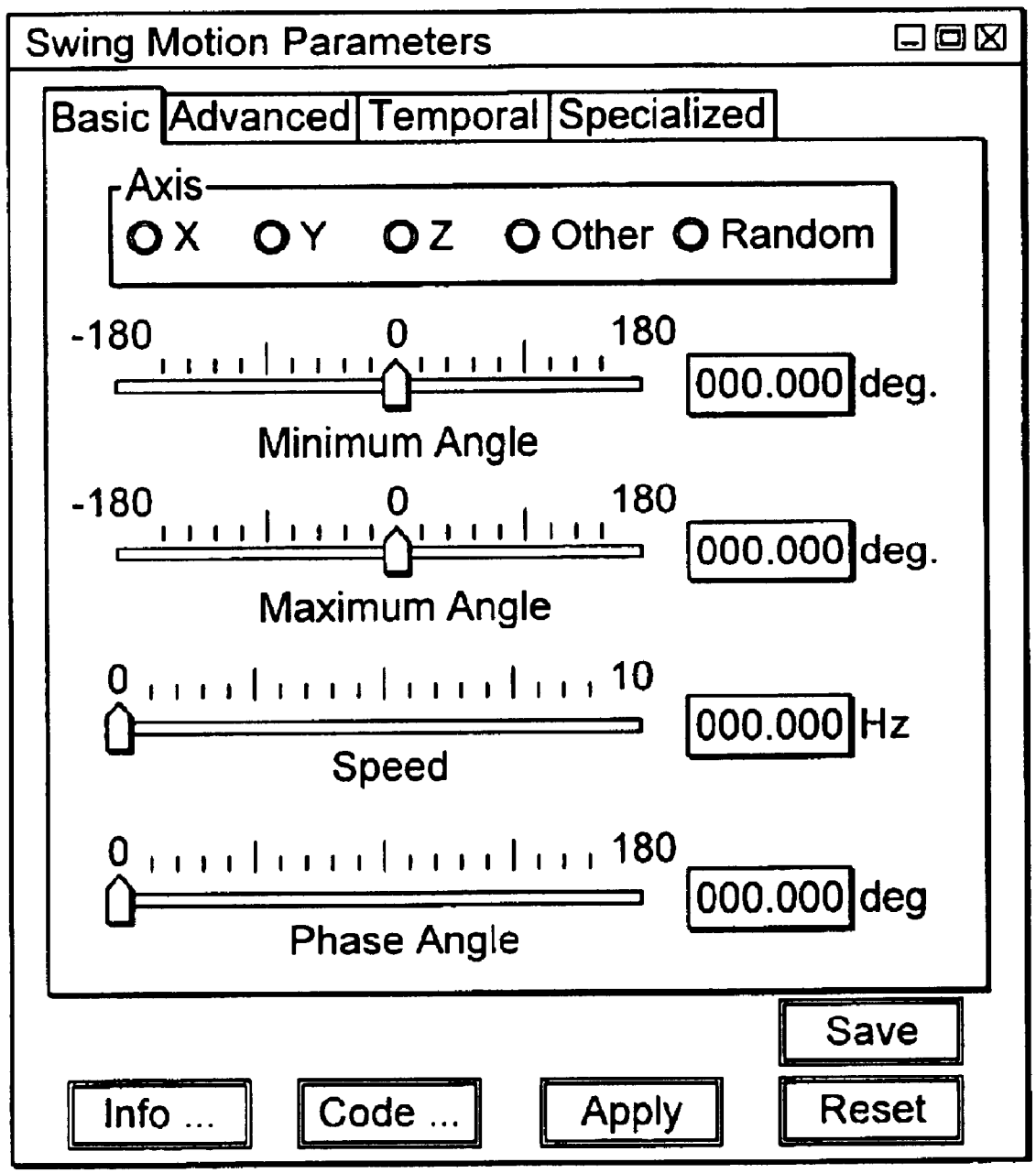
FIGS. 19–22 illustrate, respectively, the Basic, Advanced, Temporal, and Specialized tabs of the Swing Motion dialog box provided by the Motion Editor/Viewer.

As shown in FIG. 13, Shift has a unique way to determine its motion, either through the Maximum Distance and Speed sliders or Speed and Time. The Scaling feature appears in the Basic tab instead of the Advanced tab.

6.4.3.1.2 Advanced Parameters

Figure 10:
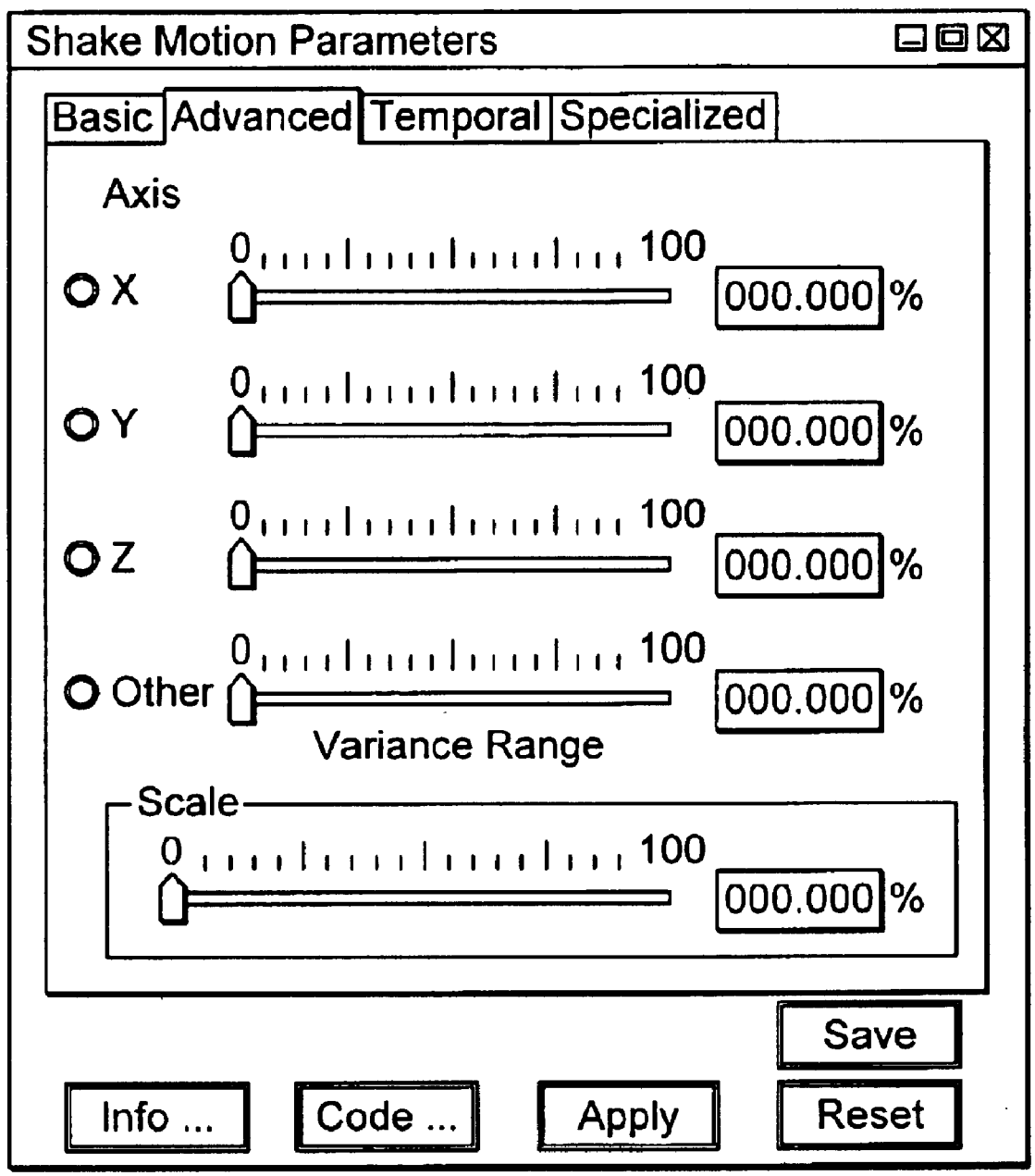
Figure 11:
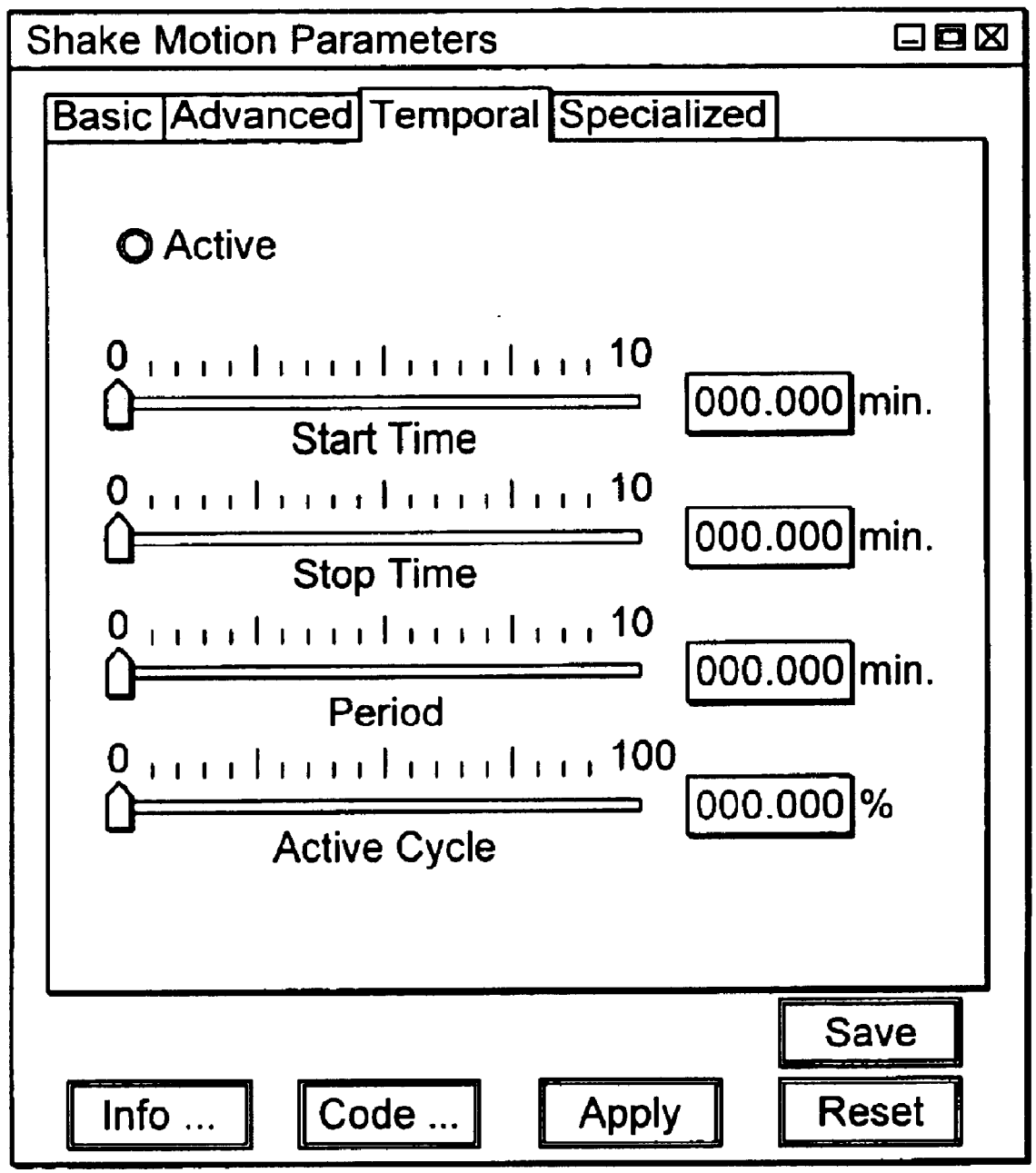
Figure 12:
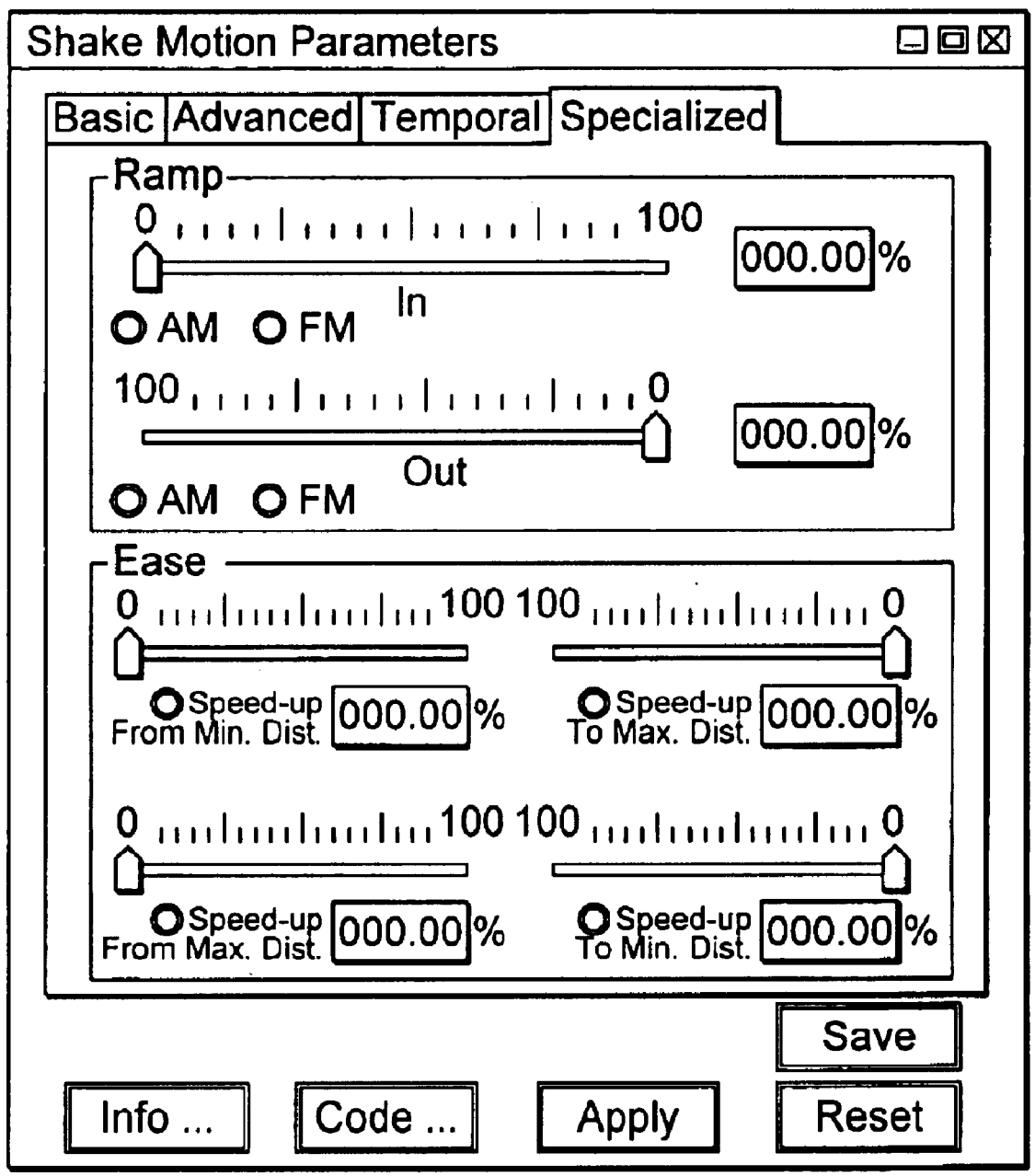
Figure 20:
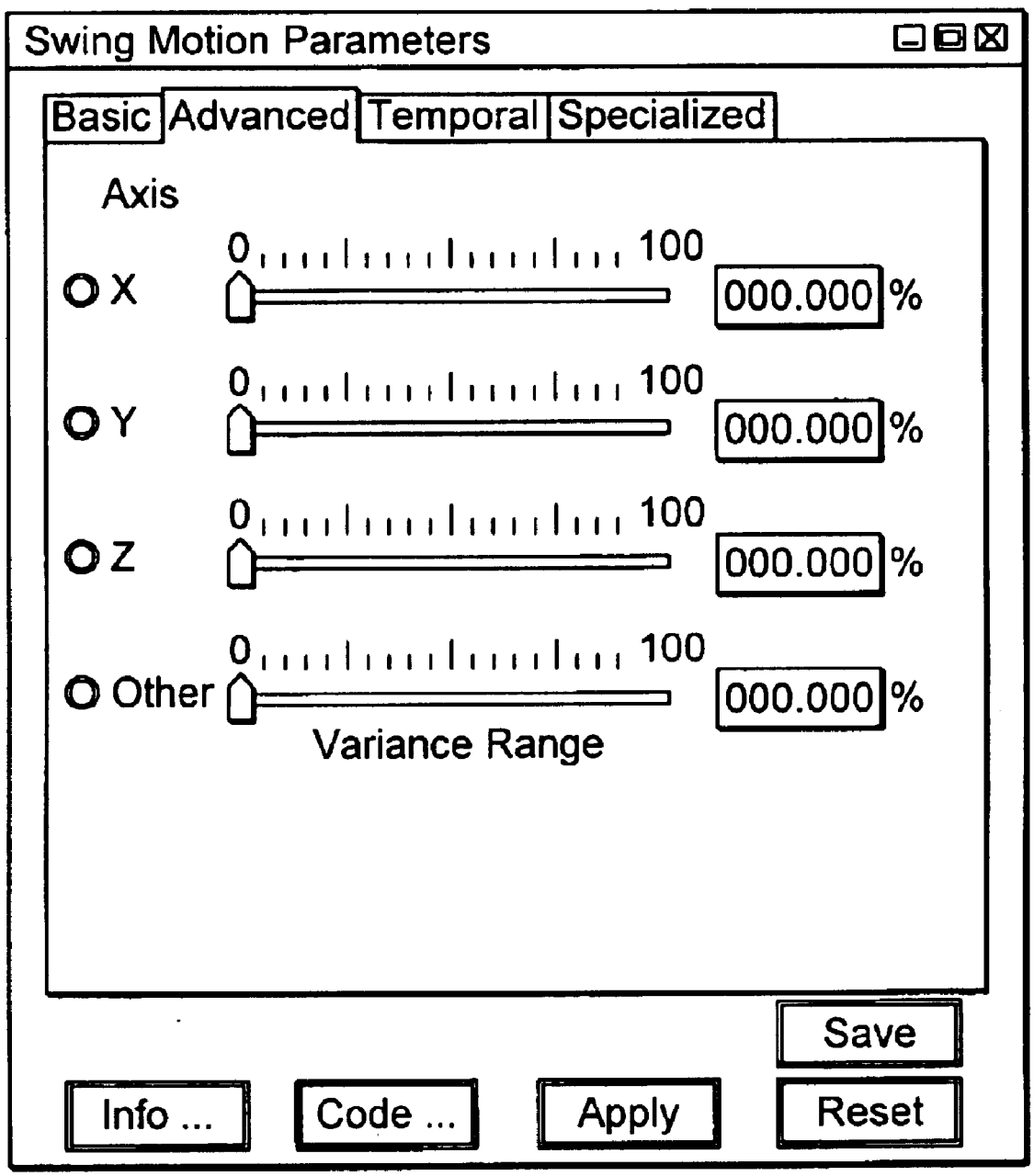
Figure 21:
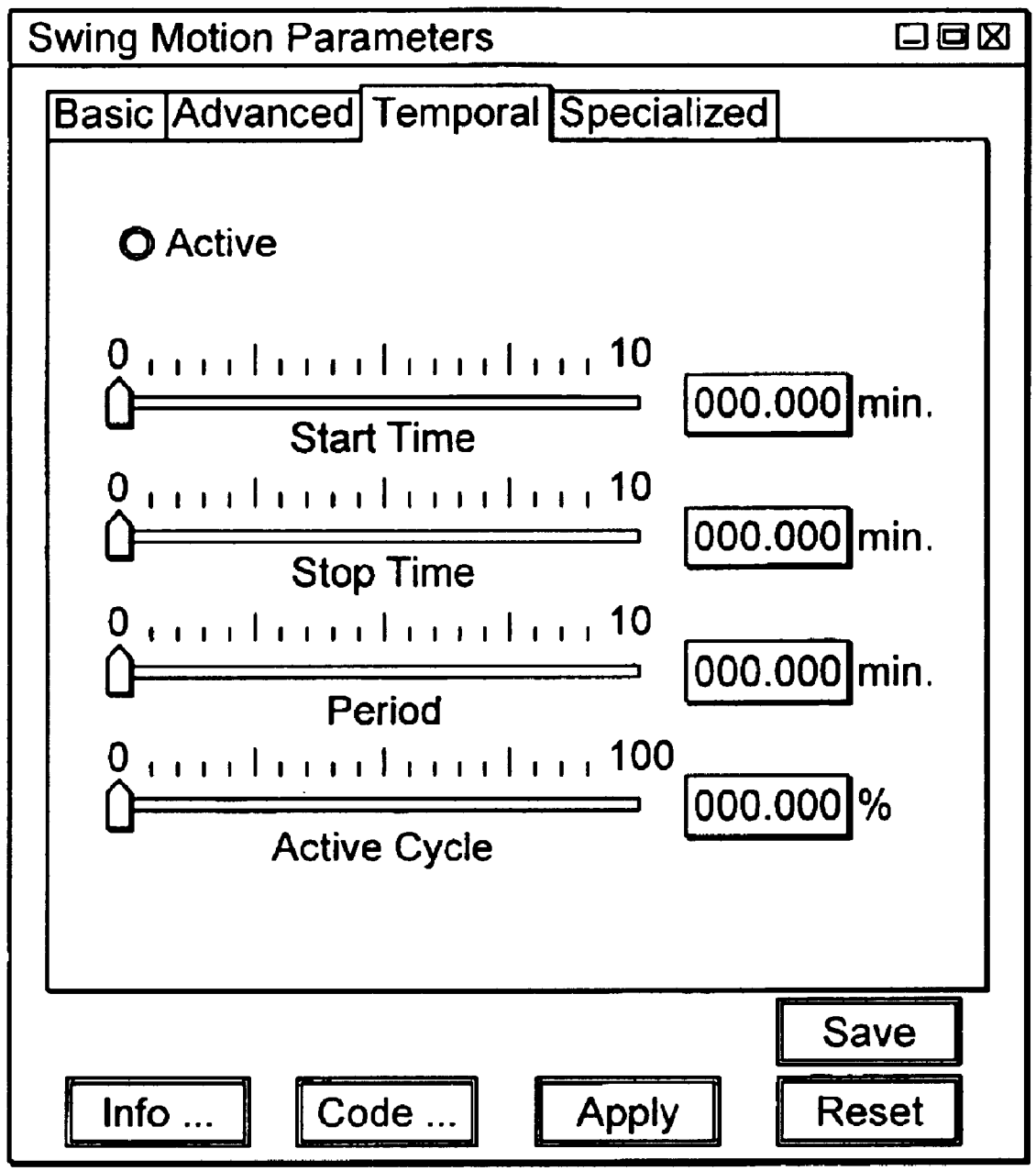
Figure 22:
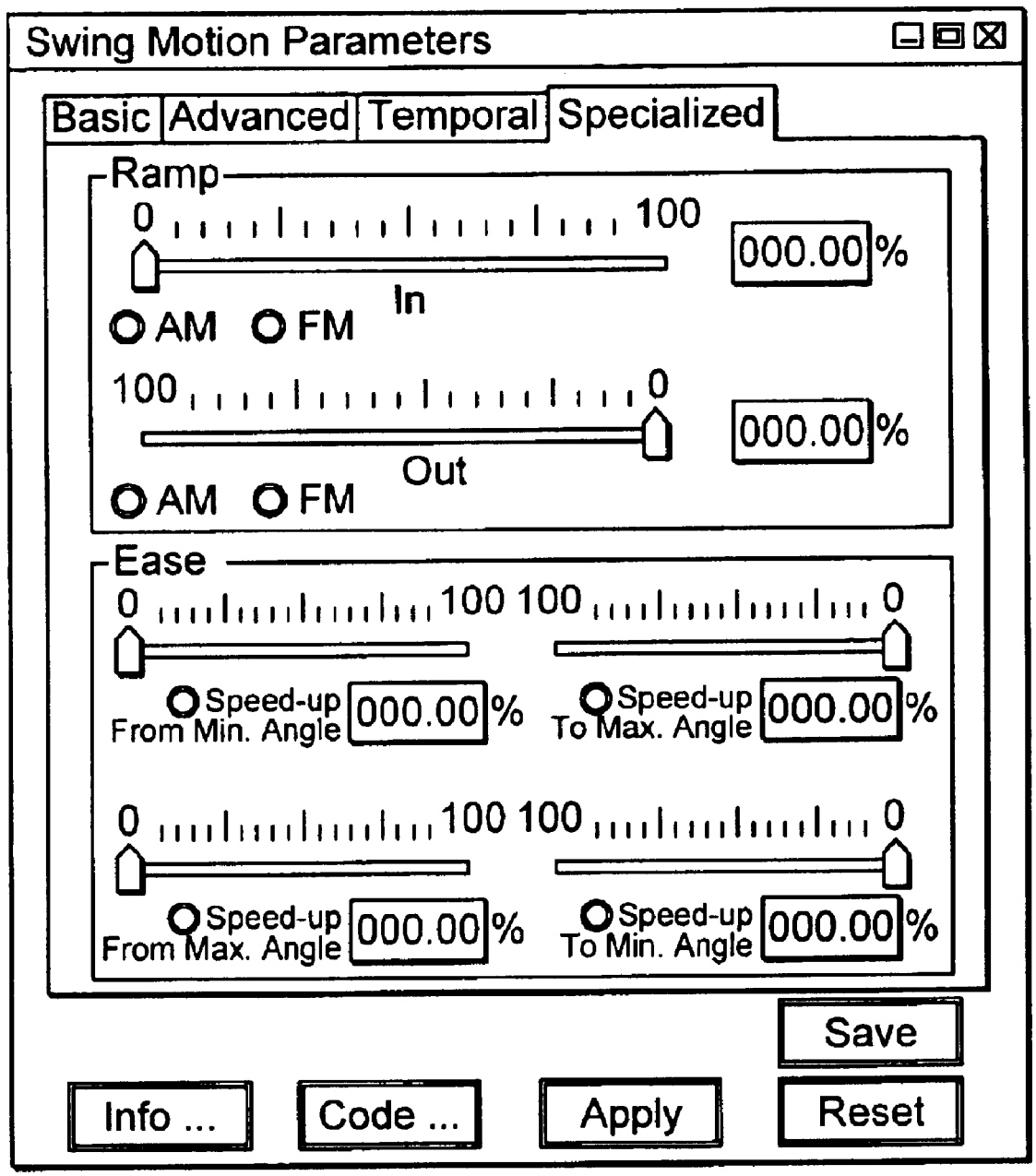

The Advanced tab controls what is called a motion's variance range and scale. FIGS. 10 and 20 provide examples of an Advanced tab. The variance range controls the variation of movement between the maximum and minimum displacement of a motion. For example, shake may have a max. distance of 10 units and a min. of 10. With the variance set at 0%, the object will move rhythmically from side to side 10 units left and right. Setting the variance to 50% will create a variance range of 5 units at either end of the motion. When the object shifts to the right, it may travel between 5 and 10 units. The distance it determined randomly by a noise function. The same thing happens when it shifts to the left. The numbers may look like this: 8 right, 6 left, 10 right, 7 left, 7 right, 9 left . . . .

This feature allows us to change "Shake" into "Shimmy". If the displacement of Shimmy needed to be amplified, the max. and min. values could be changed or the Scale slider could be adjusted.

6.4.3.1.3 Temporal Parameters

The Temporal tab overrides the continuous action of a motion if the Active button in checked. Examples of temporal tabs are shown in FIGS. 11, 14, 17 and 21. The Start Time and Stop Time are tied to the sim time. The Period is how long a particular motion cycle lasts, and the Active Cycle controls how long its active within the Period. For example, a Spin motion may have a Period of 10 sec. and an Active Cycle of 20%. The object will spin (become active) for 2 sec. and remain still for 8 seconds.

6.4.3.1.4 Specialized Parameters

Specialized settings have Ramp and Ease controls. Examples of the Specialized tab are shown in FIGS. 12, 15, 18, and 22. The Ramp sliders control the acceleration and deceleration in and out of an entire motion. The Ease sliders control the acceleration and deceleration to and from a displacement sequence. For example, a "Swing" motion may have a lifetime of 10 minutes with a displacement of 90 degrees left and right at a speed of one swing per second, a 1-second swing to the left followed by a 1-second swing to the right. A choice is given in the Ramp setting of AM or FM. AM controls the amplitude of the motion. At 50% IN the swing displacement will start at 0 degrees and ramp up to 90 degrees after 5 minutes. FM controls the frequency. At 50% IN the swing action will slowly ramp up from less than 1-second for a displacement cycle to the full 1-second per displacement at 5 minutes.

Setting the Ease From Min. Angle slider to 50% will cause the swing to accelerate towards its Max. Angle. Checking the Speed-up button causes the swing to decelerate towards its Max. Angle (it will do the opposite of Ease).

6.4.3.2 Composite Motions

Figure 23:
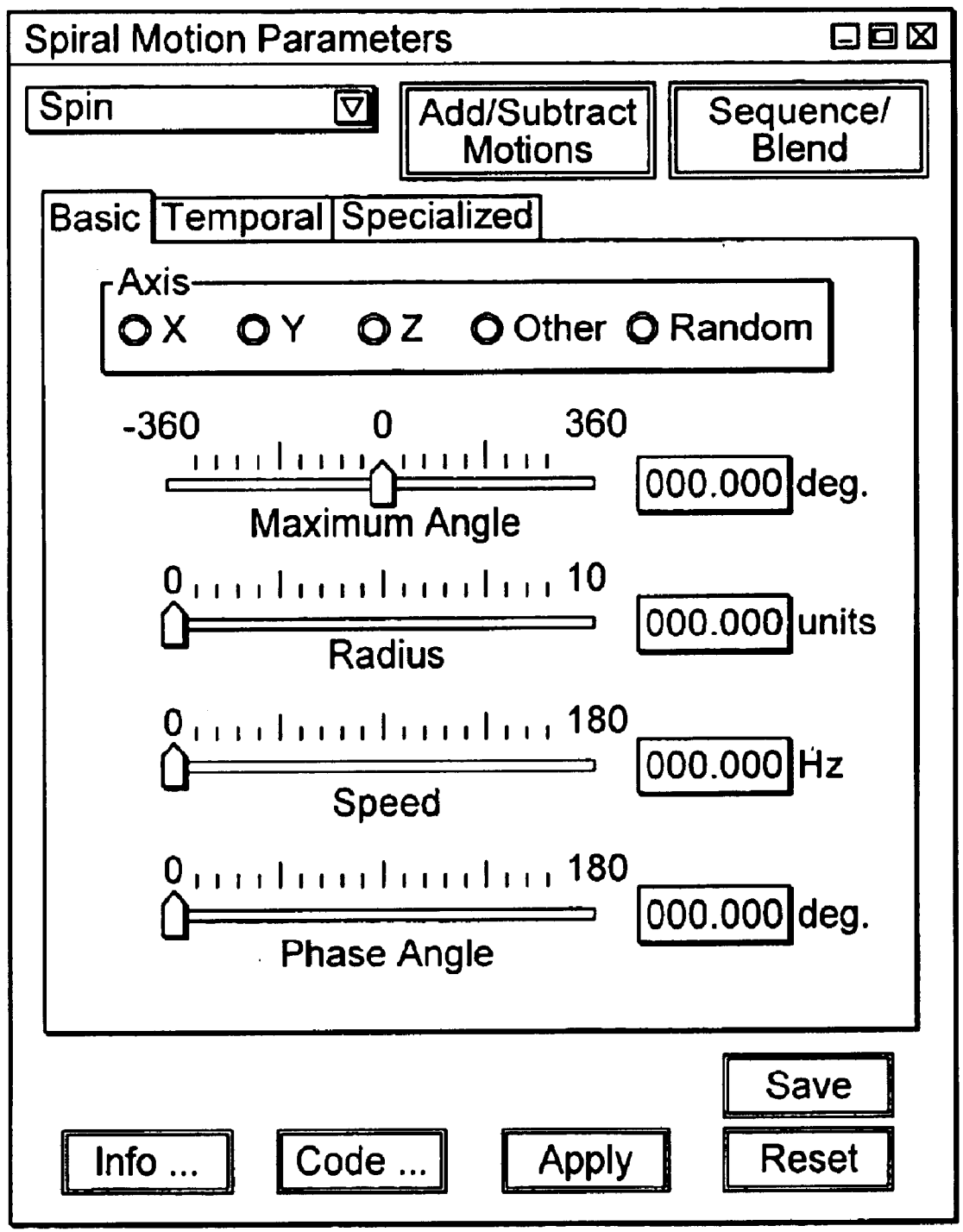
FIGS. 23–24 illustrate the Basic tab of the Composite Motion dialog box provided by the Motion Editor/Viewer, with the drop down list box of the edit box/list box used to list and select component motions closed in FIG. 23 and open in FIG. 24.
Figure 24:
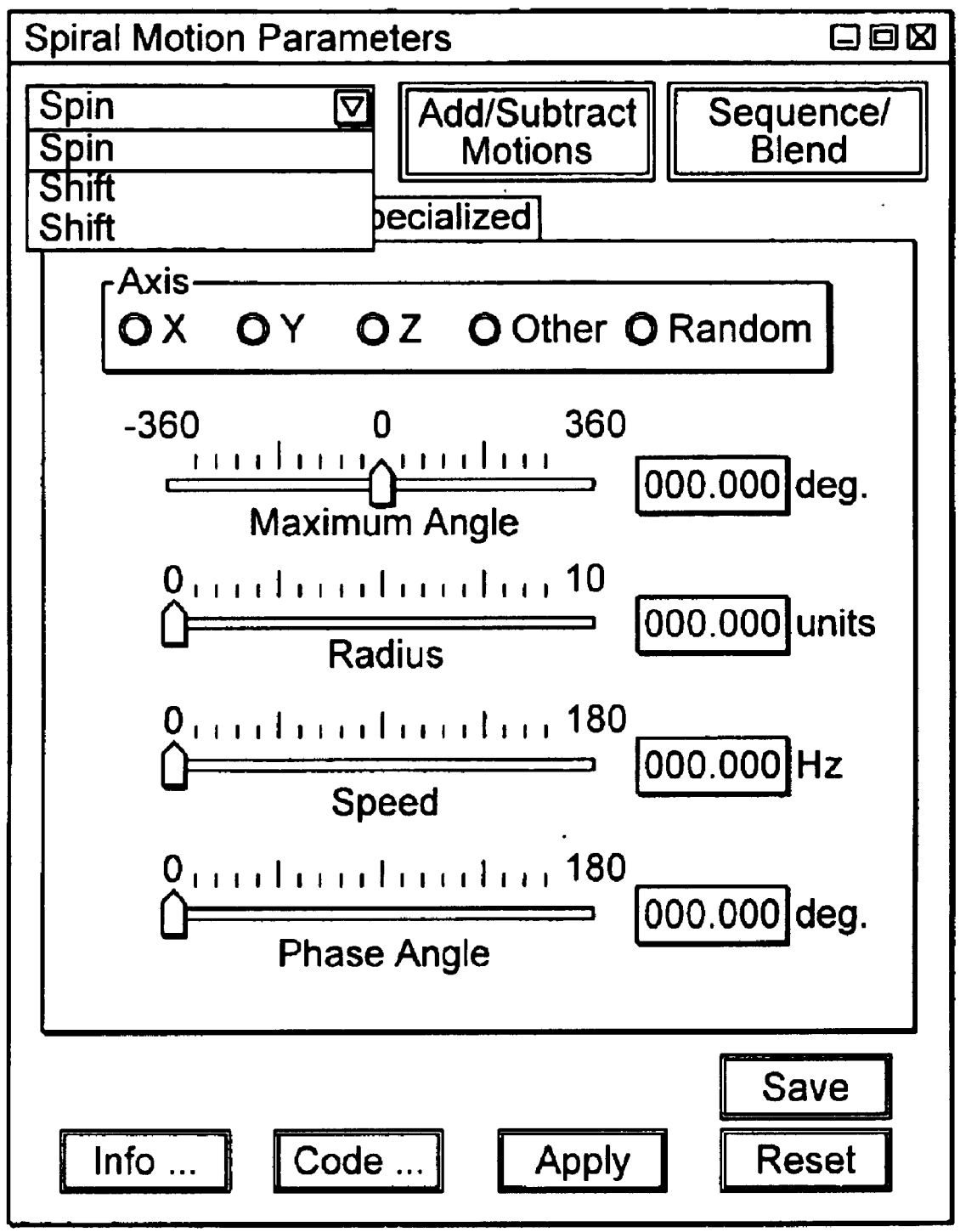

Composite Motions are motions comprised by combining multiple other motion, by sequencing them and/or blending them. FIGS. 23 and 24 show some views of the dialog box used to help a user edit composite motions. If the composite motion was selected from a library or a previously saved motion, the name of the previously defined motion will appear at the top of the dialog box, along with the name of the object it is attached to, if any. Otherwise the name will read "New Composite Motion" if it is a new motion that is being developed. Adding a motion to either a saved or library picked motion will result in the name changing to "New".

All the component motions of the composite motion can be accessed from a pull down list box at the top, shown expanded in FIG. 24. The component or sub-motions are ordered in this list by the chronological order of their start time. As shown in FIG. 23, the composite Motion Dialog Box has Basic, Temporal, and Specialized tabs, similar to those defined above, which provide information for a given composite motions sub-motion selected in the list box. If it is appropriate to the motion shown in the list box, the Advanced tab will appear. If the motions shown in the list box is, itself, a composite motion, a nested composite dialog box corresponding to the listed composite motion will appear.

The Composite Motion Dialog box also has an Add/Subtract Motion button, which if pressed will pop up a dialog box allowing for the addition or subtraction of component motions. A motion is added either by importing it from a library or file, or by making a new motion using the New Motion Dialog Box of FIGS. 25–28. A motion is deleted merely by selecting it and pressing a delete button.

In addition, the Composite Motion dialog box includes a Sequence/Blend button, which if pressed pops up a dialog box which displays a variable-scale time line of the motions. In this time line the start and stop times of a motion can be altered by dragging the start and end of the labeled temporal line representing each motion. A box highlights any two motions which overlap in time, and when that box is selected, a blend dialog box pops up allowing the user to specify the blend to be performed between any motions with overlap in that time frame.

6.4.3.3 New Motions

The New Motion Dialog Box is shown in FIGS. 25–28. It contains four tabs, an Initial Conditions tab, a Translation tab, a Rotation Tab, and a Scaling tab.

The Initial Conditions tab is shown in FIG. 25. This is used to set initial conditions of a new motion in the same manner that the functions shown in Table 11 can be used to set such initial conditions.

Figure 26:
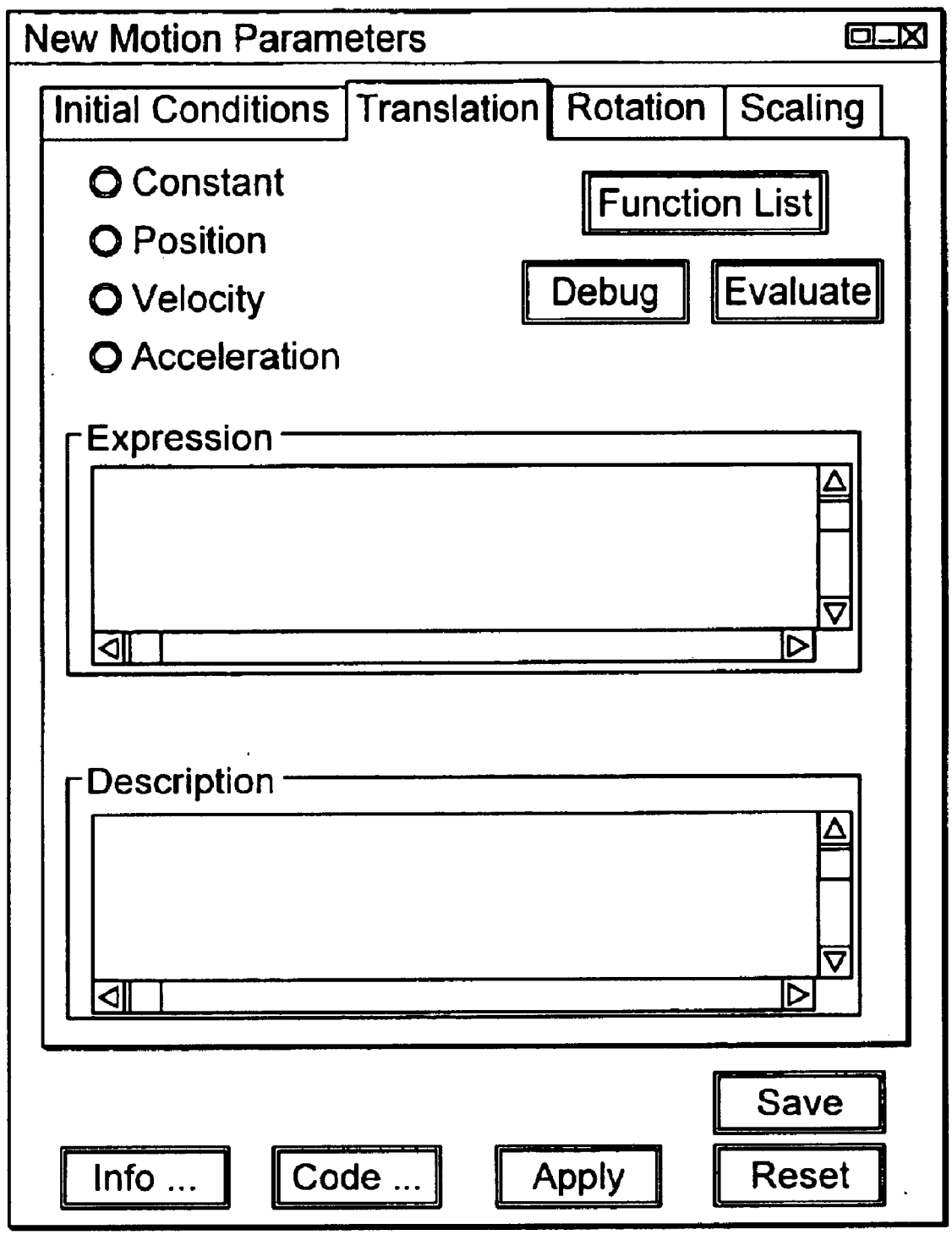
Figure 27:
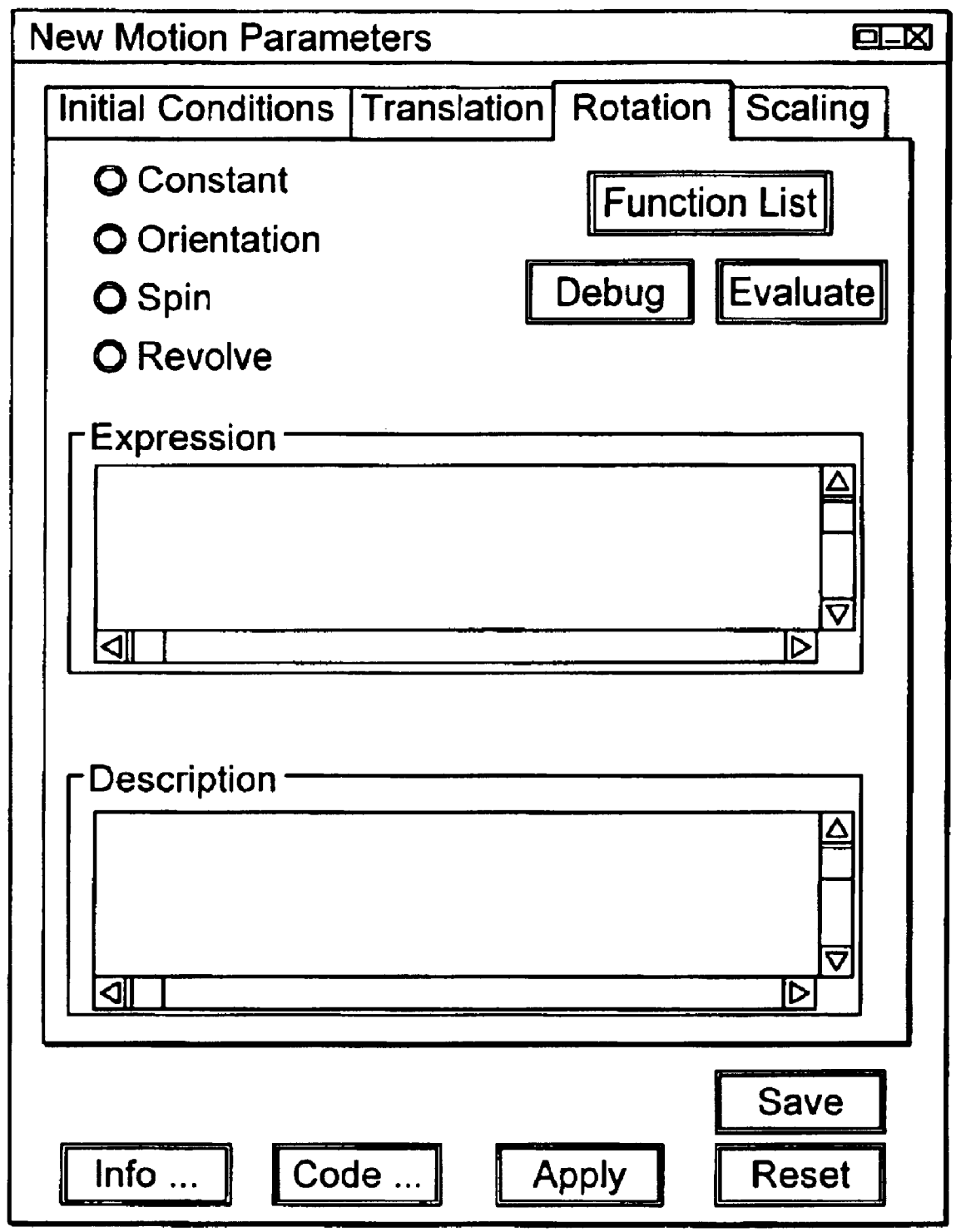
Figure 28:
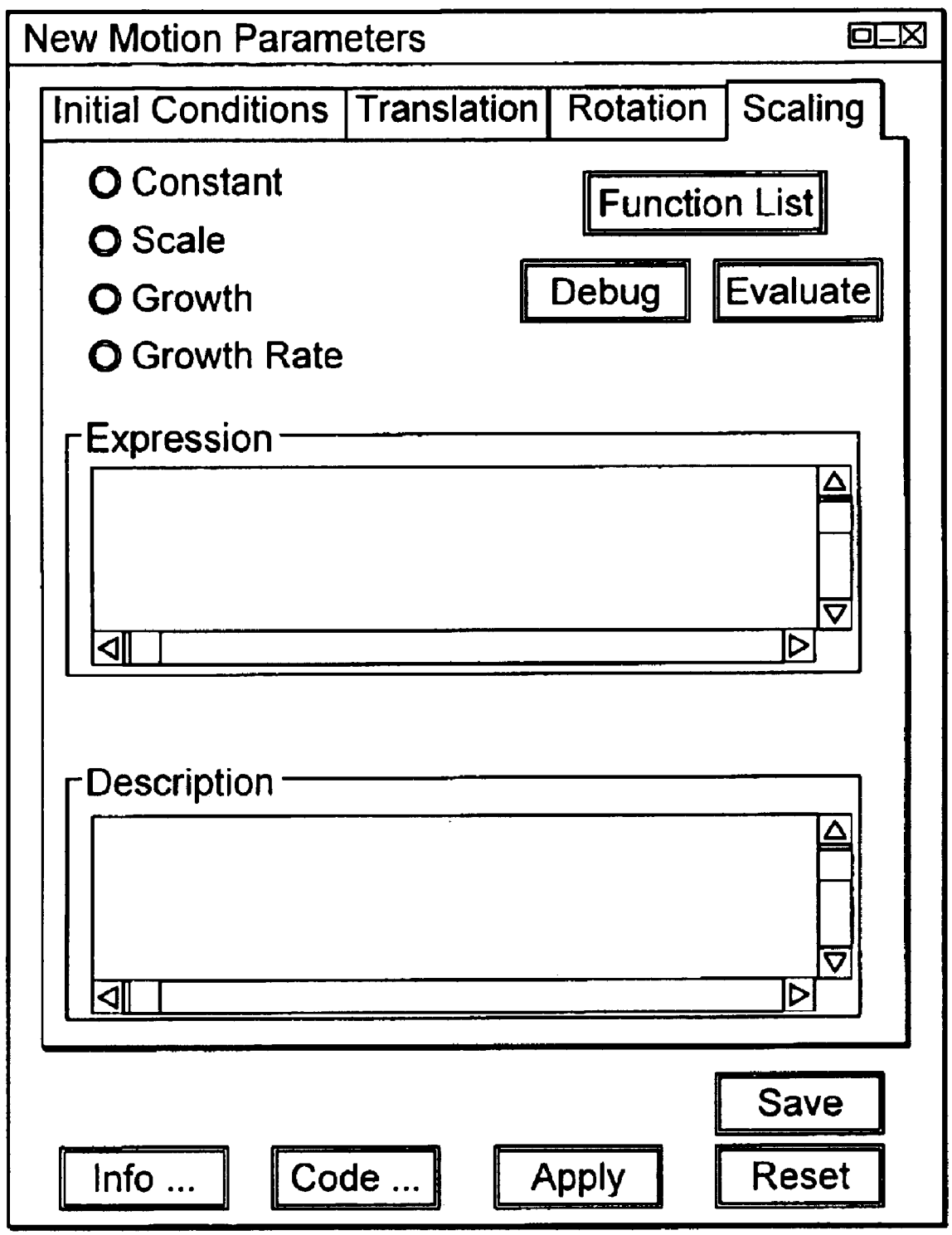

The Transition tab is shown in FIG. 26. It has Four radio buttons in its upper left portion labeled Constant, Position, Velocity, and Acceleration. If Constant is selected the motion looks to the Initial Conditions for values. If not, the user can choose one of the three: Position, Velocity, or Acceleration. A Function List buttons gives the User access to a list of previously defined OpenMotion algebraic expressions for insertion into the Expressions edit box shown in the figure. Evaluate checks to see if the motion will run. Debug finds the scripting error if the motion fails to run. The user can edit an expression entered into the Expression edit box through use of the Function List, or enter his own expression from scratch. The Description edit box enables the user to provide a description to document the statement in the Expression edit box. The motion is not applied until the Apply button is clicked.

The Rotation and Scaling boxes are similar to Transition with the exception of choices with radio buttons.

Once a new motion has been created an saved, it can be edited with a dialog box similar to that shown in FIGS. 9–12, having Basic, Special, Temporal, Specialized, and other tabs, if appropriate to the particular motion.

6.4.3.4 Wind Controller

Figure 31:
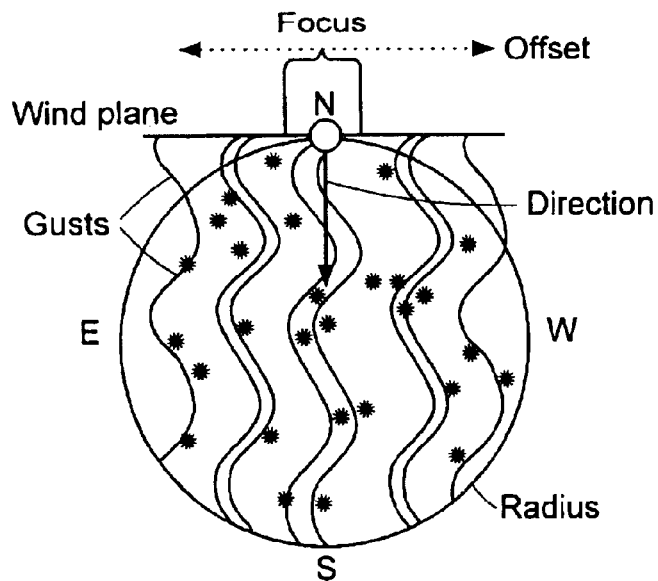
FIG. 31 is a diagram for illustrating several of the parameters of the Wind Controller.
Figure 32:
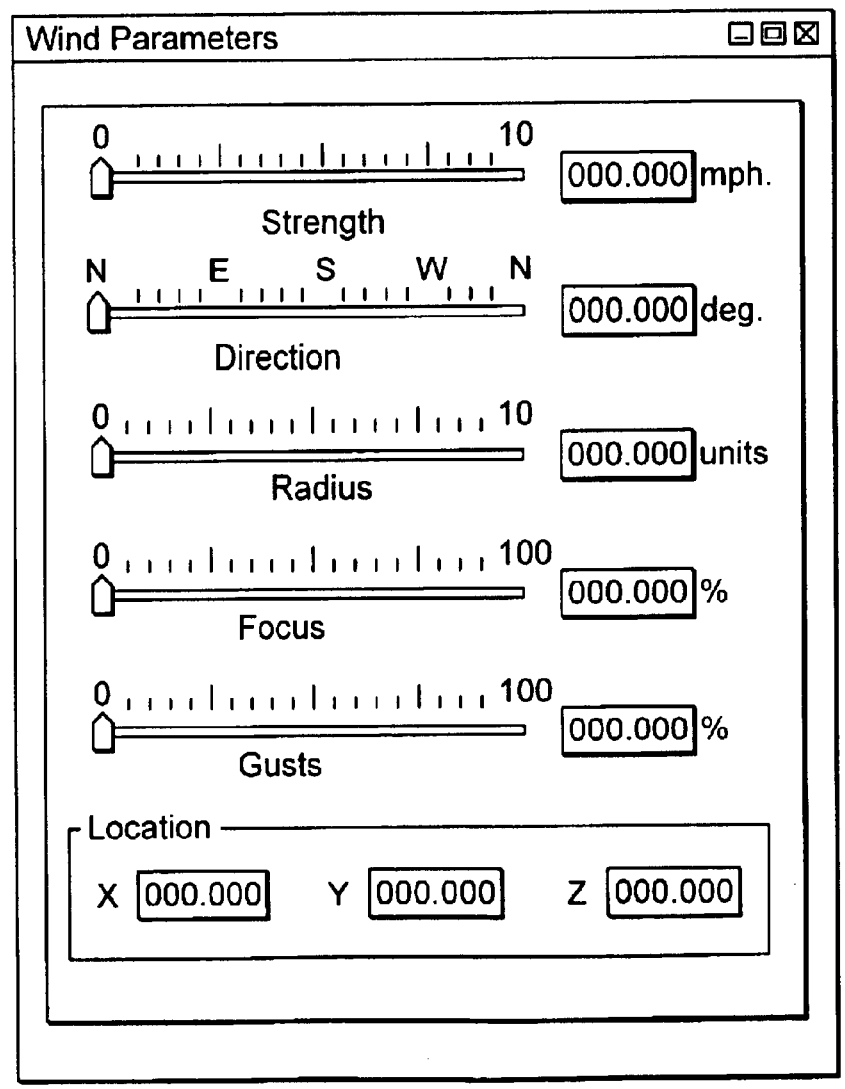
FIG. 32 shows the Motion Editor/Viewer's dialog box for setting the parameters of the Wind Controller.

For each atomic motion (Shake, Shift, Spin, and Swing) there is a complimentary motion that is affected by global controllers. FIG. 32 shows a dialog box for controlling the Wind controller. The Wind controller has four parameters: Strength, Direction, Focus, and Gust. Each parameter affects the Controlled Motions differently. FIG. 31 is a diagram illustrating the meaning of each of these four parameters. The dialog box provides a slider and edit box for setting each of these parameters.

6.4.3.5 Sway Controller.

Figure 29:
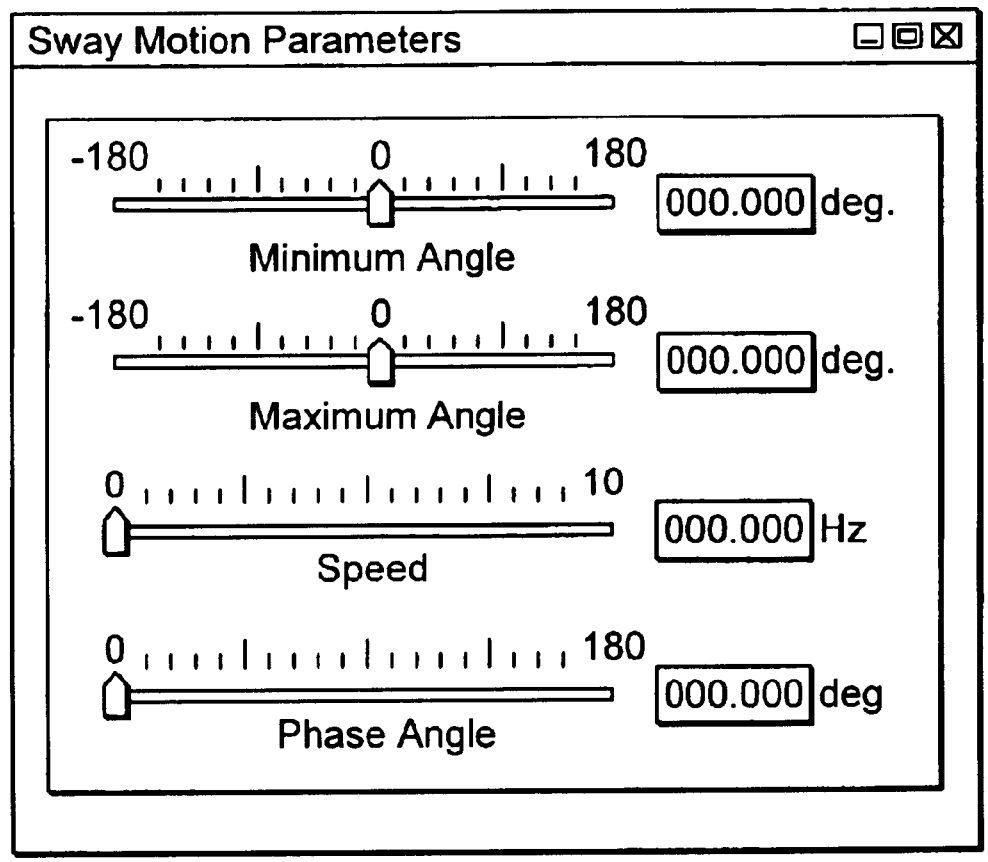
FIG. 29 shows the Motion Editor/Viewer's dialog box for setting the parameters of the Sway Controller.
Figure 30:
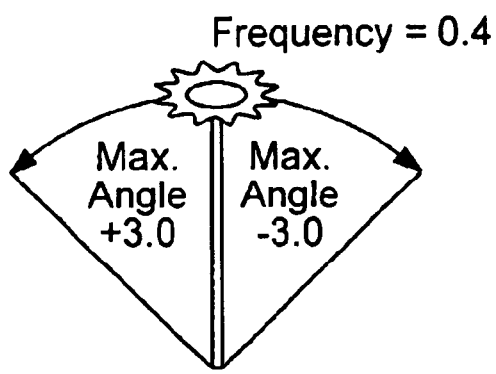
FIG. 30 is a diagram for illustrating several of the parameters of the Sway Controller.

FIG. 29 shows a dialog box for the Sway Controller. The sway controller has four parameters: Minimum Angle, Maximum Angle, Speed, and Phase Angle. FIG. 30 illustrates the significance of some of these parameters.

6.4.3.6 Other Controllers

Although not shown in the figures, it is planned that the Motion Editor/Viewer will have dialog boxes for controlling at least the following additional controllers: a Gravity Controller, a Viscosity Controller, and an Attraction Controller.

The Gravity Controller will have the following as parameters: Strength, Direction, Location, Shape, and Focus. The Viscosity Controller will have parameters: Strength, Location, Shape, and Focus. Finally, the Attraction ° Controller will have parameters: Strength, Direction, Location, Shape, and Focus.

7. MOJO EDITOR

FIGS. 33 through 63 represent one possible embodiment of a motion editor/viewer, such as the motion editor/viewer 182 shown in FIG. 1, which can be used with many aspects of the present invention.

FIG. 33 represents a screen of a graphical user interface of this motion editor, which is called Mojo. In the example of FIG. 33 the Mojo screen's scene view window 503 is shown displaying a scene that has in it only a 3D hierarchical graphic model 502 of a running man. Since Mojo is a real-time motion editor, the model of the running man is shown moving according to a set of motions that have been applied to the individual nodes of its hierarchical model.

The Mojo graphical user interface window 500 includes a toolbar having buttons 504 through 529.

The button 504 creates a new scene.

The button 505 opens a previously saved scene, model, motion, or package of motions.

The button 506 saves the current scene, or the currently selected model, motion, or motion package.

The button 507 cuts the current selection, which can be a model, such as the running man 502, a node of that model, a motion, a motion package, or other element attached to a model.

The button 508 copies the current selection to a clipboard, for temporary storage.

The button 509 pastes a selection that has been previously copied to the clipboard to a currently selected location in this. scene or in a model located in the scene.

The button 510 prints the view shown in the scene view window 503 or the contents of any window within it, such as the tree view window.

The button 511 provides help on how to use the Mojo editor.

The button 512 allows a user to select a sound file so that sounds can be attached to elements of the scene by operation of the button 524 described below.

The group of buttons 513 through 517 allows the user to select one of five different types of predefined motions that can be added to a node of a hierarchical 3D graphical model. These include the shift, shake, spin, and swing motions described above under heading 6.4.2.1, which are associated with buttons 513 through 516, respectively, as well as a turn motion associated with the button 517.

If the user selects the shift button 513, an instance of a predefined translation motion class can be created. This motion will define a translation in position a given distance in a given direction. Alternatively, the motion can be defined by specifying a given continuous speed of translation in a given direction.

If the user selects the shake button 514, an instance of an oscillating translation motion class can be created. This motion is a composite motion that repeatedly performs a succession of two motions: first a translation motion for a given distance in a first direction; and then a second translation motion for a given distance in a second direction; with a default being that the first and second motions are of equal length, but opposite direction.

If the user selects the spin button 515 an instance of a rotation motion class can be created, which defines a motion that rotates an orientation and direction about a given axis continuously at a given angular velocity. Alternatively, the motion can be defined to specify such rotation for a given angular distance at a given angular speed.

If the user selects the swing button 516, an instance of an oscillating rotation motion class can be created, which defines a composite motion that repeatedly performs a succession of two motions: a first rotation motion in a first direction about a first axis over a first angular distance, and then a second rotation motion in a second direction about a second axis over a second angular distance. The default values for such an oscillating rotation motion will cause the first and second rotation motions to be of equal angular distance about the same axis in opposite directions.

If the user selects the turn button 517 an instance of a turn motion class can be created, which is a composite motion consisting of repeatedly performing a succession of two motions: a first motion that is similar to the first motion of the oscillating rotation motion class, described in previous paragraph, and a second motion that merely resets the angular position associated with the motion to the position it had before the turn's first motion took place.

The toolbar shown in FIG. 33 includes four additional buttons 518 through 521 related to motions.

The add-motion button 518, if clicked, will display a dialog box allowing a user to select a named, previously saved motion or motion package, and add it, respectively, to a selected node of a hierarchical model or to select a hierarchical model or sub-portion thereof.

The button 519 is a delete-motion button that allows a user to delete a currently selected motion or motion package, respectively, from a node of a model, or from entire model or a sub-portion of such a model.

The button 520 is a parameters-window button that will display a window showing some of the editable parameters of a currently selected motion.

The button 521 hides the bounding box which indicates the currently selected portion, if any, of a graphic model in the scene view window 503.

The buttons 522 and 523 of the toolbar are related to model hierarchies.

The select-parent-node button 522 causes the parent node of the currently selected node in a hierarchical model to be selected.

The tree-view button 523 causes a tree view window 530 of the type shown in FIGS. 34 and 37 through 45 to be displayed.

The add-sound button 524 enables a user to place a selected sound file, such as a wav file 592 shown in FIG. 45, to be associated with a currently selected node of a model.

The buttons 525 and 526 are the eye-view-control and object-view-controlled buttons, respectively. They allow, respectively, a user to select between having the arrow keys of his or her computer keyboard either control the position of the viewpoint used to generate the view in the scene window 503, or to control the position of an object within that scene view relative to a fixed viewpoint.

Figure 43:
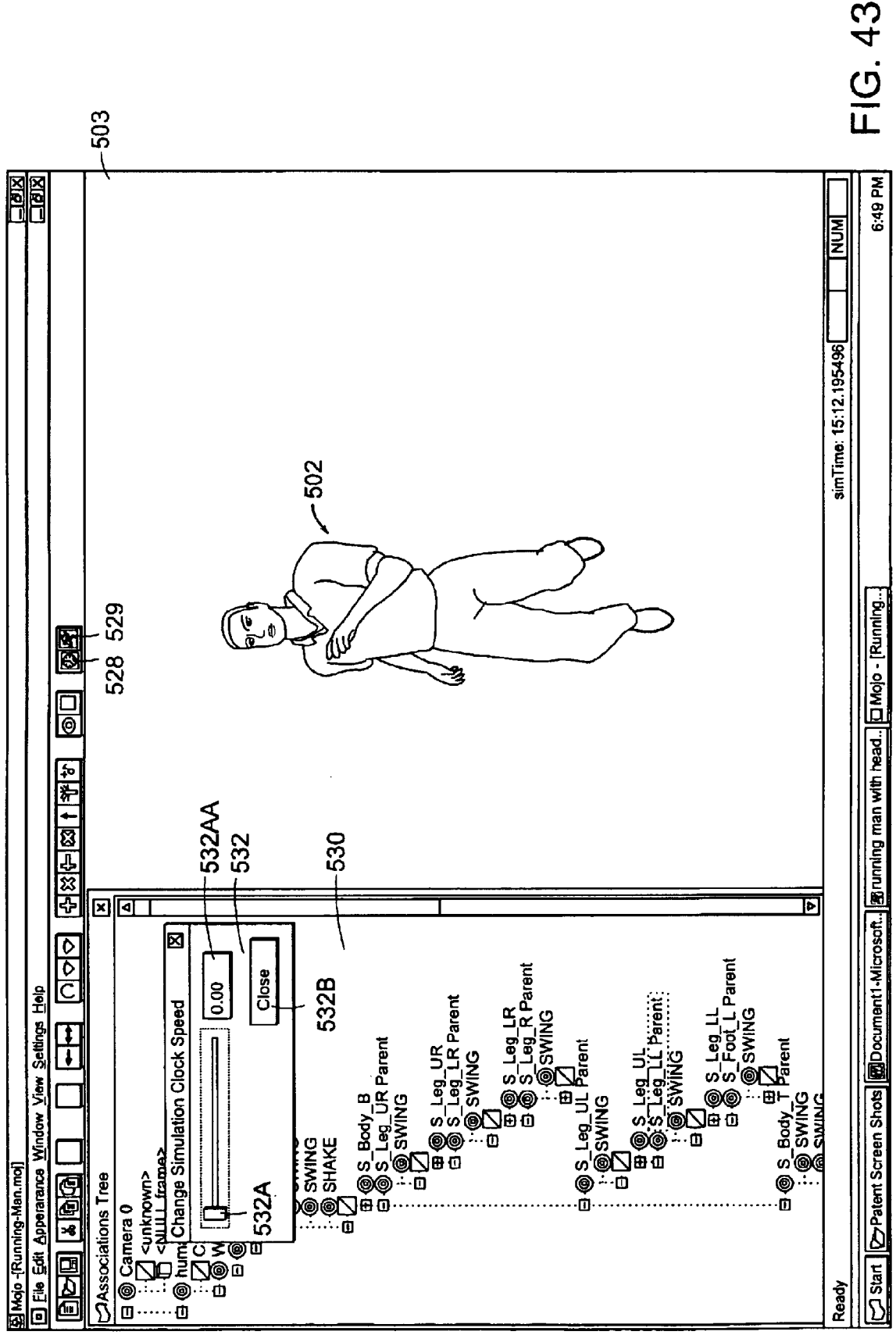
Figure 44:
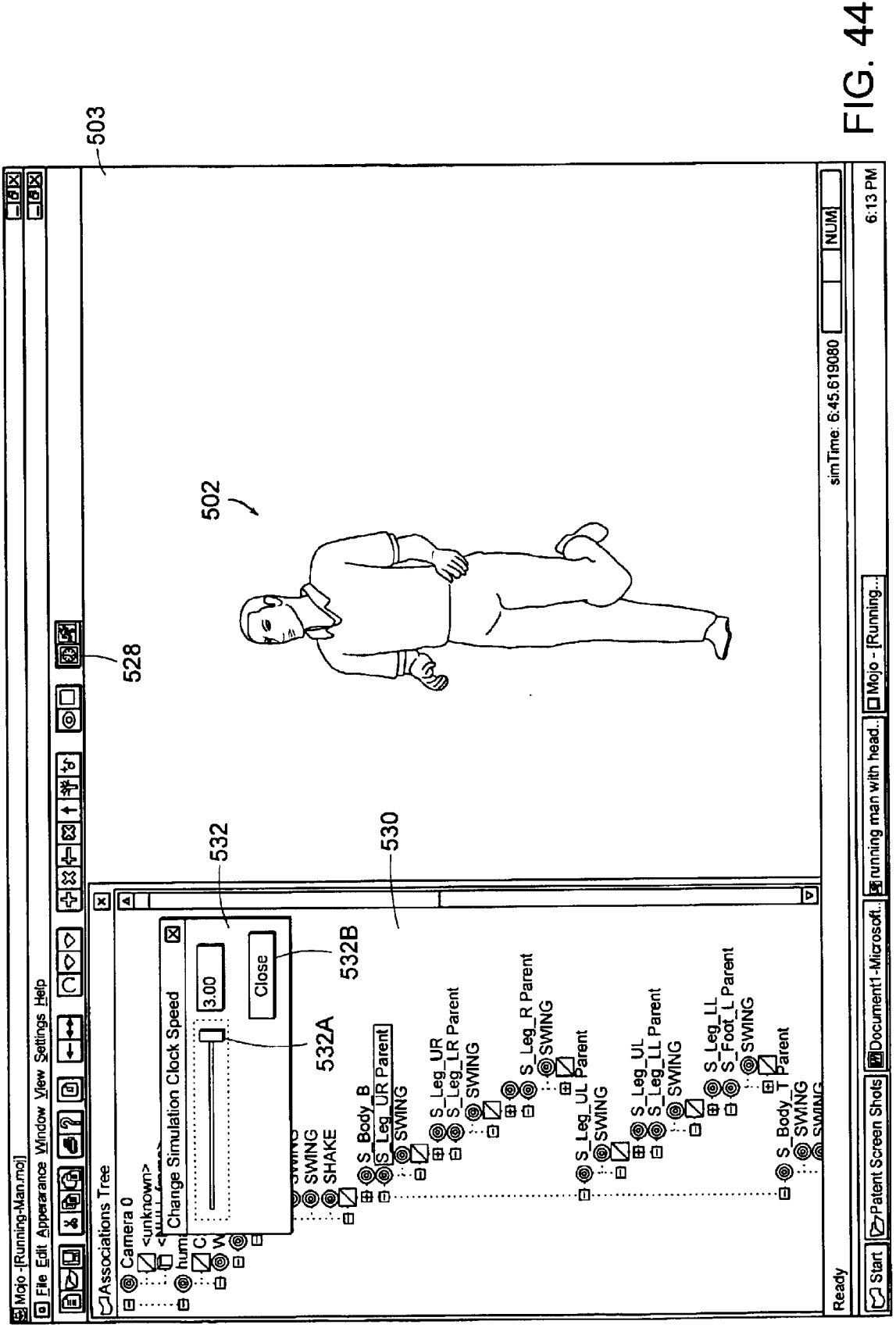

The buttons 528 causes the change simulation clock speed control 532 shown in FIGS. 43 and 44 to be shown, which allows the user to stop or change the speed of the animation shown in the scene view window 503. The buttons 529 enables a user to turn on and off the animation shown in the scene view window 503.

FIG. 34 is similar to FIG. 33 except that in it the tree view window 530 is shown. This window is a scrollable window, as indicated by the scrollbar 534 shown in FIG. 34. As can be seen by observing the various portions of the tree view shown in FIGS. 34, 37, 38, and 39, the model 502 of the running man is comprised of a hierarchy of graphic model nodes 536 and 536A each of which is preceded by a graphic symbol 537 to make it readily apparent to users which nodes in a hierarchy of the tree view are model nodes and which are other types of nodes.

FIG. 35 illustrates the complete hierarchy of model nodes 536 and 536A associated with the man4 model 502 shown in FIG. 34. It also includes for each of the nodes 536 and 536A a more intuitive name 539 that identifies its corresponding body part in the model.

Certain of the model nodes 536 are parent nodes, indicated by the numeral 536A. In the particular form of model hierarchy used with Mojo any set of model components which do not move together rigidly as one unit, but which do all have their motion defined relative to the motion of a given parent node, should depend from a model node 536A designated as a parent node. Each such parent node has associated with it a parent location node 538 indicated by a box with a diagonal line through its in FIGS. 34, 367, 38 and 39, from which child nodes that are to have their position defined relative to such a parent node are depended. Any motion 540 place between a parent node and such a parent location node in the tree-view graph will cause all of the child nodes whose positions are defined relative to the parent location node to move as a function of such motions. As described below in more detail with regard to FIGS. 46 through 49, in a hierarchical, linked 3D model, a parent node 536A is often associated with either a point or shape (such as one representing a shoulder or knee joint) about which child nodes swing or rotate.

FIGS. 36A. and 36B illustrate the complete hierarchy of model nodes 536, including parent model nodes 536A and their associated a parent location nodes 538 in the hierarchical model of the running man 502 shown in FIG. 34 with each node being labeled with the more intuitive name 539 shown in FIG. 35.

In the scene-view window 503 a user can click on a portion of the model 502 to be selected (a double-click on a part selects the parent of that part). In FIG. 34 the cursor 542 has clicked on the node S_Leg_UR Parent 536AA shown in the tree view of FIG. 34, which corresponds to the running man's upper right leg parent node. As a result, the bounding box 544 is drawn around that node and, since it is a parent node, everything that depends from it in its model. Also the selected node 536AA is highlighted in the tree-view window 530 to indicate its selection.

Figure 37:
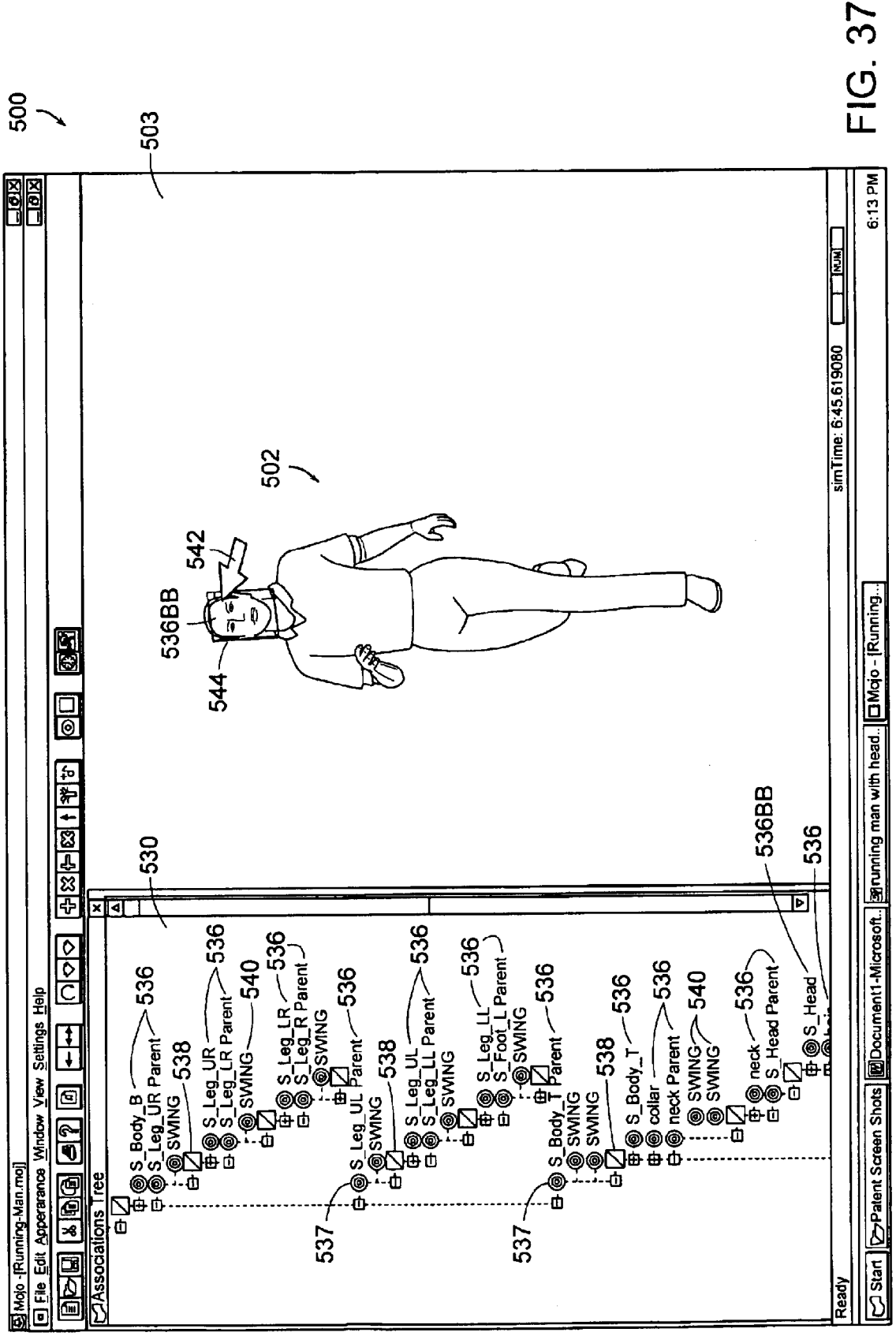

FIG. 37 is similar to FIG. 34 except that it illustrates a view of the Mojo user interface after the user has clicked on the node 536BB of the running and model, which corresponds to his head. This causes the bounding box 544 to be displayed around the selected head node 536BB; if necessary, automatically scrolls the tree-view window so the head node will be shown in that window; and highlights the representation of that node in the tree-view window.

Figure 38:
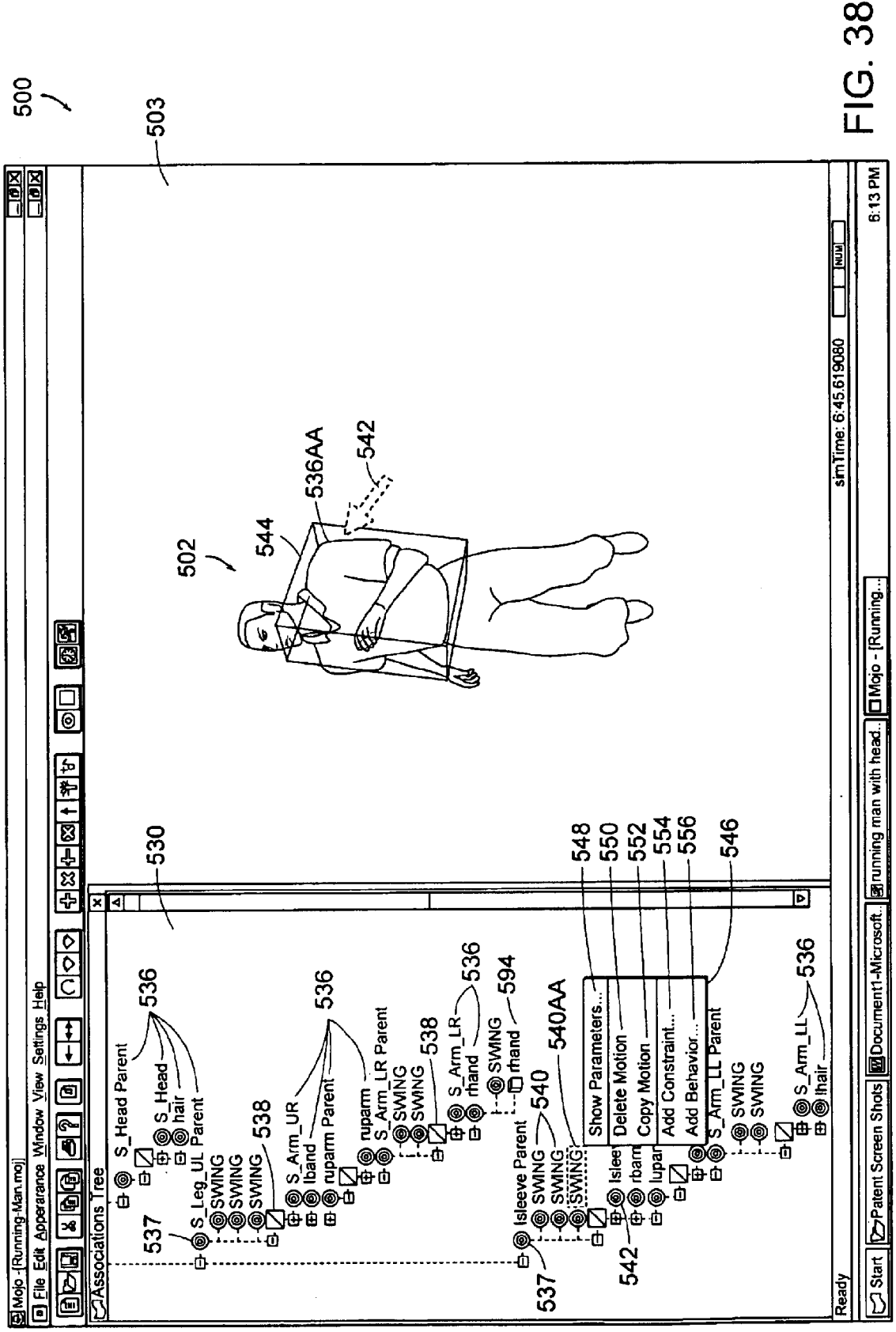

FIG. 38 illustrates the appearance of the Mojo interface 500 after a user has clicked the mouse cursor 542 on the left sleeve parent node 536AC causing it to be selected and causing a bounding box 544 to be displayed around it, and all model nodes which depends from it. In FIG. 38 the left sleeve parent node 536AC is not highlighted, because the user has right-clicked on the swing motion node 540AA shown in the tree view 530 of that figure, causing a motion-options menu 546 to be displayed. As can be seen, this option menu provides a user with a plurality of options 548 through 556.

Figure 42:
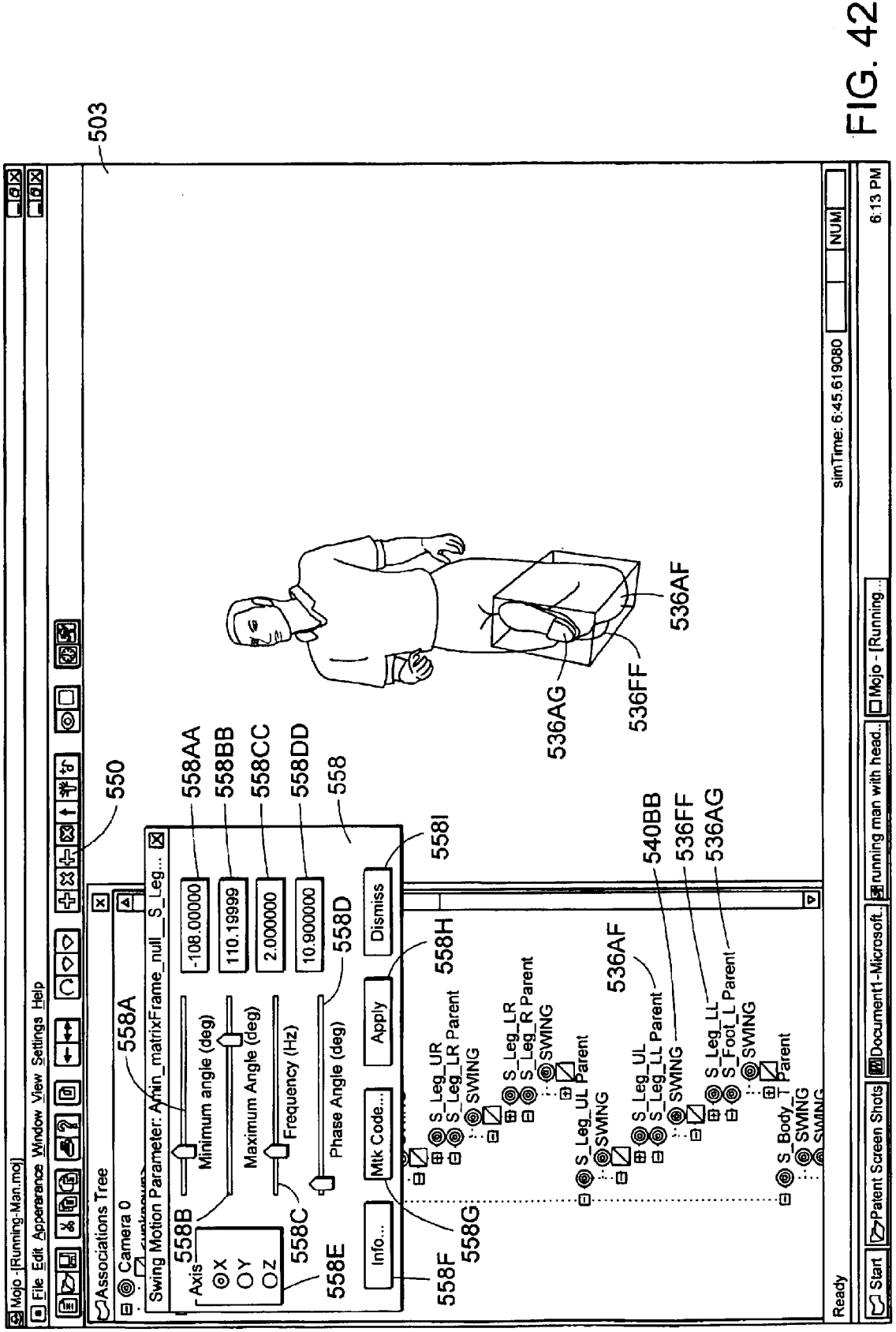

The show-parameters option 548, if clicked, will display a parameters dialog box 558 like that shown in FIG. 42. This will enable a user to vary the parameters defining the selected motion and to interactively see their effects upon the selected motion, as such changes are made, in the scene window 503.

The delete-motion option 550 will remove the selected motion, such as the currently selected motion 540AA, from its associated node in its current model.

The copy-motion option 552 will copy the currently selected motion to a clipboard from which it can be pasted to another node in the same model or even another node in a different model.

The add-constraints option 554 allows a user defined or select and then add a given constraint or boundary, of the type described above in section 6.2.7, to the selected motion.

The add-behavior option 556 allows a user to define or select and then add a given behavior, of the type described above in section 6.2.6, to the currently selected motion.

Figure 39:
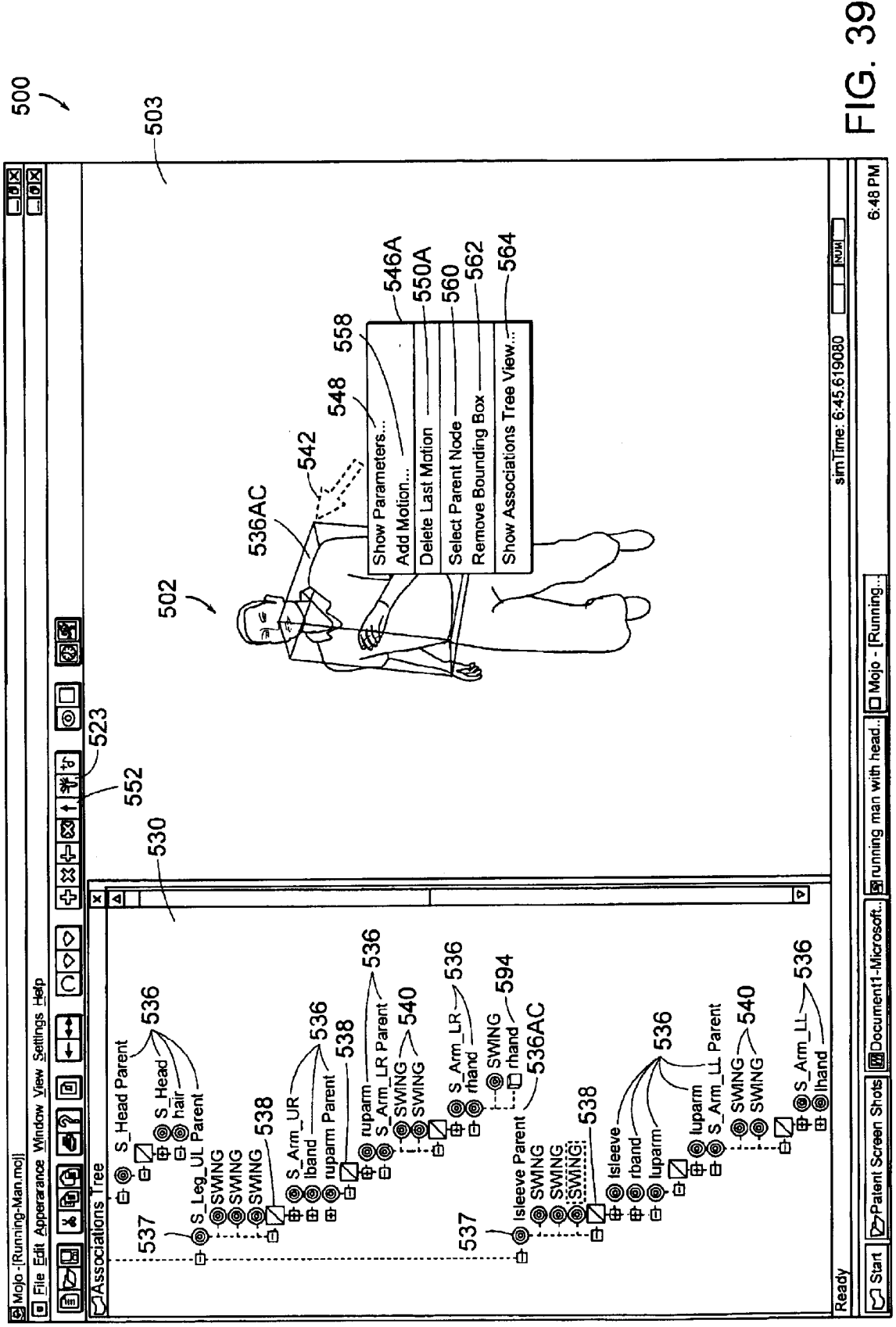

FIG. 39 is similar to FIG. 38, except that it assumes that the user after having selected the left sleeve parent node 536AC has right-clicked on the mouse cursor 542, rather than making selections in the tree view 530. In this case a node-option menu 546A is displayed. This option menu is somewhat similar to the motion option menu 546 shown in FIG. 38, except that it is designed to provide options available for a model node rather than ones available for a motion.

The show-parameters option 548 of the menu 546A is identical to the show-parameters option described above with regard to FIG. 38.

The add-motion option 558 allows a user to add a motion to the currently selected node, which will motivate the entire part of the model shown in the bounding box 544.

The delete-last-motion option 550A is similar to the delete-motion option 550 described above with regard FIG. 38, except that at the time the node-option menu 546A is shown, there is no currently selected motion, and thus the deletion takes place on the last motion to have been added to the currently selected model node.

The select-parent-node option 560 has the same effect as pressing the select-parent-node button 552 described above with regard to FIG. 33; that is, it selects the parent node of the currently selected node. As can be seen from FIG. 35 if the currently selected. node is the left sleeve parent node 536AC, then the parent node of that node will be the torso parent node 536AD shown in FIG. 35. If the torso parent node were selected, the resulting bounding box would cover everything in the running man model 502 above his pelvis.

The remove-bounding-box option 562 would-remove the display of the bounding box 554 from the currently selected node.

The show-associations-tree-view option 564 shown in FIG. 39 would have the same effect as pressing the button 523 described above with regard FIG. 33, which is to cause the tree-view window 530 shown in FIG. 39 to be displayed, if it is not already shown.

Figure 40:
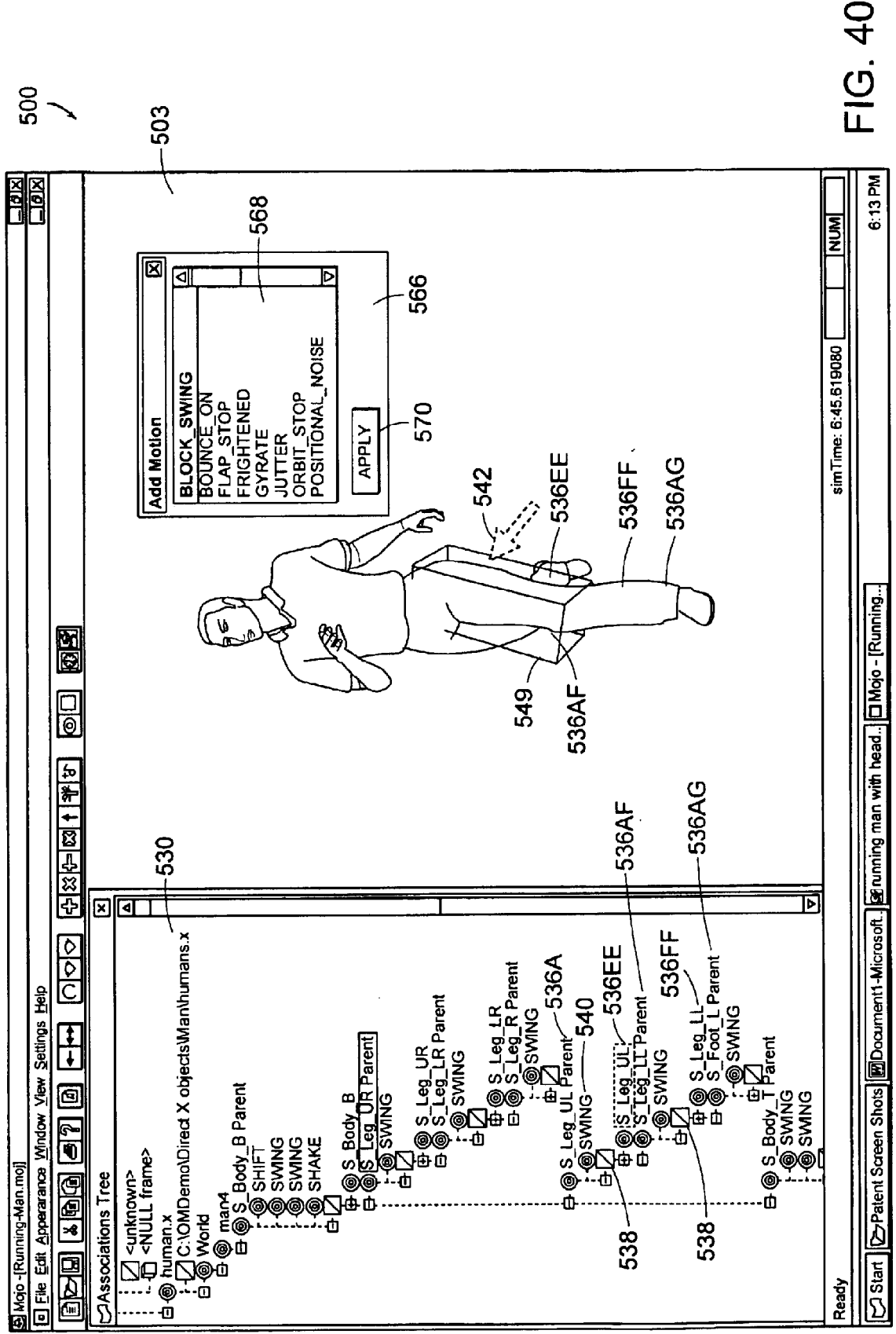

FIG. 40 is similar to FIG. 39 in that it shows the scene view 503 after the user has used the cursor 542 to select a model node, in this case the node 536EE, which represents the running man's upper leg, or thigh, by right clicking on it with the cursor 542 and then selecting the add motion option 558 shown in FIG. 39. In this case an add motion dialog box 566 will be displayed which contains a scrollable list 568 of previously defined motions. The user can select one of these motions and then click the apply button 570 which will then add the selected motion to the currently selected node.

In the embodiment of the invention shown, desired results are normally obtained by attaching motions only to parent nodes 536A or to non-parent model nodes 536 which have no children nodes, which are intended to move with the them. That is because if a motion is applied to a first child node that has other sibling nodes depended from the same parent node, the motion will only move the first child node, and not the other sibling nodes or any node that depends from them. This is because in the particular tree graph used with Mojo, a given child node's position is defined relative to its parent location node 538, and, thus, motion of any node other than its parent location node will not affect its siblings. Thus, in the example of FIG. 40, if a swing motion was applied to the selected thigh model node 536EE, the thigh model would become disconnected from the lower leg parent node 536AF, the lower leg model 536FF, the foot parent node 536AG, and any nodes which depend from the foot parent node, because they would not be linked to its motion.

It should be appreciated that in other embodiments of the invention the add motion option could use other methods of selecting motions, including pop-up menus allowing a user to select a. motion from a previously defined hierarchy of motion classes, such as those shown in FIGS. 5 through 8.

Figure 41:
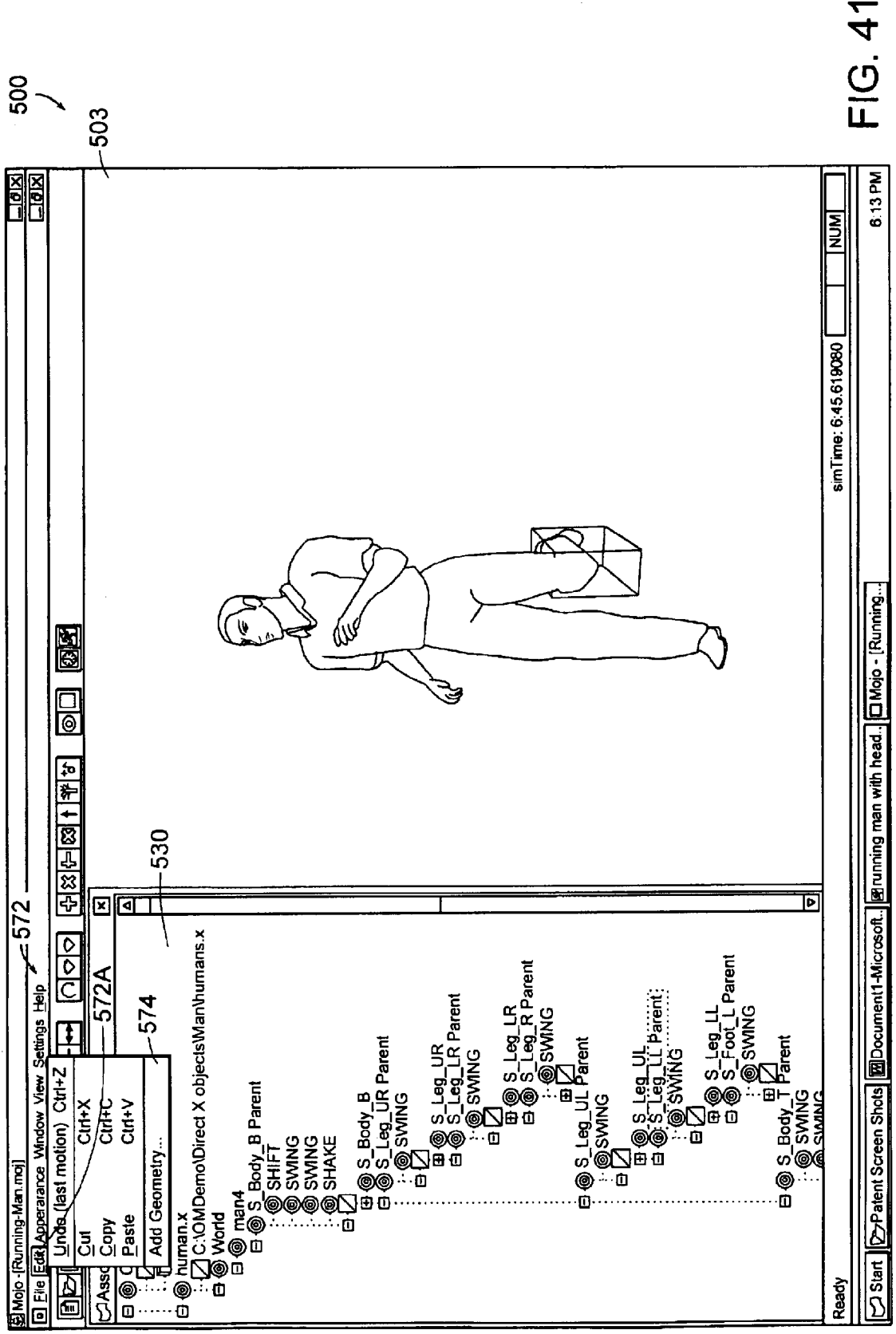

FIG. 41 illustrates that the Mojo interface 500 includes a top-level menu 572 which provides additional user interface capability, including an edit menu 572A, which if clicked allows a user to cut, copy, or paste a selection, which can be one or more nodes, models, motions, or motion packages in the scene window 503 or the tree view window 530, as well as text in some of the text related windows of the Mojo interface, such as those which allow one to edit the code or comments associated with a motion. Although not shown, the File menu allows users to open and save scenes, motions, motion packages, and .wav files. Since Mojo is a motion editor it assumes that a user creates and edits models and their graphic nodes including image files and texture maps in a separate model editing and creating program.

FIG. 42 illustrates the motion parameter window 558 which will be displayed for a selected node if the user clicks on the show-parameters button 550 shown in FIGS. 33 and 42 or if the user selects the show-parameters option 548 shown in FIGS. 38 and 39.

In the example of FIG. 42, the user has selected as the currently selected node the left lower leg parent node 536AF and then has selected the show-parameters option for that node. When the show-parameters option is selected for a model node that has had a plurality of motions associated with it, the window will be shown for the, top-most motion node under that model node, which will be the most recently added motion. As can be seen from many of the figures illustrating Mojo's tree view, it is common to associate multiple motions with a model node 536 or 536A. When this is done, the respective positions, orientations, and scaling attribute values of all the models associated with a given node are summed to form, in effect, one composite motion which is applied to the given model node.

The show-parameters dialog box 558 shown in FIG. 42 includes maximum and minimum angle sliders 558A and 558B, respectively, which define how far the lower leg parent node can swing back at the knee and how far forward it can swing at the knee. In FIG. 42 the maximum angle slider 558B has been set to a much higher value than is appropriate for the motion of a human runner, as indicated by the fact that in that figure the runner's left leg is shown bent forward by more than 90 degrees from the thigh. As the user changes any of the controls shown in the show-parameters window 558, a corresponding interactive change is made to the animation of its associated motion in the scene-view window 503.

The show parameter window also includes a frequency slider 558C, which defines the speed at which the swing motion being edited will be performed, a phase angle slider 558D that shifts the phase of the swing motion. Each of the sliders 558A through 558D includes a corresponding edit box 558AA through 558DD, which enables a user to see a numerical representation of the current value entered by a slider, or which enables the user to enter an exact desired numerical value.

The show parameters window 558 also includes a set of radio buttons 558E that enable the user to select the axis of the selected swing motion defined relative to the orientation of the motion's associated model node. The show parameters window also includes an info button 558F that enables a user to enter, edit, or see comments about the purpose or function of the current motion. A code button 558G enables a user to see or edit the actual code that defines the motion. The apply button 558H causes the show-parameter window to be exited with any changes which have been made within it to the selected motion remaining in effect. The dismiss button 558I allows the user to exit the show-parameters window with the selected motion being reset to the state it had before that window was last evoked.

It should be appreciated that in other embodiments of the invention other types of parameter windows could be associated with motions. For example parameter windows such as those described above with regard to FIGS. 9 through 24 could be used for this purpose.

FIGS. 43 and 44 illustrates the change-simulation-clock-speed window 532 that will be displayed if the user clicks the clock button 528. The window 532 includes a slider control 532A which enables a user to very the speed of the simulation clock for the entire animation shown in the scene view window 503. It also includes an numerical display box 532AA which shows the current speed of the clock in numerical form, and a close button 532B which will close the window 532 with the animation continuing to proceed at the clock speed which has been set in that window.

In FIG. 43 the simulation clock has been set to a speed of zero, which has the effect of stopping all motion in the scene view window 503. This can be very helpful when one is trying to select a particular node on a hierarchical model which might otherwise be moving so fast that would be difficult to accurately click on. This effect is similar to that which can be achieved by clicking on the run/stop toggle button 529.

FIG. 44 is similar to FIG. 43, except that in it the speed slider control 532A has been set to its maximum value, which in the current embodiment is a speed of three times normal speed. In other embodiments of the invention different ranges of simulated clock speed change could be allowed, including negative speeds, which would make motions run backwards.

FIG. 45 illustrates that the Mojo editor can be used to see and edit the motions of other hierarchical models besides the running man 502 described above. In this figure a model 580 of a bee is displayed with its hierarchical tree shown only partially expanded in the tree view 530. In this figure the bee model 580 is shown as a child node of a world node 582, which represents the parent node in the bee.x scene file. The path of other scene file is displayed at node 584 of the tree-view graph. Although not shown in any of these figures multiple models can be shown in the same scene, depending as sibling child node from the world node 582 or having motions defined relative to each other. For example, the running man model 502 and the bee model 580 could be placed in one scene, moving relative to each other and to their common scene by motions placed between their root nodes 502 and 580, respectively, and their associated top level parent.

In FIG. 45 the tree view 530 also shows a camera node 588. The camera node 588 in this figure is shown as fixed. In other embodiments of the invention motions could be applied to cameras, as well as model objects, so as to provide arbitrarily complex viewpoint motions in a 3D modeling application.

In FIG. 45 the thorax node 536HH has been expanded to show that it has associated with it a .wav file sub-node 592, which has been added by operation of the select-wave-file button 512 and the add-wave-file button 522. In the example shown in FIG. 45, the wave file 592 is one of the sound of a bee buzzing and the sound has been associated with the thorax of the bee which is located near its center.

The thorax node 536HH also has associated with it a 3D model node 594 that defines the three-dimensional shape associated with that node in the bee model. As can be imagined, most model nodes in a 3D hierarchical graphic model have 3D model nodes 594 associated with them. In some models, however, such as the one shown in FIGS. 48 and 49, all, or some, parent nodes 536A do not have 3D models associated with them. This is often the case when the graphic model for one of the child nodes of the parent node is defined to have a size that causes it to overlap, and, thus, fill the space that might otherwise have been occupied by a parent node.

FIGS. 46 through 55 are used to described how packages of parallel motions can be attached to 3D hierarchical models.

FIGS. 46 and 47 described a first model 600 that belongs to a given class 602 of 3D hierarchical models, and FIGS. 48 and 49 described a second model 600A which belongs to the same model class. In FIGS. 46 and 48 a tree graph view of the model nodes of the models 600 and 600A, respectively, are shown in a format corresponding to that in which the running man model 502 was shown in FIGS. 36A and 36B. As can be seen from FIGS. 46 and 48, the model nodes 536 and 536A of the models 600 and 600A are virtually identical to each other, both in the topology of the tree graph and in the naming that they use for corresponding model nodes. The only difference is that instead of the single head node 536II which occurs in the model 600, the model 600A includes a head parent node 536AK which has depending from it a parent location node 538 and two child nodes, i.e., a head node 536II and a hair node 536JJ.

The major difference between the model 600 of FIG. 46 and model 600A of FIG. 48 is the difference between their respective graphic model nodes 594. As can be seen in FIG. 46 the model 600 includes graphic model nodes 594A through 594M, whereas the model 600A includes graphic model nodes 594AA, 594CC, 594EE, 594GG, 594II, 594KK, 594MM, AND 594NN. As can be seen by comparing FIGS. 47 and 49, which display images of the model 600 and 600A, respectively, the graphic nodes of these two models are quite different in appearance.

Another distinction between the model 600 and model 600A is the fact that in the model 600 most of the parent model nodes 536A have corresponding graphic models, with the exception of the body parent node 536AI and the neck parent node 536AJ which are represented as dots in FIG. 47. Such parent model node graphic models are indicated by the numerals 594B, 594D, 594F, 594J, and 594L in FIGS. 46 and 47. In the model 600A, on the other hand, none of the parent nodes 536A have graphic models associated with them. In FIG. 49 all these parent nodes are represented by dots labeled 536A, or 536AI, or 536AK. In the model 600A graphic models are not use for parent model nodes because the child nodes of such parent nodes overlap with a sibling node of the parent node, so as to make the model appear fully connected. It should be understood, however, that models could be made in which the graphic models of some or all of its child nodes are neither connected to, nor overlapping with, their parent nodes.

As shown in the tree view of FIG. 48, the head node 536II includes not only a graphic model 594II, but also an image model 608, which represents a graphic image which is wrapped across the surface of the shape of the head node's graphic model 594II. In FIG. 48 the hair node 536II includes, in addition to its graphic model 594NN, a hair texture model 610 which defines a texture to be applied to the hair graphic model 594NN. Although not shown in the figures, Virturally any desired graphic model 594 can have image and texture models associated with them.

As can be seen in both FIGS. 46 and 48 each of the models 600 and 600A include a model class designation data object 606 which identifies the common model class 602 to which both such models belongs. If models share a common model class designation, that indicates they share a set of commonly named model nodes which enable them each to have the individual motions of a motion packages designed for use with that model class to be automatically associated with their individual model nodes.

FIGS. 50 and 51 illustrates the content of two possible motion packages 612 and 612A, respectively, which can have their individual motions automatically associated with models of the class 602 shown in FIGS. 46 and 48.

In the preferred embodiment, each of the motion packages 612 include a model class designation data object 606, similar to that contained in model 600 and 600A, which identifies the class 602 with which the motion package is designed for use. Such model class designations make it easy for a system using them to know whether or not motion packages and models are designed for use with each other.

As shown in FIGS. 50 and 51 each of the motion packages includes a list of motions 540C, in the case of FIG. 50, and 540D, in the case of FIG. 51, which are associated with metadata, in the form of model node tags, which identify the model node 536 or 536A with which each such motion is intended to be associated. As indicated under the body parent node tag 536AL all shown in FIG. 50, is possible to have multiple motions associated with a given model node tag in such a motion package. When this is the case, it indicates that the multiple motions associated with the model node tag are to be associated with the corresponding model node of any model to which the motion package is added.

The motion packages shown in FIGS. 50 and 51 each have a default model data object 614, which identifies a default model 616 which can be used in association with the motion package to illustrate its motion even if the user has not associated the motion package with another model. Normally the default model will be a very simple model, comprised largely of stick figure elements so that the model definition will take as few bytes as possible.

When a motion package is attached to its default model, it can be added to a scene and be viewed in the scene's tree view window 530 shown above with regard FIGS. 34 and 37 through 45. This will enable a user to compare its node structure with that of another model, which is particularly useful if the motion package does not belong to the same model class as the other model, and to copy motions from nodes of the motion package's default model to what the user believes should function as corresponding nodes in the other model.

In some embodiments of this aspect of the invention, a motion package or a 3D model could have a separate simulation clock associated with it, off of which all of the functions of time contained in the individual motions of the motion package or 3D model could be driven. This would enable all the motions of a given motion package or all of the motions associated with a given model to have their time sped up or slow down in unison, independently of other models in the same seen. A motion package having motions defined using the OpenMotion API defined above can not only all share a simulation common clock object, but can also share common events or variables, so as to communicate state between such motions, enabling complex parallel motion behaviors to be associated with such motion packages.

FIG. 52 illustrates the model 600A described above with regard FIG. 48, after it has had the motion package 612 of FIG. 50 associated with it, and FIG. 53 illustrates the same model after it has had the motion package 612A of FIG. 51 associated with it. FIG. 52 corresponds to the tree view graph shown in FIG. 48 with the motions 540C shown in FIG. 50 attached to the individual nodes of the model 600A corresponding to their respective model node tags 536 or 536A shown in FIG. 50. Similarly, FIG. 53 shows the tree view of FIG. 48 after the motions 540D of FIG. 51 have been added to its model nodes corresponding touch motion's respective model node tag fields shown in FIG. 51. As indicated in both FIGS. 52 and 53, it is preferred that a motion package node 618, or 618A, respectively, be added to the tree view graph of a model to which a motion package has been added to represent each of the one or more motion packages which have been added to that model. This enables a user to select such a motion package node in the tree view for such purposes as selecting, copying, or deleting it. In the preferred embodiment, when such a motion package node 618 in a tree view graph is selected, all of the motions belonging to that motion package will also be shown as currently selected, so as to better enable a user to see which motions are associated with which motion packages.

FIGS. 54 and 55 provide an illustration of a complex of motions that a motion package can impart to model in one step.

FIG. 54 corresponds to FIG. 45, except that it shows the tree graph of the bee model 580 with all of its model node 536 and 536A expanded and with its parent location nodes 538 also shown. It illustrates this tree view graph before any motions have been added to this model.

FIG. 55 is a view of the same tree view after the user has added a motion package, beeMotion1, indicated by the motion package node 618 shown as the fifth node from the top of that tree view. As a result of the one step of adding such a motion package, a complex set of individual motions 540E have been added to the bee model, with each such motion being associated with its corresponding model node 536 or 536A in the bee model. FIGS. 56A through 56C and FIGS. 57 through 60 provide a highly simplified a pseudo code representation of some of the program instructions which are executed by the Mojo motion editor. It should be understood that similar functionality could be used in other applications besides a motion editor, such as games, educational software, virtual reality programs, 3D browsing software, and other types of 3D applications.

FIGS. 56A through 56C represent just some of the instructions in an event loop 640 of the Mojo editor. The event loop defines the response which the program will make to each of a plurality of different events, including events corresponding to user input, events generated by the Mojo program itself, events generated by the OpenMotion API with which the Mojo motion editor is used, and events generated by the operating system of the computer on which the Mojo editor is running. The instructions contained in the portion of event loop shown in FIGS. 56A and 56B are performed in response to user selections made through the Mojo user interface, as indicated by line 642 of FIG. 56A.

If a user selects to open a model instance, which could, for example, be selected through a Edit>Add Geometry option in Mojo's main menu discussed above with regard to FIG. 41, step 644 cause steps 646 through step 650 to be performed. Step 646 displays an interface that lists available models and lets the user select open one of them. Then, if the user selects to open one of the listed models, step 648 causes steps 650 to open the selected model and to display it in the current scene shown in the Mojo's scene window 503, described above with regard FIGS. 33 and 34.

If the user selects to add a motion instance to a node, either by using an add-motion option 558 of the type shown in FIG. 39, a copy motion option 552 of the type shown in FIG. 38, or a paste option with regard to a selected motion using the edit menu 574 shown in FIG. 41, or by having dragged a motion to a selected node, then step 654 calls associateMotionWithNode function 778 shown in FIG. 58.

As shown in FIG. 58 the associatedMotionWithNode subroutine causes steps 780 through 784 to be performed.

In step 780, Mojo creates an association between the motion to be added to the node and the node in its own software, so it will know that the position, orientation, and scaling of that node is to be updated by corresponding values produced by the OpenMotion API for the given motion at each successive screen update time.

Then a step 782 tests to see if the motion has already been created in the API. If not step 784 calls the API's de-serialization interpreter with the serialized data that defines the motion. In Mojo the de-serialization interpreter corresponds to the translator 170 described above with regard FIG. 1. This translator has the capability to receive a string of characters containing the definition of a motion defined in the OpenMotion format described above with regard to section 6.3 of this application, and to translate that string of characters into a corresponding set of calls to the OpenMotion API. This process enables the OpenMotion system to dynamically create motions from a motion definition that has been recorded in OpenMotion format. Once the de-serialization interpreter has made calls to the API to create the motion, it makes a call in step 784 to schedule the motion. This informs the run-time engine 130 shown in FIG. 1 that the motion is active and should be updated at each om::update( ) call.

Returning to FIG. 56A, if a user selects to change a parameter of a motion instance, such as by use of a show-parameters window 558 of the type shown in FIG. 42, steps 656 and 658 call the API with the corresponding change to the motion instance. After such call is made with such a change to the parameter of a motion, the next time a call is made to om::update( ) the position, orientation, and scaling value of the motion will be updated, taking such a change into account. As a result, the system enables a user to see the effect of changes in the definition of the motion upon the operation of that motion as such changes are made.

If the user selects to change the simulation clocks speed, such as by use of the change simulation clocks speed dialog box 532 shown in FIGS. 43 and 44, step 660 and 662 call the API to make a corresponding change in the simulation clocks object.

If the user selects to save a motion instance, such as through use of the save button 506 shown in FIG. 33 when a given motion is selected, step 664 of FIG. 56A will cause steps 666 through 670 to be performed.

Step 666 displays an interface allowing the user to select a name and path under which the motions to be saved.

Step 668 then calls the API's serialization function for the motion. The API uses the translator 170 described above with regard FIG. 1 to perform such serialization. It has the capability to take an object which has been created by calls to the API 102 shown in FIG. 1 and to create a corresponding description of that object, as currently defined, written in the OpenMotion format described above with regard to section 6.3. This serialization function is provided by having a .print( ) method associated with each of the object classes used to define motions. This function returns a string identifying the current state of that object for which has been called. When this .print( ) function is called for a given motion, its in turn will cause the .print( ) function for each object which is involved in the current definition of the motion to be called in a recursive manner so as to produce a complete definition of the state of the object for which the .print( ) function was first called. In other embodiments of the invention other forms of serialization could be used, such as ones based on the .serialized( ) function which is supported by the Microsoft foundation class library.

After the call to the serialization function in step 668 returns with a string defining the current motion in Open-Motion format, step 670 saves that string on hard disk under the file name and path selected in step 666.

If the user selects to delete a motion instance from a node of a hierarchical model, step 672 causes steps 674 through 680 to be performed. A user can select to delete such a motion instance by use of the delete motion button 521 described above regard FIG. 33, by use of the delete motion option 550 discussed above regard FIG. 38, by use in the delete last motion. option 550A described above regard FIG. 39, or by use of the cut option shown in the edit menu 574 described above with regard FIG. 41.

If the user has made the option to delete motion, step 674 tests to see if the user has made the selection by use of a cut option. If so, it will cause the motion to be copied to a clipboard from which it can be subsequently pasted.

Next step 676 tests to see if the selected motion is part of a motion package. If so, step 678 deletes the current motion from the current instance of the motion package. Finally step 680 calls a function disassociateMotionFromNode 792 of FIG. 60.

As shown in FIG. 60, the disassociateMotionFromNode function includes steps 794 through 798.

Step 794 removes any association stored in the Mojo application between the given motion and the node from which. it is being disassociated.

Then step 796 tests to see if the motion is not associated with any other node, and if it is not, step 798 calls the OpenMotion API to un-schedule the motion and then to delete it.

If the user selects to add a motion package, such as a motion package is described above with regard to FIGS. 50 through 54, to a model, step 682 causes steps 684 through 700 to be performed.

Step 684 through 692 display a user interface, which as is indicated by line 686 enables the user to list available motion package is unless the user selects to open a selected one of them. As indicated by line 690 the interface also allows the user to open a Tree view of a motion package on its associated default model to 616 of the type shown in FIGS. 50 and 51. As indicated by line 692 the interface also lists all the models currently in the currently open seen and lets the user selects add a motion package to a selected one of them.

If the user selects to open a tree graph showing the selected motion package on its associated default model 616 of the type shown in FIGS. 50 and 51, steps 694 and 696 will display a tree view of the selected motion package's associated default model showing the motion package and its associated individual motions attached to the model and its individual model now is in the same manner as is illustrated in FIGS. 50 to through 54 described above.

If the user chooses to add a selected model package to a selected model, step 698 and 700 call the addMotionPackageToModel subroutine for the selected model and selected motion package.

As shown in FIG. 57 the addMotionPackageToModel subroutine 770 is comprised of steps 771 through. 776.

Step 771 causes a motion package node 618 similar to the nodes 618, 618A and 618B shown in FIGS. 52, 53, and 55, respectively, to be placed as a child node under the top node of the model to which the motion package is being attached.

Then step 772 performs a loop for each individual motion in the motion package. For each such motion, step 774 checks to see if there is a node in the model to which the motion package is being attached which has the same name as the model node tag associated with that motion. If such a node can be found in the model, then steps 776 calls the associatedMotionWithNode function, described above with regard to FIG. 58, for the current motion and found node.

Although not shown in FIG. 57, if there are one or more motions for which the step 774 cannot find a model node having a name corresponding to the motion's model node tag, the system checks if the model contains any model node having a name which is identical to that of the motion's model node tag except for the presence or absence of the word "parent" in the model node name. If such a model node is found, the motion will be associated with it. This, for example, will allow the head motion 1 of FIG. 50 or both the head motion 2A and head motion 2B shown in FIG. 51 to be associated with the head node 536II of the model 600 shown in FIG. 46, even though the model node tag associated with such motions has the name "head parent" rather than "head".

Also not shown in FIG. 57, if at the end of the loop 772 there are any motions in the motion package that have not been assigned to model nodes in the model, the system can display a tree view of the motion package on its default model with an indication of all the motions that have been left unassociated. If desired, the user is then free to drag or cut and paste those remaining motions to desired nodes in the new model.

In other embodiments of this aspect of the invention, users will be allowed to select whether a new motion package is to immediately replace a motion package currently on the selected model, and whether there is to be a ramp-in or ramp-out of the new and old motion packages, respectively. In some embodiments, there is a browser that allows a user to see models and motion packages grouped by their associated model class 602, of the type shown in FIGS. 50 and 51. It is also preferred that such browsers enable a user to browse mapping transformations which can be used to automatically map a motion package into models of a model class other than one having model node names corresponding to the motion packages model node tags.

FIG. 56B shows that if the user selects to redefine the topology of a motion package instance, step 702 will cause steps 704 through 722 to be performed. By redefine the topology of a motion package means redefining the structure of what individual motions are associated with what model node tags in the package. The modification of a given motion definition by changing its parameters is described above with regard to steps 656 and 658 of FIG. 56A and the show-parameters window of FIG. 42.

If the user selects to redefine a motion package's topology, step 704 displays a user interface described by-lines 706 through 712.

As is indicated in line 706, this user interface prompts the user to select the motions desired for inclusion: in the motion package and place motions under the model nodes with which it is desired that they be associated, if they are not already located under such nodes. When this interface is displayed the selected motion package node 618, of the type shown in FIGS. 52, 53, and 55 will be highlighted, as will all the other individual motions associated with currently selected motion package. The user can then click on any unselected individual motion to add it to the currently selected motion package, or click on any currently selected individual motion to deselect it and subtract it from that package. If the user wishes to change the selected/deselected status of more than one individual motion he or she can used a shift-click to do so.

As indicated by line 708, the interface displayed by step 704 provides features for allowing a user to select to rename the model node tag associated with the one or more motions under a given model node in the current tree graph view. This will not change the name of the model node to which the motions are attached, unless the model on which the motion package is being displayed is the selected motion package's default model 616, of the type described above with regard FIGS. 50 and 51.

As indicated by line 710, the user interface displayed by step 704 includes controls that allow a user to rename the selected motion package's model class, if the user desires to do so. If there currently is no selected motion package, these controls allow the user to create a name for a new motion package which is to have associated with it any motions that are selected at the time the user selects to redefine the motion package, as described in the next paragraph. This, for example, would allow a user to define a new motion package having all of the motions shown associated with the running man mode 502 described above with regard to FIGS. 33 through 44.

As indicated by line 712, the user interface lets a user select to re-define the motion package in its current state after having made any changes in response to the aspect of the user interface described above with regard line 706 through 710. If the user so selects to redefine the motion package, step 714 causes steps 716 to redefine the current motion package as indicated incline 718 through 722.

As indicated by line 718, this redefinition process includes causing the redefined motion package to have a model node tag for each model node under which there is an individual motion currently displayed in the current tree view graph, with any renaming of model node tags which has been performed in response to the user interface described above with regard to line 708.

As indicated line by 717, the redefinition process includes placing under each such model node tag each individual motion associated with that node tag's corresponding model node in the currently displayed tree view graph.

As indicated by lines 718 and 720, if the name of the model class associated with the motion package has been changed in response to the user interface described above with regard to line 710 then the redefined motion package will have a corresponding change in the name of its associated model class.

If there have been any changes in the structure of the model node from which motions depend, lines 721 and 722 will give the user the option to have the system automatically create a new default stick figure model for the motion package having the same hierarchical structure as that of all the nodes directly moved by the motion package's motions in the current model.

If a user selects to save a motion package, then step 724 of FIG. 56B causes steps 726 through 742 to be performed. Such a selection can be made by selecting a motion package node 618, of the type shown in FIGS. 52, 53, and 55, and then choosing to save that motion package by pressing the button 506 shown in FIG. 33 or by selecting a save option under the file menu shows in the top-level menu 572 described above briefly with regard FIG. 41.

Once a user has selected to save a motion package, step 726 displays an interface that allows the user to select the name and path under which the motion package is to be saved.

Then step 728 performs a loop comprised of steps 730 through 736 for each node tag in the motion package being saved.

Step 730 adds the current node tag to a temporary motion package data string being created in association With the save.

Then step 732 performs a loop comprised of steps 734 and 736 for each individual motion associated with the name tag in the motion package being saved. Step 734 calls the API serialization function, described above, for the motion to create a description of that motion in the OpenMotion format described above with regard to section 6.3. After this call returns, step 736 adds the OpenMotion format string returned by it to the temporary motion package data string.

Once the loop 728 has been performed for each node tag in the current motion package, step 737 adds the model class and default model definitions 606 and 614 shown in FIGS. 50 and 51 to the motion package data string being created.

Once all these steps have been performed, step 738 saves the motion package data string to hard disk under the selected file name and path.

If the user selects to delete motion package instance, model instance, step 740 causes steps 742 to call the removeMotionPackageFromModel function. A user can make such selection by selecting the motion package node 618 shown in FIGS. 50 to 53 and 55 in a tree view of the model to which the motion package has been attached, and then select the motion delete button 519 shown in FIG. 33 or the cut option shown on the edit menu 574 in FIG. 41.

FIG. 59 shows the removeMotionPackageFromModel function 786 that is called if the user selects to delete a motion package instance. This function includes a step 787 which removes the motion package node 618, shown in FIGS. 52, 53, and 55, from under the top model node of the model from which the motion package is being removed. Then step 788 performs a loop comprised of calling the disassociateMotionFromNode function described above with regard FIG. 60, for each individual motion in the motion package.

FIG. 56C illustrates that if it is time for a screen update in this scene view window 503 of the Mojo interface (an event that occurs many times each second), step 746 through 768 will be performed.

Step 746 calls the om::update( ) function described above in section 6.2.2.2.1.

As indicated in step 748, this causes the opened motion API to update the position, orientation, and scaling value of each currently scheduled motion, including updating any temporal or spatial predicates of the type described above.

Once the of om::update( ) call has returned, step 750 performs a loop for each model in the current scene. This loop performs an inner loop 754 for each model node in current model of loop 750 having an associated motion. This inner loop 754 is comprised of steps 756 through 764.

Step 756 of this inner loop performs an innermost loop for each motion associated with the current node of the loop 754 comprised of steps 758 through 760. Step 758 calls the position( ), orientation( ), and scale( ) functions for the current motion. Then step 760 adds the value returned in each of the calls a step 758 to a sum which is calculated, respectively, for the position, orientation, and scale of the current node over all of the iterations for the current node in loop 754.

Once the current iteration of loop 754 has added the position, orientation, and scale for each motion associated with the current node, step 762 updates the position, orientation, and scale of the current node with the resulting sum.

Next, step 764 calls the renderer program 106, shown in FIG. 1, to have the renderer make a corresponding change to the position, orientation, and scale of the node in the renderer's object matrix 120, shown in FIG. 3, which corresponds to the current node.

Once the loop 750 has caused each node of each model to be updated, step 766 calls the renderer 106 to have it render an image of the scene with a current state of all of its nodes.

Then step 768 calls the om::frame( )function described above with regard to section 6.2.2.2.1 to help the OpenMotion API take into account the time delay between each om::update( ) call and the time at which the motion values calculated by that call are actually rendered.

FIGS. 61 through 63 provide a graphic illustration of how the Mojo interface allows motions to be dragged from a location under an old model node in a tree view graph to a location under a new model node in that graph, so as to disassociate the motion from the old model node, as described above with regard to steps 672 and 680 of FIG. 56A, and to associated the motion with the new model node, as described above with regard to steps 652 and 654 of that same figure.

FIG. 61 illustrates a part of a tree view 530 of the model 600A after it has had motion package 618 added to it, as shown in FIG. 52. In the view of FIG. 61, the user has right-click on a selected motion 540C with the cursor 542, causing it to be highlighted, as is indicated by the box 793 in FIG. 61. This result in the display of a motion-options menu 546 of the type described above regard FIG. 38. Then it is assumed that the user clicks on the delete-motion option 550 which causes the display of the selected motion 540C to be removed from the tree view as indicated in FIG. 62.

As shown in FIG. 62, the user has taken the cursor 542 and used it to drag the head motion 1 540C shown up to the position 799 shown in dotted lines in that figure. If the user then releases the drag, the head motion 1 540C will be repositioned at the location at which the drag was released causing the tree view to have appearance shown in FIG. 63.

The ability to reposition motions in a tree view graph can be very useful. This is particularly true if a user desires to copy a given motion to multiple nodes of one or more models, or if a user desires to drag motions from a motion package displayed in a tree view of its associated default model to desired nodes in a new model.

8. 3D MODELS AND MOTION E-COMMERCE SITE

FIGS. 64 through 66 illustrate one of many possible e-commerce system which can use aspects of the present invention to enable users to purchase and download, as well as to upload and sell, motions and models of the general type described above.

FIG. 64 illustrates a network computer system 800 including a server computer 802 and a client computer 804 which are connected over a computer network, which can be virtually any computer network, but would preferably be the Internet.

The client and server computers 804 and 802, respectively, can be virtually any type of computer capable of functioning as clients or servers on a computer network. In many embodiments such computers will include random access memory 806 for storing computer instructions endowed in a form which can be rapidly accessed by the computer CPU 812, a video interface 808 which enables the computer to generate video displays to be seen on a screen or monitor 809, and I/O interface 810 which can receive user input, such as from a keyboard 811 or a pointing device 813, a CPU 812 which can execute computer instructions stored in the random access memory 806 and which can read and write data to that memory, and a network interface 814 which can communicate data and instructions between one such computer and another over a computer network, such as the Internet 805 shown in FIG. 64. Each such computer also includes a hard disk 118, which includes an operating system 818. It should be understood that the components of the client and server computer could vary both among various clients, among various servers, and between such clients and servers.

The client computer 804 includes a web browser 820. It also includes an OpenMotion directory 822 in which users can store OpenMotion 3D models such as the models 600 and 600A described above, preferably in a model directory 824. The OpenMotion directory also preferably includes one or more motion packages such as the motion packages 612 and 612A described above, and one or more motions 540 of the type described above. Preferably such motions are stored in a motion directory 826. Commonly a client computer 804 of the type which will be using the e-commerce site describe with regard FIGS. 64 through 66 will include one or more 3D motion application 828 which can use 3D motions and models of the type sold by such in the e-commerce site. It is also preferred that such clients include the OpenMotion library 100, including the classes which define the OpenMotion system shown in FIG. 1, including the Mojo motion view/editor 182 shown in FIG. 1 and a renderer program 106 of the type shown in FIG. 1.

Preferably the server computer 802 in which the e-commerce web site 801 is located includes a server program 830 which can respond to HTTP requests. Preferably the e-commerce web site 801 also includes a plurality of web pages 832 that provides an appropriate user interface for the site. Preferably the site also includes a models directory 824A that includes a plurality of models that can be demonstrated and/or purchased through the web site. Similarly, it is preferred that the web site also include a motion directory 826A, which includes motion packages 612 and individual motions 540 which can be demonstrated and/or purchased through the web site. In addition, it is preferred that the web site include an e-commerce back end 834 to perform the standard functions associated with an e-commerce site.

FIG. 65 provides a high-level pseudo code description of the steps 900 performed by the e-commerce client computer 804 shown in FIG. 64. These includes a step 902 in which the client uses the browser 820 shown in FIG. 64 to display and interact with web pages of the e-commerce server 802 shown in FIG. 64.

If a model or motion (including a motion package) is downloaded to the client computer by the e-commerce server as a result of interactions performed in step 902, step 904 cause steps 906 to store the model or motion in the disk drive 816, preferably in the appropriate models or motion directory 824 or 826 shown in FIG. 64. Although it is not necessary, it will normally be the case that a step 910 will be performed in which the user subsequently uses a motion or graphic model downloaded and stored in steps 904 and 906 with an OpenMotion application, such as the application 828 shown in FIG. 64. For example, the user can use the Mojo motion viewer/editor 182 as such and application.

FIG. 66 describe some of the steps 912 which can be performed by the e-commerce server 802, shown in FIG. 64, including steps 913 through 962.

If a user on a client connected to the commerce server indicates that he or she wishes to purchase motions or models from the commerce web site a step 913 will cause steps 914 through 936 to be performed.

Step 914 includes the display of one or more web pages designed for use by potential. purchasers of motions and models. As shown by line 916, these pages explain to a potential purchaser how to use the system. As shown by line 918, these pages display models, preferably grouped by model class, with their associated price. As indicated by line 920, these pages display motions, including motion packages an/or individual motions, organized by model class with indications of their associated price. As indicated by line 922, these pages allow a user to select to downloaded a given motion or model for trial use. And as indicated by step 924, these pages also allow a user to select to purchase a given motion or model.

If a user selects to download a selected motion are model for trial step 926 causes step 928 to download a time-limited copy of the selected motion are model.

If the user selects to purchase a selected motion or model step 930 causes steps 932 through 936 to be performed. Step 932 records the transaction in the account of the user, charging the cost of the purchased item to the user's account. Then step 934 records the transaction in account associated with the vendor of the purchased model, crediting the cost of the purchased item minus any commission charged by the e-commerce site, itself, to the account of the vendor. Then step 936 downloads a copy of the purchased motion or model to the client.

If the user of a client connected to the e-commerce server indicates he or she wants to sell models or motion, step 938 causes steps 940 through 962 to be performed.

Step 940 displays one or more web pages designed for use by such potential model or motion vendors. As shown by line 942, these web pages include explanations of how the system can be used by a potential vendor of motions are models. As indicated by line enable a user to, select to upload a given motion or model which is to be sold by the vendor on the web site.

If a user selects to upload a motion or model, step 946 causes step 948 to display one or more web pages which, as indicated by lines 950 and 952, allow the user to specify a name, description, and price for the uploaded motion or model, and which allow the user to actually give a command to upload the given item.

If a user selects to upload a given motion are model, step 954 causes steps 956 through 962 to be performed. Step 956 actually uploads the given motion or model. If the uploaded item is a model or motion package, step 958 checks if the uploaded item's model classification 606, shown in FIGS. 50 and 51, is accurate. Although not shown, if the classification label associated with the uploaded model or motion packages an accurate the server will notify the potential vendor and instruct him or her to either fix the item so that its current classification is correct or given a new classification which is correct. Then step 960 places the uploaded motion or model in a list of motions or models with the associated uploaded price in association with its corresponding model class. Then step 962 records an association between the uploaded model or motion and the vendor who uploaded it.

9. 3D NEWTORKED GAME

FIGS. 67 through 69 illustrate a type of network interaction that is made possible by aspects of the present invention. In the particular embodiment shown in these figures, this network interaction is in the form of a network 3D game.

FIG. 67 displays a network system that makes such a network game possible. It includes a plurality of client computers 804A, which are virtually identical to the client computers 804 described above regard FIG. 64, except that the motion application associated with each such client is a 3D game application 828A and except that its model involved in such a system has a game server program 838 associated with it.

FIG. 68 illustrates some of the steps performed by the game application 828A shown in FIG. 67. These include steps 1002 through 1044.

If the client application adds a model to, alters a model in, or deletes a model from, a shared seen in the 3D network game, then step 1002 causes step 1004 to upload a change description to the server computer identifying the model which has been changed and the change which has been made to it.

If the client application alters a motion, including an individual motion or a motion package, associated with a given model instance in a shared scene of the game, such as by changing the motion's parameters or behaviors, or by adding or deleting a motion or motion package to or from a model, then step 1006 causes step 1008 to upload a change description to the server identifying the motion change and any model affected thereby. In the preferred embodiment of this aspect of the invention, this is done by uploading an OpenMotion format description of the motion as changed, or, if separately serializable, of the individual change which is been made to the motion, in the OpenMotion format described above with regard to section 6.3.

If the client application receives a downloaded change description from the server, step 1010 causes steps 1012 through 1044 to be performed.

If the downloaded change description relates to a motion which has already been created on the client computer receiving the download, step 1012 causes step 1014 the call the de-serialization .print( ) function for OpenMotion format string downloaded as part of the change description. This will generate calls to the client computer's API causing the motion identified in the downloaded change description to. have a change corresponding to If the downloaded change description is for a motion package to be added to a model, step 1016 causes step 1018 to call the addMotionPackagetoModel subroutine described above with regard FIG. 57. This will cause the individual motions associated with the downloaded motion package to be associated with the appropriate notes of the model referred to in the downloaded change description.

If the downloaded change description indicates that an individual motion is to be added to an individual node of a model, step 1020 causes step 1020 to the call the associatedMotionWithNode function described above with regard to FIG. 58 for the motion and node.

If the downloaded change description indicates that a motion package is to be deleted from a given model, step 1024 causes step 1026 to call the removeMotionPackageFromModel subroutine described above with regard to FIG. 59 for the motion package and the model. This will cause the individual motions associated with motion package to be removed from the model.

If the downloaded change description indicates that an individual motion is to be deleted from a node of a model, step 1028 will cause step 1030 to call the disassociateMotionFromNode function described above with regard FIG. 60 for the motion and node.

If the downloaded change description indicates that a new model is to be added to the scene, step 1032 will cause step 1034 to add the model to the scene.

If the downloaded change description indicates that a change is to be made to one or more nodes of a model already in the current scene, step 1036 will cause step 1040 to make a corresponding change to that model.

If the downloaded change description indicates that a model is to be removed from the scene, step 1042 will cause step 1044 to remove the model from the scene.

FIG. 69 illustrates that the server. program 838 shown in FIG. 67 includes steps 1048 and 1050 that respond to the uploading of any change description from one client by downloading that same change description to all other clients having the same model in a common shared scene.

The network game system shown in FIGS. 67 through 69 allows a plurality of client computers to share an interactive 3D scene in which any change made to the motions and models on one client computer will be replicated on other client computers having the same motions and models in their own versions of the same. In other embodiments of the invention, a significant number of motion packages and motions could be stored on each client computer, and interaction between various network systems could involve commands to merely link motion package already stored on a given client computer to a given model also stored on that client. This would allow complex changes in behavior to be communicated between separate computers with relatively little communication. In such systems, only if there is a command or action related to a model or motion not currently on a client would there be a need to access such a motion or model over the network.

The capability which the present invention provides to enable complex motions and complex changes in motions to be communicated between computers can be used for many applications other than network games, including, to name just a few: shared virtual reality applications, 3D network browsing applications, virtual travel, and 3D educational applications. It should also be understood that this aspect of the invention can be used other than in applications in which changes in motion are merely copied from one client through a server to another client. For example, the network aspect of the invention can be used in peer-to-peer computer networks as well as in client/server computer networks. Similarly, in other aspects of the invention motion or model changes may be originated in the server computer.

FIG. 70 provides a highly simplified example of how in application program, such as, for example, the game application 828A shown in FIG. 67 can use programmed instructions to automatically cause a succession of different motion packages to be associated with a given model. It illustrates a small portion of the event loop 1068 associated with such a 3D motion application comprised of steps 1062 through 1076.

In this highly simplified example, it is assumed that if a 3D model of a lion, called lionModel, comes within 20 feet of a model of a man, such as the man model 502 shown in FIG. 33, called manModel in FIG. 70, a spatial predicate of the type described above regard to section 6.2.7.5 will generate an event. If this event is generated, a step 1062 shown in FIG. 70 will cause steps 1064 through 1068 to be performed. Step 1064 tests to see whether the manModel currently has other than a run motion package associated with it. If so, it causes steps 1066 and 1068 to be performed. Step 1066 calls the removeMotionPackageFromModel function, described above with regard FIG. 59, to remove any motion package currently associated with the manModel, and then step 1068 calls the addMotionPackageToModel function, described above regard FIG. 57, to add the run motion package to the manModel with an initial direction causing the running motion to be away from the lionModel. This will cause the manModel to start running away from the lionModel.

If the application program in which the loop of FIG. 70 occurs were the game application 828A shown in FIG. 67, change descriptions corresponding to the changes made in steps 1066 and 1068 would be uploaded to the server 862A shown in FIG. 67 according to steps 1066 and 1068 shown in FIG. 68, so that the resulting changes in motions would be modeled on each client computer sharing the scene including both the manModel and lionModel.

In the example of FIG. 70 it is also assumed that a spatial predicate has been defined which will generate an event if the lionModel is more than 300 feet from the This latter step will test to see if the manModel has other than the walk motion package associated with it. If so, steps 1074 and 1076 will be performed. Step 1074 will call the removeMotionPackageFromModel function to remove any previous motion package associated with the manModel from that model, and step 1076 will call the addMotionPackageToModel function so as to add the walk motion package to the manModel.

As the simple example of FIG. 70 illustrates, the present invention makes it possible to remove and add complex sets of motions from and to hierarchical 3D models with relatively simple programming steps. In other, more complex, uses of this aspect of the invention, the motion packages removed from or added to hierarchical models by a given sequence of programmed instructions, and/or the hierarchical models themselves identified in such instructions, could be represented by variables so that such instructions could add or remove different motion packages from different models at different times as a function of programmed context. For example, the instructions that would carry out steps 1016 and 1018, as well as steps 1024 and 1026, of FIG. 68 would preferably be written using such variable motion package and model names.

10. ADDITIONAL INTERACTIVE CAPABILITIES OF TREE VIEW

FIG. 71 displays additional features which can be represented in the tree view window 530, described above with regard to FIGS. 33 through 45, in some embodiments of the invention.

In this figure the node labeled "Attachment Point" will normally be a model node 536 or a model parent node 536A and the motion node 540 will be a motion node, all of the type described above.

In this enhanced version of the tree view window, the motion node 540 can have depended from it the following types of nodes: an actor definition node 1080, an actor node 1088.

An actor definition node 1080 would specify the actor database fields and classifications that apply to the motion under which the node 1080 has been placed. An "actor" is a term applied to a motion-enabled object, that is a model object comprised of one or more nodes to which one or more motions have been applied. Normally in such an actor, the motions attached to its nodes exhibit autonomous or interactive behaviors.

The actors attributes node 1082 defines data values or expressions for the actor database fields specified under the actors definition node.

The excitables node 1084 specifies variables and expressions that drive the behavioral model. This includes transient and time based variables which reflect the current state of reaction to dynamic interactions with the environment, with other actors, or with the user.

The pivot point node 1086 represents the offset, with respect to the model node to which this nodes parent motion is attached, of the origin for the position and orientation calculation for that motion. For example if the motion is a swing or spin, it will define the pivot point for such swinging or spinning.

A behavior node 1088 specifies the finite-state machine, of the type described above regard to section 6.2.6.4, that controls motion behavior. Such a behavior node is an expandable node which can have stored underneath it one or more user-named state nodes, each representing a state transition of the type described above in section 6.2.6.4.

Each such state in node 1090 can have associated with it one or more transition nodes 1092 and a single controller node 1098. Each such transition represents a When class of the type described above in section 6.2.6.4, and can have as child nodes a and behavior associated with an instance of the When class.

The controller node 1098 located as a child under a state node 1090 has as children three degree-of-freedom nodes 1100, 1102, or 1104 which represent, respectively, the mathematical function of time which controls position, orientation, or scaling for the current motion in the state represented by the controller's parent state node 1090. Each degree-of-freedom node indications which the $0^{th}$ through $2^{nd}$ derivative of its corresponding degree of freedom it drives.

The Geometry node 594 is identical to the graphic nodes 594 shown above in FIGS. 38, 39, 45, 46 through 49, 52, and 53.

The texture node 610 is the same type of node as the hair texture model 2 610 shown in FIG. 52. It is used to define a texture which can be applied to the surface of the 3-D shape defined by a geometry node.

The sound node 952 is the same type of node as the node 592 described above regard FIG. 45.

In the embodiment of the invention providing the tree view shown in FIG. 71, a user can click on, or otherwise select, any one of these nodes to see more about the information they represent. In cases where the information can be edited from within the application providing such a display, controls will be provided to enable a user to interactively edit such information.

11. THE INVENTION IS NOT LIMITED TO THE EMBODIMENTS DESCRIBED ABOVE

It should be understood that the foregoing description and drawings are given merely to explain and illustrate the invention and that the invention is not limited thereto. Those skilled in the art who have the disclosure before them will be able to make modifications and variations therein without departing from the scope of the invention.

For example, it should be understood that the behavior described in the claims below, like virtually all computer behaviors, can be performed by many different programming and data structures, using substantially different organization and sequencing. This is because programming is an extremely flexible art in which a given idea of any complexity, once understood by those skilled in the art, can be manifested in a virtually unlimited number of ways. Thus, the claims are not meant to be limited to the exact steps and sequence of steps described in the figures.

This particularly true since the pseudo-code described in the text above has been highly simplified to enable it to more efficiently communicate that which one skilled in the art needs to know to implement the invention without burdening him or her with unnecessary details. In the interest of such simplification the structure of the pseudo-code describe above often differs significantly from the structure of the actual code that a skilled programmer would want to use when implementing the invention.

Furthermore, many of the functions which are shown being performed in software in the specification could be performed in hardware in other embodiments.

Furthermore, it should be understood that the invention of the present application is not limited to use with any one type of operating system or computer hardware. For example, although the OpenMotion System described above operates with the Microsoft Windows operating system, it is independent of any operating system and, thus, can be used with other operating systems such as variants of Unix or Microsoft Windows NT Similarly, although the OpenMotion System described above is written in C++, it should be understood that in other embodiments of the invention all or a part of it can be written in other languages, although for certain aspects of the invention object oriented procedural languages are preferred.

One should understand that the interface of the invention is not limited to the above. Similarly, in other embodiments the API could include different functions and differently defined functions and still accomplish many aspects of the current invention.

The aspects of the invention described above with regard to FIGS. 64 through 69 use the World Wide Web. It should be understood that the aspects of the invention shown in these figures are applicable to other types of network servers. It should also be understood that these aspects of the invention can be used not only on the Internet, but also with other forms of computer networks, including local area networks and wide area networks, as well as host-terminal network systems. In particular, the invention is not limited to use with HTML based systems, but could operate with other types of network protocols, or even proprietary protocols or future network protocols. Of course many aspects of the invention can be performed on a non-networked computer.

What we claim is:

1. A computerized method of creating animation comprising:
    storing a representation of a 3D graphic model containing a plurality of model nodes, in which nodes can be related to each other in a parent-child hierarchy in which each node can be a parent node and/or a child node and in which the spatial attributes of each child node is defined relative to the spatial attributes of a corresponding parent node;
    storing a plurality of motions, each associated with a corresponding node in said graphic model, and each having associated with it a definition of at least a position and an orientation spatial attribute value each defined in terms of a mathematical functions of time;
    generating an animated view of the given model in which the given model is rendered at each of a succession of time values with individual ones of the model's nodes being shown in each successive rendering as having a position and orientation determined as a function of the value for the rendering's corresponding time value of the position and orientation values defined by the node's associated motion; and
    providing a point-and-click graphical user interface which includes one or more model graph controls which displays a graphical representation of said graphic model, including:
        one or more tree graphs showing a visual representation of each model node and of the parent-child relationships between any such nodes;
        a visual representation of each motion associated with one of said of nodes at a spatial location corresponding to said associated node:
        one or more motion selecting controls for enabling a user to select a given motion by clicking on the visual representation of the given motion in the model graph; and
        motion-editing controls for enabling a user to vary the selected motion;
    wherein the visual representation of a motion in the model graph provides information about the one or more mathematical function of time which the motion uses to define one or more spatial attributes.

2. A computerized method of performing 3D animation using a motion API comprising:
    storing, outside of the motion API, a representation of a graphics model including of one or more model nodes, each of which nodes includes its own 3D graphic model and each of which model nodes has a position and an orientation, at least one of which can change relative to others of said model nodes;
    separately calling the motion API to define a 3D motion in association with each of said model nodes, each of which motions defines at least a position and orientation as mathematical functions of time;
    performing the following for each of a succession of video display frame times:
        calling the API to determine the position and orientation defined by each of said motions as of the frame time; and
        updating the position and/or orientation, respectively, of the each model node as a function of the position and/or orientation determined by the API for the frame time; and
    rendering the graphics model with the model's individual nodes having said updated position and/or orientation for the frame time.

3. A computerized method as in claim 2 further including:
    separately calling the motion API to cause it to produce a version of a motion which can be recorded to a mass storage device; and
    storing such a version of a motion on a mass storage device.

4. A computerized method as in claim 2 further including:
    separately calling the motion API to define a 3D constraint surface;
    separately calling the motion API to define a spatial predicate for a motion which generate an event when a given spatial relationship between the position represented by motion has a given spatial relationship to the constraint surface; and
    when the API is called to determine the position and orientation defined by each of said motions as of a frame time, the API also determines if a motion having said spatial predicate has said given spatial relationship to the constraint surface and, if so, the API generates said event.

5. An object-oriented API in the form of a computer program recorded in a machine-readable memory structure, said API comprising:
    a plurality of pre-defined motion classes, each of which has associated functions for creating and defining an instance of its 3D motion class, each of which motion instances defines a trajectory of position and orientation in a 3D space as a mathematical function of time; and
    one or more functions for calculating and providing updated values for at least the position and orientation of any instances of any motion classes defined by said API;
    wherein said pre-defined motion classes include at least the following three basic pre-defined motion classes:
        an oscillating translation motion class, which defines a composite motion which repeatedly performs the following:

translating the motion's position a first distance in a first direction; and then translating the motion's position a second distance in a second direction;

a rotation motion class, which defines a motion which rotates the motion's associated orientation in a direction about a given axis over a given angular distance; and a oscillating rotation motion class, which defines a composite motion which repeatedly performs the following:

rotating the motion's orientation in a first direction about a first axis over a first angular distance; and then rotating the motion's orientation in a second direction about a second axis over a second angular distance.

6. An object-oriented API as in claim 5 wherein said pre-defined motion classes further include as one of said basic pre-defined motion classes a translation motion class, which defines a motion which translates the motion's associated position a given distance in a given direction.

7. An object-oriented API as in claim 5 wherein in the pre-defined oscillating translation motion class the first and second distances are the same and the first and second directions are opposite.

8. An object-oriented API as in claim 5 wherein in the pre-defined oscillating rotation motion class the first and second distances and axes are the same and the first and second directions are opposite.

9. An API as in claim 5 which provides expressions for adding or subtracting the respective positions and orientations of each of two or more instances of said pre-defined motion classes to define, respectively, the position and orientation of a third instance of a pre-defined motion class as a function of time.

10. An API as in claim 5 which provides expressions for defining the position and orientation of one instance of a pre-defined motion class as a function of the position and orientation of another instance of a predefined motion class multiplied by the value of a multiplicative expression.

11. An API as in claim 10 wherein said multiplicative expression is a variable function of time.

12. An API as in claim 11 wherein said multiplicative expression is a function of a spatial attribute value, such as position or orientation, defined by an instance of a pre-defined motion class as a function of time.

13. An API as in claim 5 further including with said API a graphical user interface which has one or more motion-creation controls which enable a user to select to create an instance of a selected one of said four motion classes through a point-and-click interaction.

14. An API as in claim 13 wherein said user interface includes one or more motion editing controls which enable a user to select the direction, distance, and speed, of a the trajectory of position and/or orientation defined by an instance of a motion class created through said interface.

15. An API as in claim 14 wherein said user interface includes one or more save-motion controls which enable a user to save an instance of a predefined motion class under a new label.

16. An API as in claim 13 wherein said user interface includes one or more composite motion editing controls which enable a user to define said trajectories of an instance of a pre-defined motion class, as a succession of trajectories defined by a corresponding succession of previously defined instances of one or more motion classes, by selectively placing symbolic representations of said previously defined motion instances into a sequential list of such motion instances which define the composite motions.

17. An object-oriented API in the form of computer programming recorded in a machine-readable memory structure, said API comprising:

at least one pre-defined motion class which has associated functions for creating and defining an instance of its 3D motion class, each of which motion instances defines a trajectory of position and orientation in a 3D space as a function of time; and one or more functions for calculating and providing updated values for the position and orientation of any instances of any motion classes defined by said API;

wherein said API include one or more pre-defined functions which can be called to cause the function of time which defines a motion instance's trajectories to include one or more time cycles in which movement takes place in one or more of said trajectories only during a selected portion of each such cycle; and wherein said API further includes a graphical user interface having one or more time-rate controls which enable a user to select a ratio between the duration of said selected portion of each cycle during which said movement takes place and the remaining portion of each cycle during which said movement does not take place.

18. An API in the form of computer programming recorded in a machine-readable memory structure, said API comprising:

one or more functions for creating and defining one or more 3D motions, each of which defines at least a position and an orientation in a 3D space as one or more functions of time; and one or more functions for calculating and providing updated values for a motion's position and orientation at successive values of time as defined by said motion's one or more functions of time;

wherein:

said functions for defining 3D motions include a set of one or more predefined functions which enable a selected one of the 0th, $1$st, and $2^{nd}$ derivatives of either position or orientation to be defined as a mathematical expression of time in one function call; and said functions for calculating and providing updated values for the position and orientation of a 3D motion at successive values of time include a set of one or more pre-defined functions which returns a selected one of the 0th, $1^{st}$, and $2^{nd}$ derivatives of either position and orientation in one function call.

19. An API as in claim 18 wherein:

said API is an object oriented API;

said 3D motions are instances of motion object classes; and the motion object class has a separate pre-defined method for defining each of the $0^{th}$, $1^{st}$, and $2^{nd}$ derivatives of position and orientation.

20. An API as in claim 18 wherein:

said 3D motions also define a 3D scaling value as a function of time;

said functions for defining a 3D motion include a set of one or more pre-defined functions which enable a selected one of the 0th, $1^{st}$, and $2^{nd}$ derivatives of scaling to be defined as a mathematical expression of time in one function call; and said API further includes functions for providing updated values for the scaling value of a 3D motion at successive values of time, including a set of one or more pre-defined functions which returns a selected one of the 0th, $1^{st}$, and $2^{nd}$ derivatives of such scaling value in one function call.

21. An API as in claim 18 wherein:

said 3D motions also define a 3D shearing value as a function of time;

said functions for defining a 3D motion include a set of one or more pre-defined functions which enable a selected one of the 0th, $1^{st}$, and $2^{nd}$ derivatives of shearing to be defined as a mathematical expression of time in one fuction call; and said API further includes functions for providing updated values for the shearing value of a 3D motion at successive values of time, including a set of one or more pre-defined functions which returns a selected one of the 0th, $1^{st}$, and $2^{nd}$ derivatives of such shearing value in one function call.

22. An API as in claim 18 wherein the mathematical expression used to define the $0^{th}$, $1^{st}$, or $2^{nd}$ derivative of one 3D motion can include one or more of said pre-defined functions which returns a selected one of the $0^{th}$, $1^{st}$, or $2^{nd}$ derivative of another 3D motion.

23. An API as in claim 18 wherein said functions for defining a 3D motion include a function for defining a finite state machine as a set of one or more condition/action pairs, each of which includes a conditional statement which if true causes its corresponding action statement to be called, and in which the action statements can include said pre-defined function which enable a selected one of the $0^{th}$, $1^{st}$, and $2^{nd}$ derivatives of either position and or orientation to be defined, so that which of a motion's derivatives of position and/or orientation is currently selected to be defined by a mathematical expression of time, and what mathematical expression of time is used to define that selected derivative, can be varied as a function of changing conditions.

24. An API in the form of computer programming recorded in a machine-readable memory structure, said API comprising:

one or more functions for creating and defining one or more 3D motions, each of which defines at least a position and an orientation in a 3D space as one or more functions of time;

one or more functions for defining a 3D boundary in said 3D space having a 3D surface; and one or more functions for calculating and providing updated values for the position and orientation of a 3D motion at successive values of time;

wherein said functions for defining a 3D motion include a pre-defined function for constraining such a 3D motion trajectory by said 3D boundary; and wherein said pre-defined function for constraining a 3D motion's trajectory includes a pre-defined function for causing a motion's trajectory to reflect off a 3D boundary's surface.

25. An API in the form of computer programming recorded in a machine-readable memory structure, said API comprising:

one or more functions for creating and defining one or more 3D motions, each of which defines at least a position and an orientation in a 3D space as one or more functions of time;

one or more functions for defining a 3D boundary in said 3D space having a 3D surface; and one or more functions for calculating and providing updated values for the position and orientation of a 3D motion at successive values of time;

wherein said functions for defining a 3D motion include a pre-defined function for constraining such a 3D motion trajectory by said 3D boundary; and wherein said pre-defined function for constraining a 3D motion trajectory includes a pre-defined function for causing a 3D motion's trajectory to be constrained so the trajectory cannot pass through the boundary's surface.

26. An API in the form of computer programming recorded in a machine-readable memory structure, said API comprising:

one or more functions for creating and defining one or more 3D motions, each of which defines at least a position and an orientation in a 3D space as one or more functions of time;

one or more functions for defining a 3D boundary in said 3D space having a 3D surface; and one or more functions for calculating and providing updated values for the position and orientation of a 3D motion at successive values of time;

wherein said functions for defining a 3D motion include a pre-defined function for constraining such a 3D motion trajectory by said 3D boundary; and wherein said pre-defined function for constraining a 3D motion trajectory includes a pre-defined function for causing a 3D motion's trajectory to be constrained to motion along the boundary's surface.

27. An API in the form of computer programming recorded in a machine-readable memory structure, said API comprising:

one or more functions for creating and defining one or more 3D motions, each of which defines at least a position and an orientation in a 3D space as one or more functions of time;

one or more functions for defining a 3D boundary in said 3D space having a 3D surface; and one or more functions for calculating and providing updated values for the position and orientation of a 3D motion at successive values of time;

wherein said functions for defining a 3D motion include a pre-defined function for constraining such a 3D motion trajectory by said 3D boundary; and wherein:

said one or more functions for defining a 3D boundary includes functions enabling a user to define a boundary as a composite of 3D shapes; and said function for constraining a 3D motion by said boundary includes programming to constrain the motion by such a boundary defined as a composite of shapes.

28. An API in the form of computer programming recorded in a machine-readable memory structure, said API comprising:

one or more functions for creating and defining one or more 3D motions, each of which defines at least a position and an orientation in a 3D space as one or more functions of time;

one or more functions for defining a 3D boundary in said 3D space having a 3D surface; and one or more functions for calculating and providing updated values for the position and orientation of a 3D motion at successive values of time;

wherein said functions for defining a 3D motion include a pre-defined spatial predicate function for returning either a true or false value as a function of a spatial relationship between one of said 3D motions and one of said 3D boundaries.

29. An API as in claim 28 which further includes a function for determining if a given function of time is used to define a motion's position or orientation based on the value of a predicate function, which can be one of said spatial predicate functions.

30. An API as in claim 28 wherein:

said API includes functions enabling a user to define one of said 3D boundaries as a composite boundary that is defined as a composite of 3D shapes, and which has a composite surface which is defined by said composite of shapes;

said predicate function is a single pre-defined function which includes programming for returning either a true or false value as a function of a spatial relationship between one of said 3D motions and the composite surface of said a composite boundary.

31. An API in the form of computer programming recorded in a machine-readable memory structure, said API comprising:

one or more functions for creating and defining one or more 3D motions, each of which defines at least a position and an orientation in a 3D space as one or more functions of time; and one or more functions for calculating and providing updated values for the position and orientation of a 3D motion at successive values of time;

wherein said functions for creating and defining a 3D motion include a function for defining a motion's position or orientation as a variable multiple of a mathematical expression of time, in which the variable multiple, itself, also is a function of time.

32. An API in the form of computer programming recorded in a machine-readable memory structure, said API comprising:

one or more functions for creating one or more 3D motions, each of which defines at least a position and an orientation in a 3D space as one or more functions of time; and one or more functions for altering the definition of one of said 3D motions;

one or more functions for calculating and providing updated values for a motion's position and orientation at successive values of time as defined by said motion's one or more functions of time; and one or more functions enabling a motion which has been created and altered by a plurality of calls to API to be output by said API in a form suitable for storage on a mass storage device.

* * * * *